US007633955B1

(12) United States Patent
Saraiya et al.

(10) Patent No.: US 7,633,955 B1
(45) Date of Patent: Dec. 15, 2009

(54) SCSI TRANSPORT FOR FABRIC-BACKPLANE ENTERPRISE SERVERS

(75) Inventors: Nakul Pratap Saraiya, Palo Alto, CA (US); Ganesh Sundaresan, San Jose, CA (US); William E. Fisher, Palo Alto, CA (US)

(73) Assignee: Habanero Holdings, Inc., Saratoga, CA (US)

( * ) Notice: Subject to any disclaimer, the term of this patent is extended or adjusted under 35 U.S.C. 154(b) by 519 days.

(21) Appl. No.: 11/337,172

(22) Filed: Jan. 19, 2006

Related U.S. Application Data

(63) Continuation-in-part of application No. 10/889,469, filed on Jul. 12, 2004, and a continuation-in-part of application No. 10/889,467, filed on Jul. 12, 2004, and a continuation-in-part of application No. 10/889,468, filed on Jul. 12, 2004.

(60) Provisional application No. 60/717,147, filed on Sep. 14, 2005, provisional application No. 60/563,222, filed on Apr. 17, 2005, provisional application No. 60/544,916, filed on Feb. 13, 2004.

(51) Int. Cl.
*H04L 12/56* (2006.01)
(52) U.S. Cl. .................. 370/401; 370/395.31; 370/412; 709/223; 709/238
(58) Field of Classification Search ........... 370/401; 709/223
See application file for complete search history.

(56) References Cited

U.S. PATENT DOCUMENTS 5,440,547 A 8/1995 Easki et al.

5,574,914 A 11/1996 Hancock et al.

(Continued)

FOREIGN PATENT DOCUMENTS

WO   WO 0239262 A2   5/2002

(Continued)

OTHER PUBLICATIONS

Brian Hausauer, iWARP: Reducing Ethernet Overhead in Data Center Designs, http://www.commsdesign.com/showArticle.jhtml?articleID=51202855, Nov. 9, 2004.

(Continued)

*Primary Examiner*—Chirag G Shah
*Assistant Examiner*—Salvador E Rivas
(74) *Attorney, Agent, or Firm*—PatentVentures; Bennett Smith; Korbin Van Dyke

(57) ABSTRACT

A Small Computer System Interface (SCSI) transport for fabric backplane enterprise servers provides for local and remote communication of storage system information between storage sub-system elements of an ES system and other elements of an ES system via a storage interface. The transport includes encapsulation of information for communication via a reliable transport implemented in part across a cellifying switch fabric. The transport may optionally include communication via Ethernet frames over any of a local network or the Internet. Remote Direct Memory Access (RDMA) and Direct Data Placement (DDP) protocols are used to communicate the information (commands, responses, and data) between SCSI initiator and target end-points. A Fibre Channel Module (FCM) may be operated as a SCSI target providing a storage interface to any of a Processor Memory Module (PMM), a System Control Module (SCM), and an OffLoad Module (OLM) operated as a SCSI initiator.

20 Claims, 24 Drawing Sheets

U.S. PATENT DOCUMENTS

| | | |
|---|---|---|
| 5,751,967 A | 5/1998 | Raab et al. |
| 6,038,651 A | 3/2000 | VanHuben et al. |
| 6,088,356 A | 7/2000 | Hendel et al. |
| 6,247,109 B1 | 6/2001 | Kleinsorge et al. |
| 6,301,257 B1 | 10/2001 | Johnson et al. |
| 6,466,964 B1 | 10/2002 | Leung et al. |
| 6,487,605 B1 | 11/2002 | Leung |
| 6,519,660 B1 | 2/2003 | Rooney |
| 6,564,261 B1 | 5/2003 | Gudjonzzon et al. |
| 6,580,721 B1 | 6/2003 | Beshai |
| 6,594,275 B1 | 7/2003 | Schneider |
| 6,600,723 B1 | 7/2003 | Reeb et al. |
| 6,631,141 B1 | 10/2003 | Kumar et al. |
| 6,633,916 B2 | 10/2003 | Kauffman |
| 6,681,262 B1 | 1/2004 | Rimmer |
| 6,681,282 B1 | 1/2004 | Golden et al. |
| 6,684,343 B1 | 1/2004 | Bouchier et al. |
| 6,738,839 B2 | 5/2004 | Sinha |
| 6,744,654 B2 | 6/2004 | Loughmiller |
| 6,760,859 B1 | 7/2004 | Kim et al. |
| 6,799,220 B1 | 9/2004 | Merritt et al. |
| 6,813,274 B1 | 11/2004 | Suzuki et al. |
| 6,820,174 B2 | 11/2004 | Vanderwiel |
| 6,851,059 B1 | 2/2005 | Pfister et al. |
| 6,862,286 B1 | 3/2005 | Tams et al. |
| 6,877,011 B2 | 4/2005 | Jaskiewicz |
| 6,904,477 B2 | 6/2005 | Padmanabhan et al. |
| 6,910,092 B2 | 6/2005 | Calvignac et al. |
| 6,954,463 B1 | 10/2005 | Ma et al. |
| 7,003,586 B1 | 2/2006 | Bailey et al. |
| 7,007,125 B2 | 2/2006 | Barker et al. |
| 7,020,796 B1 | 3/2006 | Ennis et al. |
| 7,023,808 B2 | 4/2006 | Ball et al. |
| 7,024,483 B2 | 4/2006 | Dinker et al. |
| 7,054,965 B2 | 5/2006 | Bell et al. |
| 7,093,024 B2 | 8/2006 | Craddock et al. |
| 7,093,158 B2 | 8/2006 | Barron et al. |
| 7,113,988 B2 | 9/2006 | Chirashnya et al. |
| 7,145,914 B2 | 12/2006 | Olarig et al. |
| 7,171,495 B2 | 1/2007 | Matters et al. |
| 7,197,051 B1 | 3/2007 | Ginjpalli et al. |
| 7,200,704 B2 | 4/2007 | Njoku et al. |
| 7,240,098 B1 | 7/2007 | Mansee |
| 7,266,733 B2 | 9/2007 | Bazinet et al. |
| 7,313,614 B2 * | 12/2007 | Considine et al. ........... 709/223 |
| 7,324,512 B2 | 1/2008 | Larson et al. |
| 7,336,605 B2 | 2/2008 | Bruckman et al. |
| 7,340,167 B2 | 3/2008 | McGlaughlin |
| 7,346,075 B1 | 3/2008 | Alexander, Jr. et al. |
| 7,398,380 B1 | 7/2008 | Lovett et al. |
| 7,421,710 B2 | 9/2008 | Qi et al. |
| 7,428,598 B2 | 9/2008 | Arndt et al. |
| 2002/0032850 A1 | 3/2002 | Kauffman |
| 2002/0105949 A1 | 8/2002 | Shinomiya |
| 2002/0107962 A1 | 8/2002 | Richter et al. |
| 2002/0107971 A1 | 8/2002 | Bailey et al. |
| 2002/0120741 A1 | 8/2002 | Webb et al. |
| 2002/0150106 A1 | 10/2002 | Kagan et al. |
| 2002/0156612 A1 | 10/2002 | Schulter et al. |
| 2002/0156613 A1 | 10/2002 | Geng et al. |
| 2003/0023701 A1 | 1/2003 | Norman et al. |
| 2003/0037224 A1 | 2/2003 | Oehler et al. |
| 2003/0046396 A1 | 3/2003 | Richter et al. |
| 2003/0061379 A1 | 3/2003 | Craddock et al. |
| 2003/0069939 A1 | 4/2003 | Russell |
| 2003/0108058 A1 | 6/2003 | Black et al. |
| 2003/0120852 A1 | 6/2003 | McConnell et al. |
| 2003/0130832 A1 | 7/2003 | Schulter et al. |
| 2003/0130833 A1 | 7/2003 | Brownell et al. |
| 2003/0131067 A1 | 7/2003 | Downer et al. |
| 2003/0169753 A1 | 9/2003 | Black et al. |
| 2003/0202511 A1 | 10/2003 | Sreejith et al. |
| 2003/0208531 A1 | 11/2003 | Matters et al. |
| 2003/0208551 A1 | 11/2003 | Matters et al. |
| 2003/0208631 A1 | 11/2003 | Matters et al. |
| 2003/0208632 A1 | 11/2003 | Rimmer |
| 2003/0212884 A1 | 11/2003 | Lee et al. |
| 2003/0237018 A1 | 12/2003 | Baba |
| 2004/0003063 A1 | 1/2004 | Ashok et al. |
| 2004/0003141 A1 | 1/2004 | Matters et al. |
| 2004/0017816 A1 | 1/2004 | Ishwar et al. |
| 2004/0030770 A1 * | 2/2004 | Pandya ..................... 709/223 |
| 2004/0076116 A1 | 4/2004 | Hefty et al. |
| 2004/0098373 A1 | 5/2004 | Bayliss et al. |
| 2004/0162888 A1 | 8/2004 | Reasor et al. |
| 2004/0249948 A1 * | 12/2004 | Sethi et al. .................. 709/227 |
| 2005/0015657 A1 | 1/2005 | Sugiura et al. |
| 2005/0018669 A1 | 1/2005 | Arndt et al. |
| 2005/0025119 A1 | 2/2005 | Pettey et al. |
| 2005/0038883 A1 | 2/2005 | Elko et al. |
| 2005/0044284 A1 * | 2/2005 | Pescatore ..................... 710/15 |
| 2005/0053060 A1 | 3/2005 | Pettey |
| 2005/0053080 A1 | 3/2005 | Wybenga et al. |
| 2005/0060445 A1 | 3/2005 | Beukema et al. |
| 2005/0078685 A1 * | 4/2005 | MacLean et al. ....... 370/395.54 |
| 2005/0080982 A1 | 4/2005 | Vasilevsky et al. |
| 2005/0111445 A1 | 5/2005 | Wybenga et al. |
| 2005/0114657 A1 | 5/2005 | Kumar et al. |
| 2005/0129045 A1 * | 6/2005 | Machulsky et al. ......... 370/428 |
| 2005/0132089 A1 | 6/2005 | Bodell et al. |
| 2005/0144313 A1 | 6/2005 | Arndt et al. |
| 2005/0165968 A1 * | 7/2005 | Natarajan et al. .............. 710/1 |
| 2006/0236011 A1 | 10/2006 | Narad et al. |
| 2006/0291462 A1 | 12/2006 | Alex et al. |
| 2007/0067435 A1 | 3/2007 | Landis et al. |
| 2009/0049177 A1 | 2/2009 | Iszlai et al. |

FOREIGN PATENT DOCUMENTS

| | | |
|---|---|---|
| WO | WO 0239262 A3 | 5/2002 |
| WO | WO 02069604 A2 | 9/2002 |
| WO | WO 02069604 A3 | 9/2002 |
| WO | WO 02086712 A1 | 10/2002 |
| WO | WO 2005003893 A2 | 1/2005 |

OTHER PUBLICATIONS

H. T. Kung, CS143: Computer Networks (Switching and Fast Route Lookup), Harvard University, Oct. 14, 2004, 17 pgs.

K. Christensen et al., Performance of Packet-to-Cell Segmentation Schemes in Input Buffered Packet Switches; Proceedings of the IEEE International Conference on Communications, Jun. 2004.

Simon Stanley, Switch-Fabric Chipsets, www.lightreading.com, Mar. 3, 2004, 19 pgs.

IBM; Packet Routing Switch and Common Switch Interface; PowerPRS 16G/C192, Summary Datasheet; Jun. 17, 2003.

Simon Stanley, Packet Switch Chips, www.lightreading.com, Feb. 2, 2003, 20 pgs.

Jon Maloy, Telecom Inter Process Communication, Ericsson, Jan. 31, 2003, PA6, 58 pgs.

Michael Miller and Sean Cochrane, Optimum Search Methods for Switch/Router Databases in Access and Metro Edge Networks, IDT White Paper, Jan. 27, 2003, 24 pgs.

R. Recio et al., An RDMA Protocol Specification (Version 1.0), RDMA Consortium at http://www.rdmaconsortium.org, Oct. 21, 2002, 60pgs.

Simon Stanley, Traffic Manager Chips, www.lightreading.com, Oct. 17, 2002, 22 pgs.

IBM; IBM PowerPRS™ 64Gu Packet Routing Switch Datasheet; Sep. 9, 2002; 167 pgs.

Simon Stanley, Network Processors, www.lightreading.com, Aug. 8, 2002, 27 pgs.

Jim Pinkerton, The Case for RDMA, RDMA Consortium, May 29, 2002, 27 pgs.

FABRIC7 Systems, Abridged Presentation for AOL, May 2, 2002, 15 pgs.

Cisco Systems, Inc., Catalyst Switch Architecture and Operation, Session RST-222, May 2002, 105 pgs.

M. Ajmone Marsan et al., Input-queued router architectures exploiting cell-based switching fabrics; Computer Networks 37, Nov. 2001, pp. 541-559.

Keith Burns, Core Router Architecture Rev 1.0, Cisco Systems, Inc., 2001.

Nick McKeown, How might optics be used in IP routers and the Internet?, Optics and Routing Seminar, Oct. 24, 2000.

Nick McKeown, A quick tutorial on IP Router design, Optics and Routing Seminar, Oct. 10, 2000.

CSIX, CSIX-L1: Common Switch Interface Specification-L1, Aug. 5, 2000. 68 pgs.

Nick McKeown and Balaji Prabhakar, High Performance Switches and Routers: Theory and Practice, Sigcomm 99, Harvard University, Aug. 30, 1999.

Nick McKeown, A Fast Switched Backplane for a Gigabit Switched Router, Business Communications Review, Dec. 1997.

Excel Spreadsheet of Oct. 19, 2008 identifying references used to reject claims in related applications; 3 pages.

Excel Spreadsheet of Feb. 25, 2009 identifying references used to reject claims in related applications; 4 pages.

Table of Jun. 25, 2009 identifying references used to reject claims in related applications; 5 pages.

Crowely, Patrick et al., Network Processor Design Issues and Practices, vol. 3, 2005, Chapter 3, Morgan Kaufmann Publishers, 20 pgs.

Clark, Tom, Designing Storage Area Networks, Second Edition, A Practical Reference for Implementing Fibre Channel and IP SANs, 2003, Chapters 2, 3, 4, 5, Addison-Wesley, 123 pgs.

Lekkas, Panos C., Network Processors, Articles, Protocols, and Platforms, 2003, Chapter 11, McGraw Hill, 27 pgs.

Gupta, Meeta, Storage Area Network Fundamentals, Apr. 2002, Chapter 3, Cisco Press, Indianapolis, IN, 32 pgs.

* cited by examiner

SCSI TRANSPORT FOR FABRIC-BACKPLANE ENTERPRISE SERVERS

CROSS REFERENCE TO RELATED APPLICATIONS

Priority benefit claims for this application are made in the accompanying Application Data Sheet (if any). To the extent permitted by the type of the instant application, this application incorporates by reference for all purposes the following applications, which are all owned by the owner of the instant application:

U.S. Provisional Application 60/717,147, filed Sep. 14, 2005, by Nakul Saraiya, et al., and entitled SCSI TRANSPORT FOR FABRIC-BACKPLANE ENTERPRISE SERVERS;

U.S. Non-Provisional application Ser. No. 10/889,469, filed Jul. 12, 2004, by Thomas Dean Lovett, et al., and entitled COMPUTE RESOURCES FOR FABRIC-BACKPLANE ENTERPRISE SERVERS;

U.S. Non-Provisional application Ser. No. 10/889,467, filed Jul. 12, 2004, by Sharad Mehrotra, et al., and entitled CLIENT-SERVER AND APPLICATION MODELS IN FABRIC-BACKPLANE ENTERPRISE SERVERS; and U.S. Non-Provisional application Ser. No. 10/889,468, filed Jul. 12, 2004, by Sharad Mehrotra, et al., and entitled FABRIC-BACKPLANE ENTERPRISE SERVERS.

BACKGROUND

1. Field

Advancements in interprocess and inter-module communications in servers and server clusters are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

Servers and server clusters are complex components of modern datacenters. More efficient ways of organizing, provisioning, managing, and interoperating compute, storage, and network resources are needed to enhance datacenter availability, efficiency, and utilization.

REFERENCES

Additional information regarding Small Computer System Interface (SCSI) compatibility may be found in references such as "Information Technology—SCSI Architecture Model-3 (SAM-3)", Revision 14, 21 Sep. 2004, reference number ISO/IEC 14776-413-200x.

Additional information regarding Fibre Channel (FC) protocols for SCSI transport may be found in references such as "Information Technology—Fibre Channel Protocol for SCSI, Third Version (FCP-3)", Revision 4, Sep. 13, 2005.

Additional information regarding Remote Direct Memory Access (RDMA) may be found in references such as "An RDMA Protocol Specification (Version 1.0)" (draft-recio-iwarp-rdmap-v1.0), 21 Oct. 2002.

Additional information regarding Direct Data Placement (DDP) may be found in references such as "Direct Data Placement over Reliable Transports (Version 1.0)" (draft-shah-iwarp-ddp-v1.0), 21 Oct. 2002.

All of the aforementioned references are herein incorporated by reference for all purposes.

SUMMARY

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

DETAILED DESCRIPTION

Figure 1A:
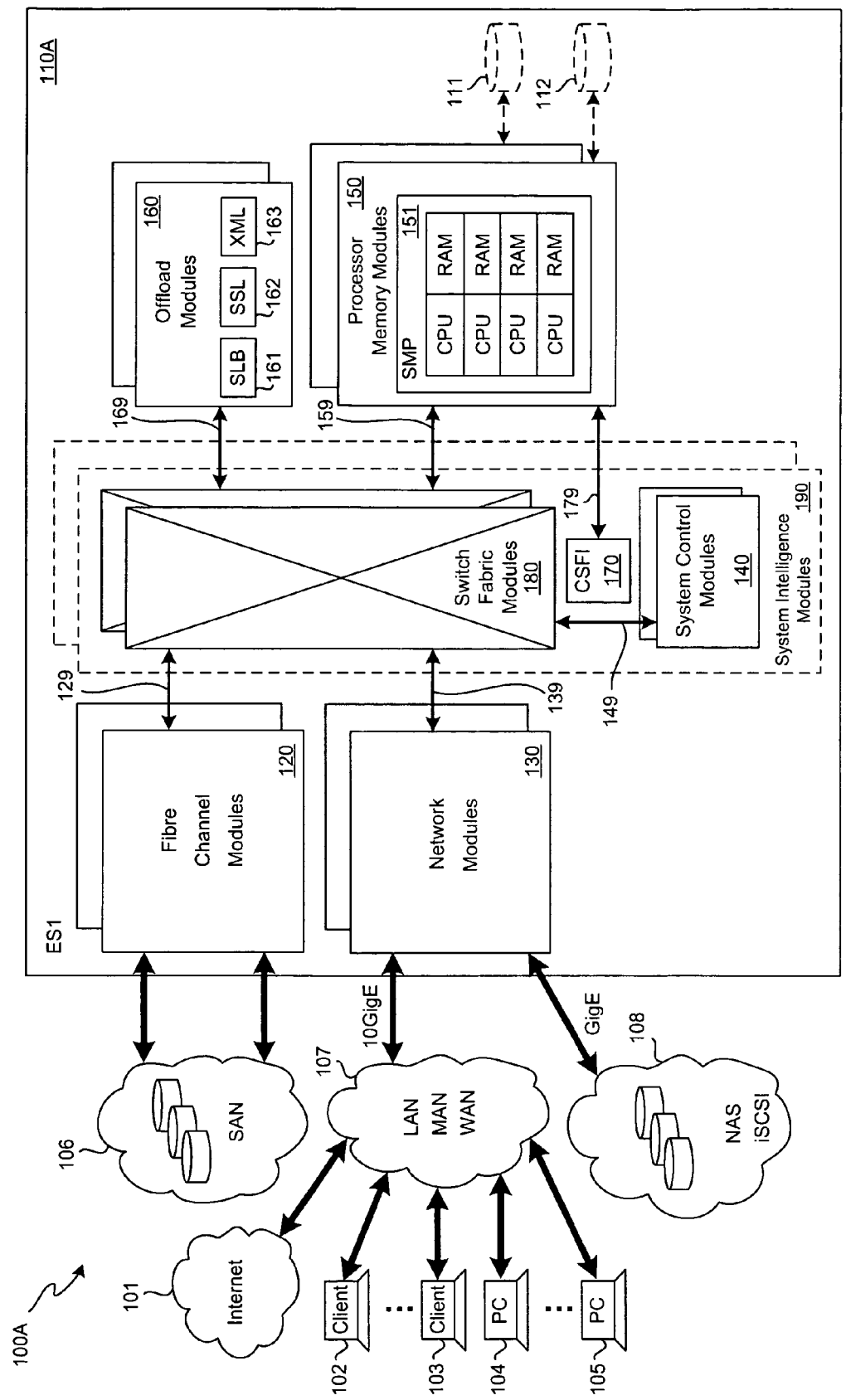
FIG. 1A illustrates a conceptual representation of an embodiment of an Enterprise Server (ES) system.

A detailed description of one or more embodiments of the invention is provided below along with accompanying figures that illustrate the principles of the invention. Some of the embodiments or variations thereof may be characterized as "notable." The invention is described in connection with the embodiments, which are understood to be merely illustrative and not limiting. The invention is expressly not limited to or by any or all of the embodiments herein (notable or otherwise). The scope of the invention is limited only by the claims appended to the end of the issued patent and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

A Small Computer System Interface (SCSI) transport for fabric backplane enterprise servers provides for local and remote communication of storage system information between storage sub-system elements of an ES system and other elements of an ES system via a storage interface. The transport includes encapsulation of information for communication via a reliable transport implemented in part across a cellifying switch fabric. The transport may optionally include communication via Ethernet frames over any of a local network or the Internet. RDMA and DDP protocols are used to communicate the information (commands, responses, and data) between SCSI initiator and target end-points. An FCM or an FCM/OLM may be operated as a SCSI target providing a storage interface to any of a PMM, an SCM, and an OLM operated as a SCSI initiator.

The initiator and the target may be SCSI over Transmission Control Protocol/Internet Protocol (iSCSI)-compatible. An initiator may be implemented in a PMM coupled to a switch fabric that is in turn coupled to a target implemented in a FCM. Storage traffic may be communicated as Small Computer System Interface (SCSI)- and iSCSI-compatible information (data and commands) on the switch fabric via cellifying input/output interface devices.

A SCSI transport remote storage interface enables fabric-backplane enterprise servers to access local and remote devices, including Fibre Channel (FC)-compatible storage devices, such as FC disks and Storage Attached Networks (SANs). Local devices are coupled to a local chassis including execution resources running processes accessing file systems implemented on the local devices. Remote devices are coupled to a remote chassis that is reachable from the local chassis via networking transport. A SCSI transport remote storage architecture enables transparent and interchangeable use of the local and remote devices, as if the devices were coupled directly to the execution resources via Host Bus Adapters (HBAs).

A hybrid server/multi-layer switch system architecture, referred to hereinafter as the Enterprise Fabric (EF) architecture, forms the basis for a number of ES chassis embodiments. Each ES embodiment includes one or more Processor Memory Modules (PMMs, each having a symmetric multi-processor complex), one or more Network Modules, and a System Intelligence Module (SIM). The SIM includes a cellified switching-fabric core (SF) and a System Control Module (SCM).

Each PMM has one or more resident VIOC adapters. Each VIOC is a specialized Input/Output (I/O) controller that includes embedded layer-2 forwarding and filtering functions and tightly couples the PMM to the SF. Thus the layer-2 switch functionality within the ES chassis is distributed throughout various pluggable modules (such as SIMs, NMs, and PMMs). Through the use of VIOC/VNIC device drivers, host operating system software (Host O/S) running on the PMMs is presented with a plurality of Virtual Network Interface Cards (VNICs). In some embodiments, each VNIC behaves as a high-performance Ethernet interface at the full disposal of the Host O/S. In other embodiments, at least some of the VNICs behave as high-performance FC HBAs.

The SCM is responsible for provisioning and overall system management. Via system control and management processes running on the SIM, the server and switch functionality of the ES chassis are provisioned via configuration files in accordance with respective requirements specified by server and network administrators. Configurable parameters for each server include the number of processors, memory, the number of VNICs, and VNIC bandwidth. Configurable parameters for the network include Virtual Local Area Network (VLAN) assignments for both Network Module ports and VNICs and Link Aggregation Group (LAG) definitions.

An ES system may be operated as one or more provisioned servers, each of the provisioned servers including capabilities as identified by a corresponding set of specifications and attributes, according to various embodiments. Typically the specifications (or constraints) and attributes are specified with a Server Configuration File. An ES system may be provisioned into any combination and number of servers according to needed processing and I/O capabilities. Each of these servers may include distinct compute, storage, and networking performance. Provisioned servers may be managed similar to conventional servers, including operations such as boot and shutting down.

One or more VNICs provide for communication among modules of Enterprise Server (ES) embodiments via a switch fabric dataplane. Processes executing on compute complexes of the servers exchange data as packets or messages by interfaces made available through VNICs. The VNICs further provide for transparent communication with network and storage interfaces. VNIC provisioning capabilities include programmable bandwidth, priority scheme selection, and detailed priority control (such as round-robin weights). In some embodiments, VNICs are implemented in VIOCs. In another aspect, VLANs enable access to Layer-2 (L2) and selected Layer-3 (L3) network functions while exchanging the packets and messages. VLAN identification is provided in each VNIC, and VLAN processing is partially performed in VIOCs implementing VNICs.

The compute complexes and interfaces are typically configured as pluggable modules inserted into a backplane included in a chassis. The switch fabric dataplane (sometimes simply referred to as "a dataplane") is accessible via the backplane (serving as a replacement for a conventional backplane bus), and hence ES embodiments are known as "fabric-backplane" enterprise servers. Various ES embodiments are comprised of varying numbers and arrangements of modules.

The EF architecture provides for provisioning virtual servers (also known as server-instances) with included virtual networks from underlying ES hardware and software resources. The EF architecture is applicable to application scenarios requiring dynamic combinations of compute, network, and storage performance and capabilities, and is a unifying solution for applications requiring a combination of computation and networking performance. Resources may be pooled, scaled, and reclaimed dynamically for new purposes as requirements change, using dynamic reconfiguration of virtual computing and communication hardware and software. This approach offers the advantages of reduced cost, as provisioning is "just-right" rather than over-provisioned. In addition, dynamic configuration allows for quick performance or scale modifications.

The EF architecture provides a radically different underlying server architecture compared to traditional multi-way Symmetric MultiProcessor (SMP) servers, including integrated fabric interconnectivity to enable high-bandwidth, low-latency I/O operation. Processing and I/O throughput are virtualized, providing scalable, coordinated resources. Partitioning and fail-over are hardware supported, including mechanisms for treating multiple virtual servers as a single managed entity, resulting in new high availability clustering and multi-site fail-over capabilities. Compared to a current network switch, networking capabilities are extended, including efficient RDMA, high-performance Direct Data Placement (DDP), and flexible resource pooling. Virtualized fabric services, such as Server Load Balancing (SLB), Secure Sockets Layer (SSL) protocols including Transport Layer Security (TLS) variants, eXtensible Markup Language (XML), and so forth, are also provided.

In some embodiments, a data center or other installation implemented in accordance with the EF architecture will include one or more ES chassis. In a first embodiment, the ES chassis capabilities include an 8-way SMP partition-configurable compute complex. These compute resources include a plurality of 64-bit x86 processing elements. The ES chassis hardware configuration is compatible with execution of software operating systems such as Linux and Microsoft Windows. Processing elements in the ES chassis are coupled to a low-latency high-bandwidth interconnect fabric via virtualized I/O functions, providing for efficient communication between processing elements and with network and FC interfaces coupled to the fabric. The virtualized I/O functions are distributed throughout the plurality of processing elements. Among the virtualized I/O functions, the ES chassis includes VNICs and VHBAs. Via these VNICs and VHBAs, the processing elements can selectively communicate with external networks coupled to any of several high-performance network interfaces (up to three 10 Gb Ethernet interfaces, or thirty 1 Gb Ethernet interfaces, in the first embodiment) and with several high-performance 2 Gb FC interfaces (up to eight per FCM in the first embodiment). Each VNIC/VHBA can be individually configured such that it appears to be coupled to a multi-port switch coupled to other of the VNICs/VHBA and to the network/storage interfaces. Alternatively, each VNIC/VHBA can be configured such that it appears to be directly coupled to one of the network/storage interfaces. Additional processing capabilities may be provided in the chassis in the form of offload cards (or pluggable boards or modules) supporting virtualized services, such as SLB, SSL, and XML processing.

The ES chassis is further configured with capabilities to provide for a high availability system, including modular components, hot-swap of components, and fully redundant components. Other high availability capabilities include multi-site fail-over and mainframe class Reliability, Availability, and Serviceability (RAS) features.

An ES system may be operated as one or more provisioned servers, each of the provisioned servers including capabilities as identified by a corresponding set of specifications and attributes, according to various embodiments. Typically the specifications (or constraints) and attributes are specified with an SCF (see the SCF and Related Tasks section, elsewhere herein). An ES system may be provisioned into any combination and number of servers according to needed processing and I/O capabilities. Each of these servers may include distinct compute, storage, and networking performance. Provisioned servers may be managed similar to conventional servers, including operations such as boot and shutting down (see the Server Operational States section, elsewhere herein).

The EF architecture further includes a Graphical User Interface (GUI) for configuration management. The GUI may be provided via a web browser, a network-based Java client, or some other related mechanism, according to various embodiments. The GUI provides role-based access and division of functions, and may be used as a single point of management for all EF system functions. System management personnel may use the GUI to control EF virtualized configuration and provisioning settings. Resource pooling and allocation of Central Processing Unit (CPU) and IO capabilities may be dynamically altered without requiring physical changes or re-cabling. Network and storage capabilities may be similarly dynamically modified, including Network Interface Controller (NIC), HBA, and bandwidth resources. Redundancy, fail-over and other RAS capabilities may also be configured via the GUI, including specific multi-site configuration information. Various embodiments may also include a Command Line Interface (CLI) with functions and capabilities similar to the GUI.

The GUI further provides functions for monitoring various aspects of the hardware and software performance and behavior of systems including each ES chassis. The monitoring functions are available for inspection of operations at several levels in the system, from top-level application performance to low-level network interconnect metrics.

The GUI provides hooks for integration of the functions provided therein into higher-level application software and standard applications, allowing for flexibility in specifying and monitoring the EF system configuration.

EF configuration management and monitoring may also be performed via other mechanisms. Alternate mechanisms include one or more command line interfaces, a scripting interface, and remote network-centric interfaces using standard capabilities provided for in Simple Network Management Protocol (SNMP) and Remote MONitoring (RMON).

Systems including EF capabilities may also provide for upgrades to installed software, including operating system software, application software, driver-level software, and firmware software. The upgrades may include updates to address security issues, to enable new or expanded functionality, or to repair incorrect operation (a "bug fix"). A variety of sources may provide upgrades, including EF vendors, or vendors of software installed or used in EF-based systems. Additionally, Independent Software Vendor (ISV) certifications of software associated with EF-based systems may also be performed.

Illustrative application usage scenarios include a first usage scenario including a first configuration adapted to replace a server (having an Operating System selected from a list including but not limited to Unix, Linux, Windows, etc.) or a collection of such servers. The first configuration provides for virtualization of data center capabilities, resource pooling, and consolidation of functions otherwise performed in a plurality of heterogeneous devices. Computing, networking, and services are completely virtualized, enabling dynamic deployment, scaling, and reclamation according to changing application requirements. Significant savings in capital and operating expense result.

A second usage scenario includes a second configuration adapted for I/O intensive applications. The second configuration provides high-bandwidth and low-latency storage and networking capabilities, enabling new classes of applications using fewer infrastructure components than currently possible. The high-bandwidth and low-latency capabilities are enabled in part by use of a high-bandwidth, low-latency fabric. Efficient intra-chassis communication is provided for in a transparent manner, enabling increased I/O bandwidth and reduced latency compared to existing solutions.

A third usage scenario includes a third configuration adapted for consolidating tiers in a data center application. The third configuration provides for collapsing the physical divisions in present 3-tier data centers, enabling solutions with fewer servers, a smaller number of network switches, and reduced needs for specialized appliances. The concepts taught herein provide for completely virtualized computing, networking, and services, in contrast to existing solutions addressing tiered data systems. Dynamic configuration enables pooling of resources and on-the-fly deploying, scaling, and reclaiming of resources according to application requirements, allowing for reduced infrastructure requirements and costs compared to existing solutions.

A fourth usage scenario includes a fourth configuration adapted for enhanced high availability, or RAS functionality, including multi-site fail-over capabilities. The fourth configuration provides for new redundancy and related architectures. These new architectures reduce set-up and configuration time (and cost), and also decrease on-going operating expenses. Modular components of the ES chassis are hot-swap compatible and all EF systems are configured with fully redundant components, providing for mainframe-class RAS functionality. Reduced networking latency capabilities enable enhanced multi-site fail-over operation.

The concepts taught herein thus enable simple, fast, straightforward, low-effort deployment of systems configured and provisioned for efficient execution of heterogeneous mixes of applications requiring varying computing, networking, and I/O processing resources. Application fail-over architectures are also readily enabled with little or no additional hardware, according to further dynamic partitioning features. Accordingly, Information Technology (IT) operations are reduced in complexity and cost.

The concepts taught herein consolidate multiple devices and tiers in data center operations, requiring fewer servers (in type and quantity), reduced supporting hardware, and smaller infrastructure outlays compared to systems of the current art. Significant reductions in the total cost of ownership are thus provided for by the concepts taught herein.

The concepts taught herein, ensure highly reliable and available compute, network, storage, and application resources while also dramatically improving storage and networking performance and reliability. True multi-site fail-over and disaster recovery are possible by use of the concepts taught herein, enabling new classes of I/O and high availability applications.

Illustrative Combinations

This introduction concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A first illustrative combination of a system including a fibre channel module adapted to transfer data as cells via a coupled switch fabric, the fibre channel module including a plurality of fibre channel compatible ports and control logic; and wherein the control logic is adapted to receive a transaction communicated via the switch fabric, the transaction being carried by one of a plurality of communication channels, and to select one of the fibre channel compatible ports according to transaction identification information included in the transaction.

A second illustrative combination of a system including a fibre channel module adapted to transfer data as cells via a coupled switch fabric, the fibre channel module including a plurality of fibre channel compatible ports and control logic; and wherein the control logic is adapted to receive transactions communicated via the switch fabric, the transactions being carried by at least a first one and a second one of a plurality of communication channels, and to select one of at least two of the fibre channel compatible ports according to respective transaction identification information included in each of the transactions.

The second illustrative combination wherein the control logic is further adapted to manage data communication between the first and the second communication channels respectively and the first and the second of the at least two fibre channel compatible ports.

The second illustrative combination wherein the first and the second of the at least two of the fibre channel compatible ports are enabled to interface to respective first and second storage devices. The foregoing illustrative combination wherein the respective transaction identification information included in each of the transactions carried by the first communication channel identifies the first storage device and the respective transaction identification information included in each of the transactions carried by the second communication channel identifies the second storage device. The foregoing illustrative combination further including the first and the second storage devices.

Any of the first and the second illustrative combinations wherein the control logic is further adapted to operate each of the communication channels to provide retransmission of data received out of sequence. The foregoing illustrative combination wherein the control logic is further adapted to provide handshake information to enable detection of the data received out of sequence. The foregoing illustrative combination wherein the handshake information includes an incrementing sequence number.

Any of the first and the second illustrative combinations wherein the control logic is further adapted to manage data transfer between at least two of the communication channels and the selected one(s) of the fibre channel compatible ports.

A third illustrative combination of any of the first and the second illustrative combinations wherein the fibre channel module further includes a plurality of queues to communicate data with the switch fabric. The third illustrative combination wherein the control logic is further adapted to manage data communicated between at least two of the queues and the selected one(s) of the fibre channel compatible ports.

The third illustrative combination wherein the control logic is further adapted to operate each of the queues to manage information transfer for a respective one of the plurality of communication channels. The third illustrative combination wherein the queues include ingress queues and the data communicated with the switch fabric includes data received from the switch fabric. The third illustrative combination wherein the queues include egress queues and the data communicated with the switch fabric includes data transmitted to the switch fabric.

A fourth illustrative combination of the third illustrative combination wherein the control logic is further adapted to operate the queues in groups, each of the queue groups to manage information transfer for a respective one of the plurality of communication channels. The fourth illustrative combination wherein each of the groups of queues includes a respective send queue. The fourth illustrative combination wherein each of the groups of queues includes a respective receive queue. The fourth illustrative combination wherein each of the groups of queues includes a respective status queue. The fourth illustrative combination wherein at least two of the groups of queues collectively include a single shared status queue.

A fifth illustrative combination of a system including a fibre channel module enabled to transfer storage traffic as cells via a coupled switch fabric, the fibre channel module including a plurality of fibre channel interfaces, and control logic; and wherein the control logic includes a state machine to manage a plurality of communication channels, each of the communication channels being used to communicate a respective portion of the storage traffic, and a transaction processing unit to map transactions included in the storage traffic to the fibre channel interfaces according to transaction identifiers included in the transactions.

The fifth illustrative combination wherein the control logic further includes data communication management logic to manage data communication between first and second ones of the communication channels respectively and first and second ones of the fibre channel interfaces. The fifth illustrative combination wherein the control logic further includes data communication management logic to manage data communication between first and second ones of the communication channels and a single one of the fibre channel interfaces.

A sixth illustrative combination of a system including a fibre channel module enabled to transfer storage traffic as cells via a coupled switch fabric, the fibre channel module including a plurality of fibre channel interfaces, and control logic; and wherein the control logic includes a state machine to manage a plurality of communication channels, each of the communication channels being used to communicate a respective portion of the storage traffic, and a transaction managing unit to manage transactions communicated via the communication channels with respect to the fibre channel interfaces according to transaction identifiers included in the transactions.

The sixth illustrative combination wherein the managing of transactions includes managing data communication between first and second ones of the communication channels respectively and first and second ones of the fibre channel interfaces. The sixth illustrative combination wherein the managing of transactions includes data communication between first and second ones of the communication channels and a single one of the fibre channel interfaces.

The sixth illustrative combination wherein the control logic further includes transaction mapping logic to map transactions included in the storage traffic to the fibre channel interfaces according to the transaction identifiers.

Any of the fifth and the sixth illustrative combinations wherein the control logic further includes channel control logic adapted to operate each of the communication channels to provide retransmission of data received out of sequence. The foregoing illustrative combination wherein the channel control logic is further adapted to provide handshake information to enable detection of the data received out of sequence. The foregoing illustrative combination wherein the handshake information includes an incrementing sequence number.

A seventh illustrative combination of any of the fifth and the sixth illustrative combinations wherein the fibre channel module further includes a plurality of queues to communicate data with the switch fabric. The seventh illustrative combination wherein the control logic further includes queue control logic adapted to manage data communicated between at least two of the queues and the fibre channel interfaces.

The seventh illustrative combination wherein the control logic further includes queue control logic adapted to operate each of the queues to manage information transfer for a respective one of the plurality of communication channels. The seventh illustrative combination wherein the queues include ingress queues and the data communicated with the switch fabric includes data received from the switch fabric. The seventh illustrative combination wherein the queues include egress queues and the data communicated with the switch fabric includes data transmitted to the switch fabric.

An eighth illustrative combination of the seventh illustrative combination wherein the control logic is further adapted to operate the queues in groups, each of the groups of queues to manage information transfer for a respective one of the plurality of communication channels. The eighth illustrative combination wherein each of the groups of queues includes a respective send queue. The eighth illustrative combination wherein each of the groups of queues includes a respective receive queue. The eighth illustrative combination wherein each of the groups of queues includes a respective status queue.

The eighth illustrative combination wherein at least two of the groups of queues collectively include a single shared status queue.

Any of the third and the seventh illustrative combinations wherein each of the queues includes a respective send sub-queue. Any of the first, second, fifth, and sixth illustrative combinations wherein each of the queues includes a respective receive sub-queue. Any of the first, second, fifth, and sixth illustrative combinations wherein each of the queues includes a respective status sub-queue. Any of the first, second, fifth, and sixth illustrative combinations wherein at least two of the queues collectively include a single shared status sub-queue.

Any of the first, second, fifth, and sixth illustrative combinations further including the switch fabric. Any of the first, second, fifth, and sixth illustrative combinations further including a network module coupled to the switch fabric and wherein the transaction(s) is(are) further communicated by the network module. Any of the first, second, fifth, and sixth illustrative combinations further including a mass storage device coupled to one of either the fibre channel compatible ports, if present, or the fibre channel interfaces, if present. The foregoing illustrative combination wherein the mass storage device is at least one of a magnetic disk drive and an optical disk drive.

Any of the first, second, fifth, and sixth illustrative combinations further including protocol conversion logic adapted to convert between data formatted for communication via the switch fabric and data formatted for communication to a fibre channel device. The foregoing illustrative combination wherein the protocol conversion logic includes a programmable processor. The foregoing illustrative combination further including a Direct Memory Access (DMA) controller having access to memory addressable by the programmable processor.

Any of the foregoing illustrative combinations having a network module wherein the network module includes a plurality of network interfaces. The foregoing illustrative combination further including a network coupled to one of the network interfaces.

Any of the foregoing illustrative combinations referring to a network module wherein at least one of the communication channels has an endpoint reachable via the network module. The foregoing illustrative combination wherein the at least one of the communication channels has another endpoint internal to the fibre channel module. The foregoing illustrative combination wherein the endpoint reachable via the network module is internal to a processor memory module.

Any of the foregoing illustrative combinations wherein the control logic includes at least one of a programmable processing element; a logic state machine; a Ternary Content Addressable Memory (TCAM); and Static Random Access Memory (SRAM).

Any of the foregoing illustrative combinations further including a processor memory module coupled to the switch fabric. The foregoing illustrative combination wherein the processor memory module includes a physically-partitionable symmetric multiprocessor. The foregoing illustrative combination wherein a plurality of physical partitions of the physically-partitionable symmetric multiprocessor are each operable as a terminus of a respective one of the communication channels. The foregoing illustrative combination wherein a single one of the physical partitions is operable as a terminus of one of the communication channels. The foregoing illustrative combination wherein the single one of the physical partitions is operable as a terminus of another one of the communication channels while also being operable as the terminus of the one of the communication channels.

Any of the foregoing illustrative combinations further including a fibre channel compatible storage element coupled to one of either the fibre channel compatible ports, if present, or the fibre channel interfaces, if present.

A ninth illustrative combination of a method including the steps of in a fibre channel module, receiving a transaction communicated as cells via a switch fabric, the transaction being carried by one of a plurality of communication channels; and selecting one of a plurality of fibre channel compatible ports implemented by the fibre channel module according to transaction identification information included in the transaction.

A tenth illustrative combination of a method including the steps of in a fibre channel module, receiving transactions communicated via a switch fabric, the transactions being carried by at least a first one and a second one of a plurality of communication channels; and selecting one of at least two of a plurality of fibre channel compatible ports implemented by the fibre channel module according to respective transaction identification information included in each of the transactions.

Any of the ninth and the tenth illustrative combinations further including managing data communicated between at least two of the communication channels and the selected one(s) of the fibre channel compatible ports.

An eleventh illustrative combination of any of the ninth and the tenth ICs further including operating each of a plurality of queues implemented in the fibre channel module to manage information transfer with the switch fabric for a respective one of the communication channels. The eleventh illustrative combination further including managing data communicated between at least two of the queues and the selected one(s) of the fibre channel compatible ports.

A twelfth illustrative combination of a method including the steps of in a fibre channel module, receiving transactions communicated via a switch fabric, the transactions being carried by a plurality of communication channels; and mapping the transactions to fibre channel interfaces provided by the fibre channel module according to transaction identification information included in the transactions.

The twelfth illustrative combination wherein the mapping includes mapping at least two of the transactions communicated via respective distinct ones of the communication channels to respective distinct ones of the fibre channel interfaces. The twelfth illustrative combination wherein the mapping includes mapping at least two of the transactions communicated via respective distinct ones of the communication channels to the same one of the fibre channel interfaces.

A thirteenth illustrative combination of a method including the steps of in a fibre channel module, receiving transactions communicated via a switch fabric, the transactions being carried by a plurality of communication channels; and managing the transactions with fibre channel interfaces provided by the fibre channel module according to transaction identification information included in the transactions.

A fourteenth illustrative combination of any of the twelfth and the Thirteenth ICs further including operating each of a plurality of queues implemented in the fibre channel module to manage information transfer with the switch fabric for a respective one of the communication channels.

Any of the ninth, tenth, twelfth, and Thirteenth illustrative combinations further including transferring the transaction(s) between a network module and the switch fabric.

Any of the ninth, tenth, twelfth, and Thirteenth illustrative combinations further including providing respective communication channel handshake information for each of the communication channels to enable detection of data received out of sequence.

A fifteenth illustrative combination of the ninth, tenth, twelfth, and Thirteenth illustrative combinations further including operating each of a plurality of queue-groups implemented in the fibre channel module to manage information transfer with the switch fabric for a respective one of the communication channels. The fifteenth illustrative combination wherein each of the queue-groups includes a respective send queue. The fifteenth illustrative combination wherein each of the queue-groups includes a respective receive queue. The fifteenth illustrative combination wherein each of the queue-groups includes a respective status queue. The fifteenth illustrative combination wherein at least two of the queue-groups collectively include a single shared status queue.

Any of the eleventh and the fourteenth illustrative combinations wherein the queues include ingress queues to receive information from the switch fabric. Any of the eleventh and the fourteenth illustrative combinations wherein the queues include ingress queues to provide information to the switch fabric.

Any of the eleventh and the fourteenth illustrative combinations wherein each of the queues includes a respective send sub-queue. Any of the eleventh and the fourteenth illustrative combinations wherein each of the queues includes a respective receive sub-queue. Any of the eleventh and the fourteenth illustrative combinations wherein each of the queues includes a respective status sub-queue. Any of the eleventh and the fourteenth illustrative combinations wherein at least two of the queues collectively include a single shared status sub-queue.

A sixteenth illustrative combination of any of the foregoing illustrative combinations wherein the communication channels are operable according to data transport via a reliable protocol. The sixteenth illustrative combination wherein the reliable protocol includes recognizing data loss by examining an incremented sequence number. The sixteenth illustrative combination wherein the reliable protocol includes flow-control. The sixteenth illustrative combination wherein the reliable protocol includes a sliding window to implement end-to-end flow-control.

Any of the foregoing illustrative combinations wherein each of the communication channels has a respective endpoint external to the fibre channel module. The foregoing illustrative combination wherein each of the communication channels has another respective endpoint internal to the fibre channel module.

Any of the foregoing illustrative combinations wherein the switch fabric is adapted to transport the cells according to respective priorities. Any of the foregoing illustrative combinations wherein the switch fabric is adapted to transport the cells according to a switch fabric flow-control protocol.

Any of the foregoing illustrative combinations wherein the communication channels are operable according to data transport via a Remote Direct Memory Access (RDMA) protocol or a Direct Data Placement (DDP) protocol. The foregoing illustrative combination wherein the data transport includes an STag identifying a region of memory included in the fibre channel module. The foregoing illustrative combination wherein the fibre channel module implements a Direct Memory Access (DMA) to the region of memory.

Any of the foregoing illustrative combinations wherein the modules are pluggable modules.

A seventeenth illustrative combination of a method including the steps of receiving cells via one of a plurality of reliable communication channels as storage information, the storage information having a transaction including a target address; selecting one of a plurality of fibre channel storage interfaces based at least in part on the target address; communicating some of the storage information to the selected fibre channel storage interface as storage frames; wherein each of the reliable communication channels is identified by a respective identifier; and wherein the target address includes one of the identifiers.

The seventeenth illustrative combination further including receiving network packets each having a respective network destination address; and forwarding some of the network packets as the cells, each of the cells having a respective cell destination address determined at least in part by the respective network destination address. The foregoing illustrative combination further including prior to the receiving cells, switching the cells according to the respective cell destination addresses. The foregoing illustrative combination wherein the receiving network packets is via a network module. The foregoing illustrative combination wherein the receiving network packets is via a plurality of network modules.

The seventeenth illustrative combination wherein the receiving cells includes reassembling and is according to a plurality of queues. The foregoing illustrative combination further including prior to the reassembling, switching the cells according to respective cell destination addresses.

The seventeenth illustrative combination wherein the communicating some of the storage information is via a fibre channel module. The foregoing illustrative combination wherein the communicating some of the storage information is via a plurality of fibre channel modules.

The seventeenth illustrative combination wherein each of the reliable communication channels is associated with one of a plurality of queues.

The seventeenth illustrative combination wherein the reliable communication channels are compatible with a Remote Direct Memory Access (RDMA) protocol. The seventeenth illustrative combination wherein the reliable communication channels are compatible with a Direct Data Placement (DDP) protocol The seventeenth illustrative combination wherein the target address further includes at least one of an Internet protocol compatible address and an Ethernet compatible address.

The seventeenth illustrative combination further including providing handshake information to enable detecting out of sequence data.

Any of the foregoing method illustrative combinations further including encapsulating at least a portion of data from the cells in fibre channel compatible frames. The foregoing illustrative combination wherein at least a portion of the encapsulating is via at least one of a programmable processor, and a logic state machine.

Any of the foregoing method illustrative combinations further including communicating storage information included in the transaction(s) with a fibre channel compatible storage element.

Any of the foregoing illustrative combinations referring to a fibre channel compatible storage element wherein the fibre channel compatible storage element includes at least one of a disk drive, a tape drive, a tape library, a storage array, a storage switch, a storage director, a storage router, a storage network, and a Storage Area Network (SAN)

Any of the foregoing illustrative combinations wherein the transaction(s) include(s) Small Computer System Interface (SCSI) compatible information. The foregoing illustrative combination wherein the SCSI compatible information includes at least one of a SCSI command, a SCSI request, a SCSI data payload, and a SCSI status response.

Enterprise Server System

FIG. 1A illustrates System 100A, a conceptual representation of an embodiment of an ES system. The system includes a particular ES chassis embodiment, ES1 110A, which is coupled to various other systems, including FC Storage Network 106, Generic Packet Network 107, and Ethernet Storage Network 108. FC Storage Network 106 provides mass storage via a collection of disks organized, for example, as a SAN. Generic Packet Network 107 conceptually includes arbitrary combinations of Local Area Network (LAN), Metro Area Network (MAN), and Wide Area Network (WAN) networks and typically includes Ethernet and Ethernet derivative links for coupling to Internet 101, an arbitrary number and arrangement of Client machines or servers, represented as Client 102 and Client 103, as well as an arbitrary number and arrangement of Personal Computers (PCs) or Workstations, represented as PC 104 and PC 105. Ethernet Storage Network 108 provides mass storage via a collection of disks organized in a Network Attached Storage (NAS) or iSCSI fashion.

ES1 110A includes a central I/O SFM (SFM 180) providing a switch fabric dataplane coupling for FCMs 120, NMs 130, SCMs 140, PMMs 150 (also known as Application Processor Modules), and OLBs 160, also known as AppLication Modules (ALMs). Cell-based communication is carried out over the switch fabric dataplane between the aforementioned elements coupled to it. In other words, the fabric functions as a cell-based switch. FCMs 120 include Fibre Channel Interfaces (FCIs) for coupling to FC standard storage devices and networks (such as SANs). NMs 130 include interfaces to standard network infrastructures. PMMs 150 include compute elements for execution of Application, Driver, and OS processes, via SMP clusters illustrated conceptually as SMP 151. A configurable Coherency Switch Fabric and Interconnect (CSFI 170) is included for partitioning or combining the CPU and Randomly Accessible read/write Memory (RAM) resources of PMMs 150. OLBs 160 include compute elements for execution of service processes, via various service acceleration modules. Service acceleration modules include SLB accelerator 161, SSL accelerator 162, and XML accelerator 163. SCMs 140 include compute elements for providing system management, controlplane (L2/L3 bridging and routing, for example), and load balancing processing for SFM 180 and the elements coupled to it. PMMs 150 also include FCIs for coupling to mass storage systems, such as Optional Local Disks 111-112, or SAN systems including mass storage.

In operation, Application, Driver, and OS processes are executed on PMMs 150 via CPU and RAM elements included in SMP 151. At least some of the data consumed and produced by the processes is exchanged in packets formatted as cells for communication on SFM 180. The data may include network data exchanged with Generic Packet Network 107 via NMs 130, and storage data exchanged with Ethernet Storage Network 108 via NMs 130 or FC Storage Network 106 via FCMs 120. The data may also include service data exchanged with OLBs 160 and SCMs 140, and other Application, Driver, or OS data exchanged with other elements of PMMs 150.

Data communicated on SFM 180 is not limited to data exchanged with PMMs 150, but may also include data communicated between any of the modules (or fabric clients) coupled to the fabric. For example, one NM may forward packets to itself or to another NM via the fabric. An NM may also exchange packets with an OLB for processing via the fabric. SCMs 140 may also exchange configuration and forwarding update information with VIOCs via VIOC Control Protocol (VIOC-CP) packets via the fabric. In some embodiments, SCMs 140 may also exchange selected system management, controlplane, and load balancing information with all modules coupled to the fabric via in-band packets communicated on the fabric.

In one embodiment, in conjunction with the VNIC functionality mentioned previously, a modified Ethernet Driver provides the illusion of local NIC functionality to Application, Driver, and OS processes locally executing on any of SCMs 140, PMMs 150, and OLBs 160. The NIC functionality can be configured to either appear to be coupled to a switch coupled to other NICs or appear to be coupled directly to one of the networking interfaces included on NMs 130. In another embodiment, this technique may be used to access networked storage devices (i.e., NAS subsystems) via the NMs 130.

As illustrated conceptually, SFM 180 includes a redundant pair of fabrics, with one of the pair typically configured as a Primary Fabric, while the other fabric is typically configured as a Redundant Fabric. SCM-Fabric coupling 149 represents two fabric dataplane couplings, a first Primary Coupling between a Primary SCM of SCMs 140 and the Primary Fabric, and a Redundant Coupling between a Redundant SCM of SCMs 140 and the Redundant Fabric. In one mode of operation, all dataplane traffic is carried on the Primary Fabric, managed by the Primary SCM, while the Redundant Fabric and the Redundant SCM are maintained in a hot-standby mode.

Further dataplane couplings to SFM 180 are illustrated conceptually as FCM-Fabric coupling 129, NM-Fabric coupling 139, PMM-Fabric coupling 159, and OLB-Fabric coupling 169. In FIG. 1A, each coupling is abstractly portrayed as a single line between each group of modules and the switch fabric. It will be understood that for the FCM, NM, and OLB modules, each module instance has a Primary Fabric coupling and a Redundant Fabric coupling. For the PMM, each PMM instance has two Primary Fabric couplings and two Redundant Fabric couplings.

All of the modules coupled to SFM 180 (FCMs 120, NMs 130, SCMs 140, PMMs 150, and OLBs 160) include fabric interface communication units for exchanging data as cells on the fabric. The details of this data exchange are described in more detail elsewhere herein.

In an illustrative embodiment, the components of ES1 110A are included on a plurality of pluggable modules adapted for insertion into and removal from a backplane while the server is powered-up and operational (although software intervention to cleanly shut down or start up various processes or functions may be required). The backplane forms portions of FCM-Fabric coupling 129, NM-Fabric coupling 139, CSFI-PMM coupling 179, PMM-Fabric coupling 159, and OLB-Fabric coupling 169. The Primary Fabric of SFM 180 and the associated Primary SCM of SCMs 140 are included on pluggable module Primary SIM as illustrated by SIMs 190. Similarly, the Redundant Fabric of SFM 180 and the associated Redundant SCM of SCMs 140 are included on pluggable module Redundant SIM of SIMs 190. All of the modules of FCMs 120, NMs 130, PMMs 150, and OLBs 160 are also configured as pluggable modules adapted for operation with the backplane.

Each PMM of PMMs 150 is physically-partitionable, i.e. configurable into one or more physical partitions. The physical partitioning of PMMs 150 and related modes of CSFI 170 are configured under program control. For example, PMMs 150 may be configured as a single SMP complex in conjunction with CSFI 170. The result is a first example of a physical partition. In a second example, each PMM of PMMs 150 may instead be configured individually as an independent SMP complex, resulting in a plurality of physical partitions, one for each PMM. In a third example, each PMM of PMMs 150 may instead be configured as a pair of SMP complexes, resulting in two physical partitions per PMM. In various embodiments, CSFI 170 may be implemented as any combination of simple interconnect, coherency logic, and switching logic, operating in conjunction with any combination of interconnect and logic included on PMMs 150. Some of these embodiments are discussed in more detail later herein.

ES1 110A, as illustrated, is representative of a number of embodiments configured with various Modules to provide differing amounts of storage and network interface capability (connectivity and bandwidth), as well as differing levels of compute capability (cycles and memory). Typically, each embodiment includes at least a redundant pair of Switch Fabrics and associated System Intelligence Modules (for communication between Modules), at least one Processor Memory Module (for execution of Application, Driver, and OS processes), and at least one Network Module (for communication with external agents). Some embodiments may optionally further include any combination of additional Modules to provide additional interface and compute capability, up to the physical limits of the particular implementation. For example, additional Network Modules may be included in an embodiment to provide additional network bandwidth or connectivity. One or more Fibre Channel Modules may be included in an embodiment to provide additional storage bandwidth or connectivity. Additional Processor Memory Modules may be included to provide additional compute cycles or memory. One or more Offload Modules may be included to provide additional service compute cycles or memory, and these Offload Modules may each be individually configured with any combination of SLB, SSL, and XML accelerators.

In the embodiments represented by ES1 110A, communication between the Modules via SFM 180 is independent of the manner and arrangement of the Modules. All of the Modules communicate as peers on SFM 180 and interface to the fabric in a similar manner.

System 100A is also representative of a variety of system embodiments, for example, differing in the number, type, and arrangement of storage and network systems coupled to ES1 110A. For example, any combination of Optional Local Disks 111-112 may be included. Generic Packet Network 107 may include any combination of LAN, MAN, or WAN elements. FCMs 120 may be coupled to a single SAN, or a plurality of SANs. NMs 130 may be coupled to a plurality of networks or storage systems. Couplings between ES1 110A and other systems is limited only by the number and type of interfaces and physical couplings available according to implementation.

Figure 1B:
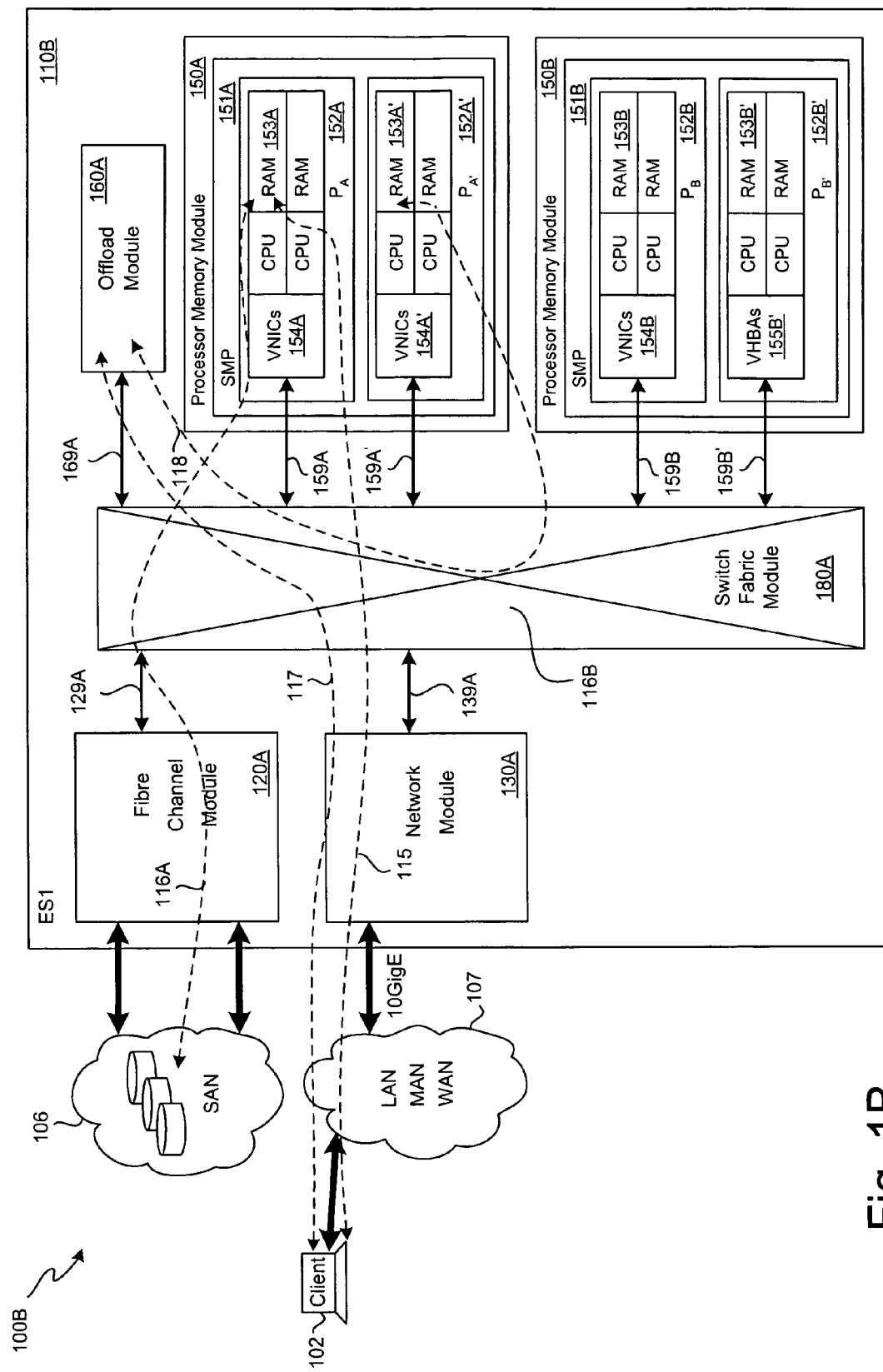
FIG. 1B illustrates a conceptual representation of selected details of data transfer in an embodiment of an ES system.

FIG. 1B illustrates System 100B, a conceptual representation of selected details of data transfer in an embodiment of an ES system. An ES chassis embodiment, illustrated as ES1 110B, is coupled to FC Storage Network 106 and Ethernet Network 107, as described elsewhere herein. In the illustrated embodiment, various modules of each type (FCM 120A, NM 130A, PMM 150A, PMM 150B, and OLB 160A) are coupled to Primary Switch Fabric Module 180A, via FCM-Fabric coupling 129A, NM-Fabric coupling 139A, PMM-Fabric couplings 159A/159A' and 159B/159B', and OLB-Fabric coupling 169A, respectively. FCM 120A provides interfaces for storage network couplings (such as used for SCSI transport), including a coupling for FC Storage Network 106. NM 130A provides interfaces for network couplings, including a coupling for Ethernet Network 107, coupled in turn to Client 102. In this illustrative scenario, PMM 150A is configured as a first and a second physical partition. The first physical partition includes SMP Portion $P_A$ 152A, having RAM 153A, and is coupled by PMM-Fabric coupling 159A (via VNICs 154A) to the fabric dataplane. The second physical partition includes SMP Portion $P_{A'}$ 152A', having RAM 153A', and is coupled by PMM-Fabric coupling 159A' (via VNICs 154A') to the fabric dataplane. PMM 150B is similarly configured as two physical partitions (SMP Portion $P_B$ 152B and SMP Portion $P_{B'}$ 152B'), having respective fabric couplings 159B/159B' implemented via VNICs 154B and VHBAs 155B', respectively. Note: several elements have been omitted from the figure for clarity, including the SCMs, the Redundant Fabric, the CSFI, and optional SANs.

Several illustrative data transfer paths are shown, including Client-Server Data Exchange 115, Storage-Server Data Exchange 116A, SCSI Transport Data Exchange 116B, Client-Service Data Exchange 117, and Service Data Exchange 118. Each path illustrates the movement of data between two clients of the switch fabric. Consider now three embodiments, described from the perspective of these clients. In one embodiment, data is organized as packets transferred via a stateless connection-free (and unreliable) protocol. In another embodiment, data is organized as messages, and transferred via a connection-oriented reliable message protocol. In yet another embodiment, data is selectively organized as either packets or messages.

The underlying fabric transport process is transparent to the clients and external devices coupled to the system and to most of the host software processes on the PMMs and OLBs. As described in more detail elsewhere herein, to external network devices, each port of each NM acts as a switch port of a virtualized high-performance L2/L3 switch. As will be discussed in further detail elsewhere herein, the switch has advanced VLAN and classification functionalities. The VLAN functionality provides for selectively coupling or isolating the network segments coupled to each switch port. Each segment associated with an NM port may have one or more external physical network devices as in any conventional network segment. The classification functionality provides for special forwarding treatments in accordance with a variety of attributes of the Ethernet frames received from external network devices on the ports of the NMs. Select software processes running on the PMMs and OLBs are provided the illusion that they are coupled via high-performance Ethernet network interfaces to dedicated ports of the VLAN-enabled switch. Connectivity between the different network segments may be flexibly and arbitrarily configured through VLAN management.

In systems having FCMs, a virtualized FC switch is similarly presented to external FC devices. Likewise, certain software processes running on the PMMs are provided the illusion they are coupled to the FC switch via high-performance FC interfaces. Multiple VLANs and multiple FC networks can simultaneously co-exist on top of the fabric transport infrastructure while being completely logically separate and secure.

The underlying fabric transport process is discussed in more detail elsewhere herein, but it will now be briefly overviewed. The fabric supports the transparent transport of both packets and messages. Here, "packets" refers to conventional Ethernet frames sent via some connectionless protocol that does not have integral support for reliable delivery. The term "messages" refers to one or more data transfers of quasi-arbitrarily sized data blocks reliably delivered over a logical connection established between end-points. Packets are transported over the fabric using "fabric packets," while messages are transported over the fabric using "fabric messages." Both fabric packets and fabric messages make use of highly similar fabric frames. A fabric packet is comprised of a single fabric frame, sent over the fabric without any connection or reliable delivery support. In contrast, fabric messages are comprised of (potentially quite long) sequences of fabric frames, sent over the fabric using a connection-oriented reliable delivery protocol. Some of the fabric frames of a fabric message are for transfer of the message data blocks while other fabric frames are used for control to set up and take down connections and to implement reliable delivery (e.g., via handshake and re-delivery attempts).

Thus fabric messages require additional fabric frames for messaging control beyond the fabric frames required to transport the message data. Furthermore, the fabric frames of fabric messages require additional processing at the source and destination ends related to the management of reliable delivery, connections, and the fragmentation (segmentation) and reassembly of data blocks. Nevertheless, the transport over the fabric of individual fabric frames is essentially the same for both fabric messages and fabric packets. Since all sources and destinations on the fabric have support for processing fabric packets and fabric messages, those of ordinary skill in the art will understand that all of the data exchange illustrations below that describe the transport of packets using fabric packets are equally applicable to the transport of messages using fabric messages.

The Ethernet frames of the packets to be transported over the fabric may originate in external clients or devices coupled to the NM ports or from within the various processing modules. During processing by the NM or the VIOC, respectively, a fabric packet is formed to contain the data of each original Ethernet frame plus additional information to facilitate transport over the fabric. During the fabric packet formation, the protocol field (Ether-type) of the original Ethernet frame is examined. The fabric packet is generally labeled (tagged) in accordance with the Ether-type and other information found in the original packet. E.g., if the original Ethernet frame is an IP type frame, the fabric packet is identifiable as an "IP fabric packet." IP fabric packets are evaluated for L3 forwarding (a.k.a. IP forwarding) based upon their included destination IP address. Otherwise, non-IP fabric packets are evaluated for L2 forwarding based upon their included MAC destination address (MACDA). L2/L3 forwarding is overviewed next.

During the fabric packet formation a forwarding decision is made that determines a fabric destination address that is embedded in the fabric packet. The embedded fabric destination address controls how the fabric packet is delivered to destinations within the system. The fabric destination address includes a specification for an egress port of the switch fabric. When multiple sub-ports (corresponding to multiple L2 or L3 destination addresses) are associated with a single egress port, the fabric destination address will also include a fabric sub-address to specify a particular one of the sub-ports.

The fabric packet is subsequently cellified (segmented into cells) and presented to an ingress port of the switch fabric. Each cell includes the fabric destination address and the cell is transferred by the switch fabric to the egress port specified by the fabric destination address. After being received by the module coupled to the specified egress port, the cells are reformed into a representation of the original Ethernet frame prior to presentation to the destination. If the module at the egress port has multiple sub-ports, the module will use the included fabric sub-address to further direct the reformed Ethernet frame to the specified sub-port.

In L2 forwarding, the VLAN assignment of the network port or processing module from which the original Ethernet frame was sourced is also used with the MACDA in determination of the fabric destination address. The determination is by way of a lookup in an L2 Forwarding Information Base (L2 FIB). As discussed elsewhere herein, an L2 FIB is implemented for each VIOC and NM in the system using any combination of Ternary Content Addressable Memory (TCAM)/Static Random Access Memory (SRAM) structures and search engines, according to embodiment. The L2 forwarding decision is thus implemented completely within the module where the original Ethernet frame was sourced and the next fabric destination is the module most directly associated with the MACDA of the original Ethernet frame.

General L3 forwarding (i.e., to destinations beyond the IP sub-net of the source IP) requires access (on the same L2 sub-net as the source) to at least one gateway IP interface and associated L3 FIB. The number and location of gateway IP interfaces and L3 FIBs varies by embodiment. In a first L3 embodiment, a gateway IP interface and L3 FIB is implemented external to the system chassis. In the first L3 embodiment, there is no gateway IP interface or L3 FIB on any NM or VIOC and the system hardware does not provide any L3 forwarding assists. That is, the external gateway IP interface and L3 FIB are not aware of the fabric transport process and function conventionally to provide the Ethernet MACDA of the next hop. In a second L3 embodiment, at least one gateway IP interface is implemented via a media port (physical port) or pseudo-port (virtual port) somewhere on at least one NM and an L3 FIB is implemented within each NM having a gateway IP interface. In the second L3 embodiment, there is not a gateway IP interface or L3 FIB on any VIOC. The gateway IP interface is only visible from inside the chassis if implemented on a pseudo-port. The gateway IP interface is visible from inside and outside the chassis if implemented on a media port. Combinations of multiple gateway IP interfaces, some on media ports and others on pseudo ports, are envisioned. In a third L3 embodiment, a gateway IP interface is implemented somewhere on at least one NM and for each VNIC, and an L3 FIB is implemented within each NM and VIOC. Gateway IP interfaces and L3 FIBs implemented within the chassis are fabric packet aware and assist L3 forwarding by providing the fabric destination address of the next hop.

In the second and third L3 embodiments, L3 FIB management processes maintain a master L3 FIB in the SCM and maintain coherency between all L3 FIBs in the chassis. When a non-master L3 FIB encounters a destination IP address that has no corresponding entry, the IP fabric packet undergoing the forwarding decision is forwarded as an "exception packet" to the controlplane process executing on the Primary SCM. The controlplane process determines the proper fabric address for the missing entry, propagates a new entry to all of the L3 FIBs, and forwards the IP fabric packet to the destination IP (or at least one hop closer) using the newly learned fabric address. (Fabric frames exist for a single cellified hop across the fabric between fabric source and fabric destination. In the above and the following it will be understood that when an IP fabric packet is "forwarded" via an indirection or hop via an gateway IP interface or the Primary SCM, the IP fabric packet is being re-instantiated into a new fabric frame for each traverse across the fabric.)

In accordance with the foregoing, depending upon embodiment and within which module an IP packet is first processed, an IP fabric packet may first undergo an indirection to an IP gateway interface, possibly on a different port or pseudo port on the same or a different module or external to the system. All transport is by conventional Ethernet frames outside the chassis and by fabric frames within the chassis. Once at an IP gateway interface, the destination IP address of the original Ethernet frame is used to associatively access the L3 FIB and the lookup result is used to forward the IP packet to the IP destination (or at least one hop closer).

Those of ordinary skill in the art will understand that for IP packet transfers over the fabric, generally a gateway IP interface must be involved. In the following illustrated data exchanges, the paths are drawn for scenarios that do not require additional indirection. Nevertheless, it will be understood that if an IP packet is received at an interface that is neither the IP destination address or a gateway IP interface, then generally the corresponding data exchange path is modified by interposing an intermediate hop to a gateway IP interface. Furthermore, when an IP packet is received at a gateway IP interface, either directly or as part of an indirection from a non-gateway IP interface, in the relatively rare event that there is a miss in the associated L3 FIB, the corresponding data exchange path is modified by interposing an intermediate hop to the Primary SCM. As previously indicated, Primary SCM controlplane processing services the miss in the master L3 FIB and updates the L3 FIBs throughout the chassis. Once the miss is serviced, the Primary SCM forwards the IP packet toward the originally intended destination. Thus, while not a frequent occurrence, for some IP fabric packets two intermediate hops are interposed in the data exchange paths: a first intermediate hop to a gateway IP interface and a second intermediate hop to the Primary SCM.

In at least L3 forwarding, the classification functionality of the NMs facilitates more sophisticated forwarding decisions, special data manipulation, and other data treatments, to be optionally performed as a function of additional attributes of the network data traffic encountered. In one particular example that will be examined in more detail elsewhere herein, the fabric destination address for IP fabric packets is at least in part determined by the recognition of particular service requests (and the lack thereof) embedded in the data traffic. More specifically, the service request recognition takes the form of recognizing particular Transmission Control Protocol/Internet Protocol (TCP/IP) destination ports corresponding to particular applications. The L2 and L3 FIBs are also updated dynamically, both in response to changes in the network configuration and optionally for dynamic performance optimization, such as to achieve load balancing among the processing resources of the system.

For the sake of clarity in the below initial expositions for each of the data exchanges illustrated by FIGS. 1B and 2, the foregoing details of the transport process just described will be understood to apply, but will not be repeated. It will also be understood that even though the data exchanges are described from a flattened perspective that includes operations by the clients, the modules, and the switch fabric, the underlying above described fabric transport process (and the associated management of the L2 and L3 FIBs) remains transparent to the external clients, external devices, and internal host software processes. These clients, devices and host software processes are only aware of packets and messages (and not the fabric packets or fabric messages).

The data exchanges will be described in terms of more than one type of packet. References to packet transmission, packets originating from the client, incoming packets, received packets, reassembled packets, or simply packets, are references to Ethernet frames. It will be understood that all such Ethernet frames are transported across the fabric via the process of fabric packet encapsulation, cellification, switch fabric traversal, and reassembly. References to augmented packets or cellified packets are references to fabric packets. References to cells or cellified packets being forwarded refers to the providing of fabric-addressed cells to the switch fabric for transfer by the switch fabric to the module coupled to the switch fabric egress port specified by the fabric address.

In each data exchange description, generic exchanges are purposefully not explicitly characterized as being of the IP or non-IP type. It will be understood that each of these data exchanges is generally equally applicable to the exchange of IP fabric packets or non-IP fabric packets. If IP packets are being exchanged, then the forwarding is understood to be L3 forwarding. Otherwise, the forwarding is understood to be L2 forwarding. Again for the sake of clarity in the following initial expositions, some details of the data exchanges, such as the handling of multicast, are deferred to elsewhere herein.

Client-Server Data Exchange 115 includes packet transmission from Client 102 via Ethernet Network 107 to NM 130A. Since the system may in part be providing the functionality of an L2/L3 switch for any of many network segments, packets received in close time proximity by NM 130A may be for any of multiple destinations both internal and external to the system. The incoming packets are classified, formed into fabric packets, subjected to a forwarding decision to determine a fabric address, and selectively provided as cells to Primary Switch Fabric Module 180A via a fabric ingress port associated with NM-Fabric coupling 139A. Based in part on the classification, NM 130A addresses the cells to PMM 150A, and more specifically to SMP Portion $P_A$ 152A, as a result of the forwarding decision identifying the fabric egress port associated with PMM-Fabric coupling 159A as the destination fabric addresses for the cells. Primary Switch Fabric Module 180A then transfers the cells to the fabric egress port associated with PMM-Fabric coupling 159A. SMP Portion $P_A$ 152A receives the cells and reassembles them into received packets corresponding to the packets originating from Client 102. The received packets are formed directly in RAM 153A, typically via DMA write data transfers. Return packets follow the flow in reverse, typically beginning with DMA read transfers from RAM 153A. Although Client-Server Data Exchange 115 has been described from the perspective of packets "originating" from Client 102 and return traffic flowing in reverse, this is only for illustrative purposes. The flow from Client 102 to SMP Portion $P_A$ 152A is entirely independent of the flow in the other direction.

Not all packets received from Client 102 via Ethernet Network 107 are destined to SMP Portion $P_A$ 152A. For example, Client-Service Data Exchange 117 illustrates cellified packets selectively forwarded by NM 130A toward OLB 160A via NM-Fabric coupling 139A, Primary Switch Fabric Module 180A, and OLB-Fabric coupling 169A. Based in part on the classification, packets from Client 102 are determined to require transfer to OLB 160A (instead of other fabric clients, such as SMP Portion $P_A$ 152A as in Client-Server Data Exchange 115). NM 130A addresses the corresponding cells to OLB 160A and executes a forwarding decision identifying the fabric egress port associated with OLB-Fabric coupling 169A as the fabric destination address for the cells. Primary Switch Fabric Module 180A then transfers the cells to the fabric egress port associated with OLB-Fabric coupling 169A. OLB 160A receives the cells and reassembles them into received packets directly into a RAM local to the OLB. Return packets follow the flow in reverse.

In some embodiments, messages are used to implement FC storage transactions. Storage-Server Data Exchange 116A includes establishing a reliable end-to-end logical connection, directly reading message data from RAM 153A (included in SMP Portion $P_A$ 152A), fragmenting (as required) the message data into fabric frames, and providing corresponding cells addressed to FCM 120A via PMM-Fabric coupling 159A. As a result of a forwarding decision, the cell destination addresses specify the fabric egress port associated with FCM-Fabric coupling 129A. For each fabric frame sent, the cells are transferred, received, and reassembled in a manner similar to that described for fabric packets in conjunction with Client-Service Data Exchange 117, via functions implemented in VNICs 154A. The storage transactions are provided via a storage network coupling to at least one storage device of external Storage Network 106. In some embodiments, if more than one storage network and associated storage network coupling is associated with FCM 120A, the particular storage network coupling is specified via a fabric sub-address portion of the cell destination address. Returning storage transaction responses follow the flow in reverse.

In some embodiments, messages are used to implement SCSI transport transactions, including communications with FC-compatible storage devices. SCSI Transport Data Exchange 116B includes operating an end-to-end logical connection (via a reliable transmission protocol, for example), directly reading storage information (such as SCSI commands and data) from RAM 153B' (included in $P_{B'}$ 152B'), fragmenting (as required) the information into fabric frames, and providing corresponding cells addressed to FCM 120A via PMM-Fabric coupling 159B'. As a result of a forwarding decision, the cell destination addresses specify the fabric egress port associated with FCM-Fabric coupling 129A. For each fabric frame sent, the cells are transferred, received, and reassembled in a manner similar to that described for fabric packets in conjunction with Client-Service Data Exchange 117, via functions implemented in VHBAs 155B'. The functions may include any combination of bandwidth control, management, allocation, and partitioning, according to various embodiments. The storage information is provided via a storage network coupling to at least one storage device of external Storage Network 106. In some embodiments, if more than one storage network and associated storage network coupling is associated with FCM 120A, the particular storage network coupling is specified via a fabric sub-address portion of the cell destination address. Returning storage information follows the flow in reverse.

Service Data Exchange 118 is similar to Client-Service Data Exchange 117. Packet data is read from RAM 153A' (included in SMP Portion $P_{A'}$ 152A'), and cells are forwarded to OLB 160A by a forwarding decision specifying the fabric egress port associated with OLB-Fabric coupling 169A as the cell destination addresses. The packets exchanged by Client-Server Data Exchange 115, and Client-Service Data Exchange 117, and Service Data Exchange 118, are typically but not necessarily IP packets.

In some embodiments, Data Exchanges 115-118 are overlapped or partially concurrent with each other. For example, cells corresponding to a portion of Client-Server Data Exchange 115 traffic may be intermixed with cells relating to Client-Service Data Exchange 117 traffic, as the cells from both data exchanges are coupled via NM-Fabric coupling 139A to the fabric. However, each cell includes sufficient information in the corresponding fabric destination address and other information to specify the proper operation. For example, at NM-Fabric coupling 139A, cells of Client-Server Data Exchange 115 are forwarded to SMP Portion $P_A$ 152A by a first forwarding decision specifying the fabric egress port associated with PMM-Fabric coupling 159A, while cells of Client-Service Data Exchange 117 are forwarded to OLB 160A by a second forwarding decision specifying the fabric egress port associated with OLB-Fabric coupling 169A. Similarly, cells from Client-Service Data Exchange 117 and Service Data Exchange 118 may be intermixed on OLB-Fabric coupling 169A, because sub-port destination address and other information in the cells enable proper processing. In one embodiment, a portion of the sub-port destination address is used to associate packets with a respective input queue within the destination module.

In some embodiments, the termini of Data Exchanges are located in RAM that is directly accessible by one or more processing elements. For example, Service Data Exchange 118 includes a first terminus in RAM 153A', and a second terminus in a RAM within OLB 160A. In typical embodiments, packet data from the RAMs are read and written by DMA logic units included in each of the respective modules. Conceptually, data is streamed from a source RAM as packets, cellified and provided to the fabric, transferred to the egress port as specified by the cells, reassembled, and stored into a destination RAM in packet form. These operations, in some embodiments, are fully overlapped, or pipelined, so that data from a first cell of a packet may be stored into the destination RAM while data from a following cell of the same source packet is being read from the source RAM.

Packet and Process Data Flow

Figure 2:
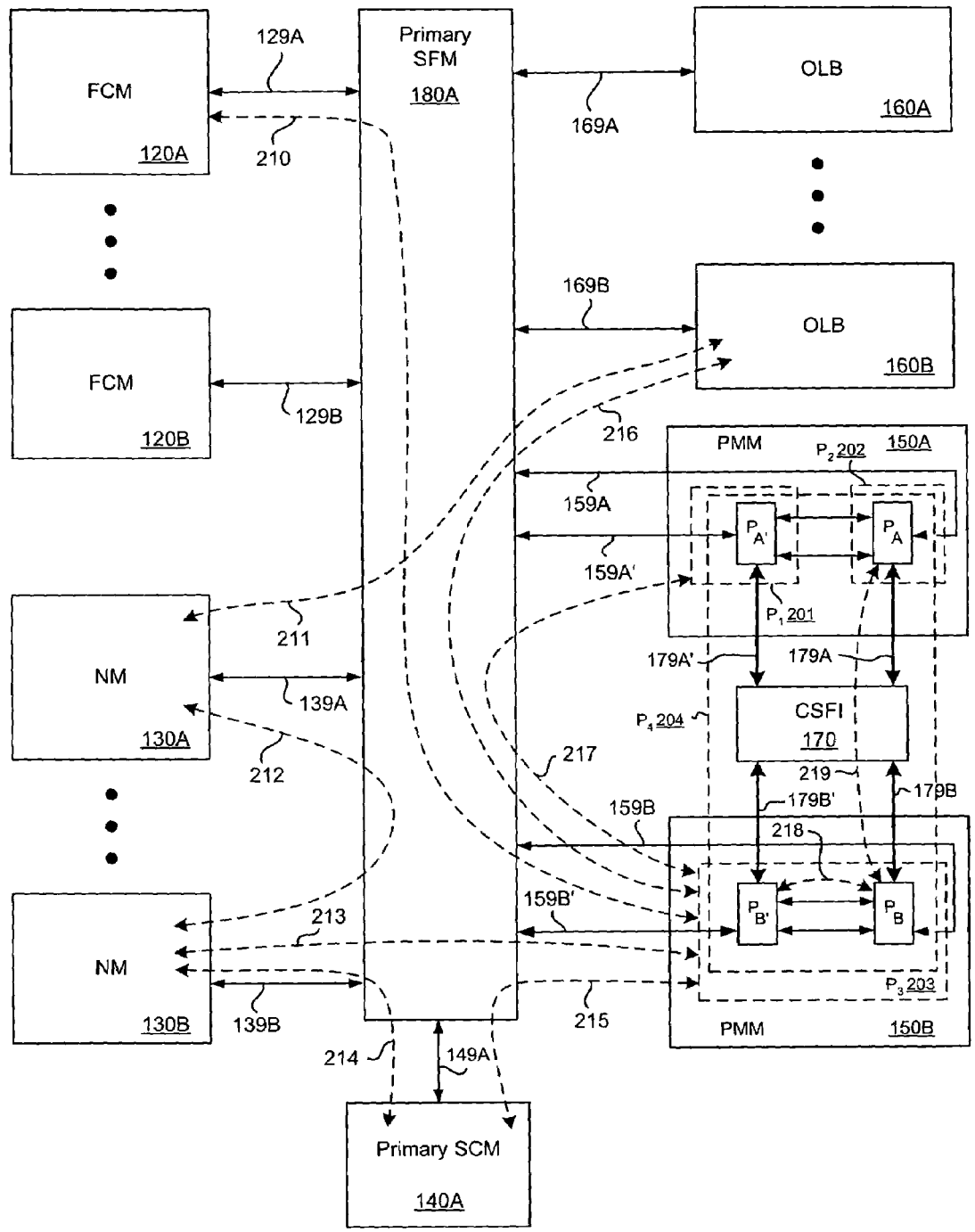
FIG. 2 illustrates various example embodiments of packet and process data flow in an ES embodiment.

FIG. 2 illustrates various example embodiments of packet and process data flow in an ES1 110A embodiment. A plurality of FCMs are illustrated by FCM 120A and FCM 120B, coupled to Primary Switch Fabric Module 180A via FCM-Fabric coupling 129A and FCM-Fabric coupling 129B, respectively. A plurality of NMs are illustrated by NM 130A and NM 130B, coupled to Primary Switch Fabric Module 180A via NM-Fabric coupling 139A and NM-Fabric coupling 139B, respectively. A plurality of PMMs are illustrated by PMM 150A and PMM 150B, coupled to Primary Switch Fabric Module 180A by PMM-Fabric couplings 159A/159A' and PMM-Fabric couplings 159B/159B', respectively. CSFI 170 is coupled to PMM 150A and PMM 150B by CSFI-PMM coupling 179A and CSFI-PMM coupling 179B, respectively. A plurality of OLBs are illustrated by OLB 160A and OLB 160B, coupled to Primary Switch Fabric Module 180A by OLB-Fabric coupling 169A and OLB-Fabric coupling 169B. Note: the Redundant SIM and associated couplings are omitted from the figure for clarity.

It will be understood that each of the active FCMs and NMs of FIG. 2 are typically, but not necessarily, coupled to external devices on external networks as illustrated in FIGS. 1A and 1B. It remains the case that all transport is by conventional Ethernet frames outside the chassis and by fabric frames within the chassis. Nevertheless, when such external devices or networks are involved, the termini of FCM-related and NM-related packet and message data exchanges may be considered from a certain perspective to extend to those external devices. However, even with coupled external devices, exchanges for at least some fabric frames related to system management and control will terminate within the various modules. Furthermore, in certain embodiments and scenarios, including scenarios with external devices, certain non-control data exchanges terminate within the NMs. Specifically, for the case of fabric IP packets unicast to the IP gateway interface on a pseudo port within an NM, the data exchange to the pseudo port terminates within the NM and is not visible externally.

As a first illustrative configuration scenario, PMM 150A is shown configured as two physical partitions, $P_1$ 201, and $P_2$ 202, while PMM 150B is shown configured as a single physical partition $P_3$ 203. As a second illustrative configuration scenario, mutually exclusive with respect to the first configuration scenario, PMM 150A and PMM 150B are shown configured as a single unified physical partition $P_4$ 204.

FCM-PMM Data Exchange 210 is representative of data exchanged between a storage sub-system coupled to an FCM and a PMM, or more specifically a physical partition of a PMM. As illustrated, this traffic is typically storage related messages between processes executing on $P_3$ 203 of PMM 150B (including any of Application, Driver, or OS Processes) and an external storage sub-system (such as SAN 106 of FIG. 1B). In operation, bidirectional message information flows as cellified fabric frames via FCM-Fabric coupling 129A, Primary Switch Fabric Module 180A, and PMM-Fabric coupling 159B. For example, a storage sub-system request is generated by a storage sub-system Driver process executing on $P_3$ 203. The request is formed as a storage sub-system message addressed to the external storage sub-system coupled to FCM 120A, and delivered as cellified fabric frames to Primary Switch Fabric Module 180A via PMM-Fabric coupling 159B. Primary Switch Fabric Module 180A routes the cells to FCM-Fabric coupling 129A.

FCM-Fabric coupling 129A delivers the cellified fabric frames to FCM 120A. In turn the cells of each fabric frame are reconstituted (or reconstructed) into the original storage sub-system message request, which is then sent to the storage sub-system attached to FCM 120A (such as FC Storage Network 106 of FIG. 1B, for example). The storage sub-system returns a response message, which is formed by FCM 120A into one or more fabric messages addressed to $P_3$ 203. The fabric messages are fragmented into fabric frames that are delivered as cells to Primary Switch Fabric Module 180A via FCM-Fabric coupling 129A. Primary Switch Fabric Module 180A routes the cells via PMM-Fabric coupling 159B to $P_3$ 203 of PMM 150B. $P_3$ 203 reconstitutes the cells into fabric frames, then reassembles and delivers the response message to the storage sub-system Driver process executing on $P_3$ 203.

In various embodiments, FCM-PMM Data Exchange 210 may flow via PMM-Fabric coupling 159B' instead of 159B, or it may flow partially via PMM-Fabric coupling 159B and partially via PMM-Fabric coupling 159B'. The operation is similar for these cases, as the fabric messages may be forwarded to $P_3$ 203 via 159B and 159B' with no other change in operation.

NM-OLB Data Exchange 211 is representative of data exchanged between an NM and a service process executing on an OLB. NM 130A receives information, typically but not necessarily in IP packet form, from an external coupled client (such as Client 102 of FIG. 1B), and classifies the packets, in part to determine a subset of the packets to be sent to OLB 160B. Based in part on the classification, an appropriate subset of the information is formed into like-kind fabric packets including the destination address of OLB 160B. An appropriate L2/L3 forwarding decision is made and the fabric packets are then communicated as cells to Primary Switch Fabric Module 180A via NM-Fabric coupling 139A. Primary Switch Fabric Module 180A forwards the cells toward OLB 160B. The cells are ultimately received via OLB-Fabric coupling 169B, reconstituted as packets, and provided directly to the service process executing on OLB 160B. The reverse path is used to transfer information from the service process to the client coupled to NM 130A. Another path may also be used to transfer information from the service process to other destinations, such as an application process executing on a PMM.

In an example of an SSL service process executing on OLB 160B, NM 130A recognizes a variety of SSL IP packet forms during classification, including HyperText Transfer Protocol Secure (HTTPS) as TCP/IP destination port 443, Secure Simple Mail Transport Protocol (SSMTP) as TCP/IP destination port 465, and Secure Network News Transfer Protocol (SNNTP) as TCP/IP destination port 563. IP fabric packets are formed including the destination IP address of OLB 160B. An L3 forwarding decision is made and the IP fabric packets are provided as cells to the fabric and forwarded toward OLB 160B. The SSL service process executing on OLB 160B, upon receiving the reconstituted IP packets, performs SSL service functions such as context switching, state look-up, protocol layer demultiplexing, and decryption.

The SSL service process executing on OLB 160B produces result data based in part on the packets received from the external client via NM 130A. The result data typically includes IP packets that may sent back to the external client via NM 130A (a handshake or acknowledgement, for example) as illustrated by NM-OLB Data Exchange 211 or alternately addressed to $P_3$ 203 (decrypted clear text, for example) as illustrated by PMM-OLB Data Exchange 216. In both cases fabric packets are provided as cells to Primary Switch Fabric Module 180A via OLB-Fabric coupling 169B and forwarded accordingly.

In an example of an SLB service process executing on OLB 160B, NM 130A recognizes TCP SYN packets during classification and forms an IP fabric packet including the destination IP address of OLB 160B. An L3 forwarding decision is made and the IP fabric packet is provided as cells to the fabric and forwarded toward OLB 160B. The SLB service process executing on OLB 160B, upon receiving a reconstituted packet, consults load information for the system, and assigns the request to a relatively unloaded physical partition of a PMM (such as one of $P_1$ 201, $P_2$ 202, and $P_3$ 203), establishing a new connection. The new connection is recorded in the appropriate L3 FIBs, in order for NM 130A to properly forward subsequent IP packets for the new connection to the assigned physical partition, enabling information flow from NM 130A to the assigned physical partition without the need for indirection through OLB 160B.

In one embodiment, SSL and SLB processing may be cascaded. For example, NM 130A forwards cellified encrypted IP packet information from an encrypted external client toward OLB 160B for SSL processing, or decryption. OLB 160B in turn forwards cellified decrypted (clear text) IP packet information to itself, another OLB, or a PMM for subsequent SLB processing. After assignment of a physical partition relating to a new encrypted connection, cellified packets are then forwarded first from NM 130A to OLB 160B for decryption, and then directly to the assigned physical partition.

In an example of an XML service executing on OLB 160B, the service process functions as an XML server. NM 130A identifies XML requests from the external client, and forwards each request, in the form of cellified IP packets, toward OLB 160B, where the XML service process analyzes the request. Appropriate response information is produced and provided as cellified packets forwarded toward NM 130A.

While NM-OLB Data Exchange 211 illustrates data exchange between NM 130A and OLB 160B, this is only an illustrative scenario. For example, during classification, NM 130A may examine a packet (typically but not necessarily an IP packet) received from the client coupled to NM 130A to determine an associated flow, and then selectively determine a destination OLB based on the determined flow (OLB 160A or OLB 160B, as appropriate). This provides a form of service processing load balancing. The destination OLB may also be determined based on the type of service (SLB, SSL, or XML), if a particular OLB includes hardware acceleration specific to a service. For example, in an embodiment where OLB 160A includes an SSL hardware accelerator, while OLB 160B includes an XML hardware accelerator, then IP packets requiring SSL processing are typically directed toward OLB 160A, and IP packets requiring XML processing are typically directed toward OLB 160B. Those of ordinary skill in the art will recognize that destination OLB determination may be performed based on combining service processing load balancing with selection based on hardware accelerator availability and location.

Service processing (such as SLB, SSL, and XML) is not restricted to OLBs, as PMMs and SCMs may also be configured to provide service processing. In these embodiments, NMs take the destination IP address assigned to a physical partition of a PMM (such as $P_1$ 201, $P_2$ 202, or $P_3$ 203, for example) or an SCM (such as Primary SCM 140A, for example) and perform an L3 forwarding decision to provide a fabric destination address in preparation for transit on the fabric as cells. The cells are then forwarded toward the appropriate PMM or SCM where the service process is executing.

NM-NM Data Exchange 212 is representative of data exchanged between NMs. This traffic is exemplary of network traffic between a first external client and a second external client coupled respectively to a port of NM 130A and a port of NM 130B, and wherein ES1 110A performs as a bridge, switch, or router. (Clients such as 102 and 103 of FIG. 1A are representative of the external clients.) The low-level details of the data exchange are substantially similar to NM-OLB Data Exchange 211. A port of NM 130A receives information, typically in packet form, from the first external client (and potentially a plurality of other external sources), and classifies the packets (which may be for a plurality of destinations), in part to determine a subset of the packets to be sent to the port of NM 130B. Based in part on the classification, an appropriate subset of the information is formed into fabric packets destination-addressed to the port of NM 130B. NM 130A makes a forwarding decision that embeds a fabric address into the fabric packet, which is then communicated as cells to Primary Switch Fabric Module 180A via NM-Fabric coupling 139A. Primary Switch Fabric Module 180A forwards the cells toward NM 130B. After arriving at NM 130B the cells are reconstituted as packets, and sent to the second external client coupled to the port of NM 130B. The reverse path is used to transfer information from the second client to the first client, and operates in a symmetric manner.

Under some circumstances, such as multiple clients coupled to one NM via multiple physical network couplings (media ports), an NM (such as NM 130A) may forward data toward itself via the fabric. Operation in this scenario is similar to NM-NM Data Exchange 212, except the packets are addressed to NM 130A, instead of NM 130B. The multiple media ports are distinguished via the sub-address portion of the fabric address.

NM-PMM Data Exchange 213 is representative of IP packets exchanged between an NM and a process (Application, Driver, or OS) executing on a PMM, typically under control of a higher-level protocol, such as Transmission Control Protocol (TCP) or User Datagram Protocol (UDP). The data exchange is substantially similar to NM-OLB Data Exchange 211. NM 130B forms a portion of received information (based on classification) as IP packets addressed to $P_3$ 203. NM 130B executes a forwarding decision on the destination IP address to obtain a fabric destination address in preparation for providing a fabric packet as cells to Primary Switch Fabric Module 180A via NM-Fabric coupling 139B. Primary Switch Fabric Module 180A forwards the cells toward $P_3$ 203. Upon arrival via PMM-Fabric coupling 159B (or alternatively PMM-Fabric coupling 159B'), the cells are reconstituted as IP packets by PMM 150B, and provided to $P_3$ 203. The process transfers information to NM 130B (and typically on to a client coupled to the NM) using the reverse path. A return IP fabric packet is formulated by the process, IP destination-addressed to NM 130B, a corresponding fabric address is obtained from a forwarding decision, and the IP fabric packet is provided as cells to Primary Switch Fabric Module 180A for forwarding toward NM 130B.

NM-SCM Data Exchange 214 is representative of data exchanged between an NM (or a client coupled thereto) and a management, forwarding, or load balancing process executing on an SCM. The data exchange is substantially similar to NM-OLB Data Exchange 211. Packets addressed to Primary SCM 140A are formulated by either an external client coupled to NM 130B or (as an alternative example) by a control plane related process running on the Network Processor of NM 130B. NM 130B forms corresponding fabric packets and a forwarding decision is made to determine the embedded fabric address. The fabric packets are then provided as cells to Primary Switch Fabric Module 180A via NM-Fabric coupling 139B. Primary Switch Fabric Module 180A forwards the cells toward Primary SCM 140A. Upon arrival at Primary SCM 140A via SCM-Fabric coupling 149A, the cells are reassembled as packets by Primary SCM 140A and provided to the management, controlplane, or load balancing process. Examples illustrating these processes are provided in the following paragraphs. The management, controlplane, or load balancing process transfers information back to NM 130B (or a client coupled thereto) using the reverse path. A management packet is addressed to NM 130B (or the client coupled thereto), is formulated by a process executing on SCM 140A, a corresponding fabric packet is formed, and a forwarding decision is made to determine the embedded fabric address. The fabric packet is provided as cells to Primary Switch Fabric Module 180A for forwarding toward NM 130B. Upon arrival at NM 130B, the management packet is reconstructed. If addressed to NM 130B, the packet is consumed therein. If addressed to the external client, the reconstructed packet is provided thereto.

In an example of a management process executing on Primary SCM 140A, a management client coupled externally to NM 130B (typically for remote server management, provisioning, configuration, or other related activities) sends a management related packet via NM 130B with the destination address of the management process executing on Primary SCM 140A. Within NM 130B, the packet is classified and determined to be a management related packet. A forwarding decision is then made and a cellified version of the management packet is forwarded toward the management process via Primary Switch Fabric Module 180A. Return information from the management process to the management client uses the reverse path, by formulation (within SCM 140A) of packets having the destination address of the management client coupled to NM 130B. A forwarding decision is then made and a cellified version of the return information packets are forwarded toward the management client via Primary Switch Fabric Module 180A and NM 130B. Typically but not necessarily, IP packets would be used for the exchange between the management client and process.

In an example of a controlplane process executing on Primary SCM 140A, in some embodiments and under some circumstances NM 130B classification determines that the proper L2 forwarding for a received packet is not known, and designates the received packet is an "exception packet". In one embodiment, NM 130B forwards a cellified version of the exception packet to an L2 FIB management process executing on the Primary SCM via Primary Switch Fabric Module 180A. The L2 FIB management process examines the exception packet, master L2 FIB, and other forwarding related information, to determine the proper fabric address for the missing L2 FIB entry. The updated forwarding information is then recorded in the master L2 FIB, in some embodiments, and propagated to the ancillary L2 FIBs in order for NM 130B to properly forward subsequent packets having the same or similar classification. Primary SCM 140A also provides a correct fabric address for the exception packet and emits an IP fabric packet equivalent to the exception packet (but addressed to the updated fabric address) as corresponding cells to Primary Switch Fabric Module 180A for forwarding to the interface at destination IP address (or at least one hop closer). In this circumstance the fabric destination could be any of the elements coupled to the dataplane of Primary Switch Fabric Module 180A, including NM 130B or Primary SCM 140A (this general data exchange is not illustrated in the figure).

In an example of a load balancing process executing on Primary SCM 140A, operation is similar to the SLB service executing on an OLB, except the IP packets are destination IP addressed to Primary SCM 140A instead of an OLB.

PMM-SCM Data Exchange 215 is representative of data exchanged between an Application, Driver, or OS process executing on a physical partition of a PMM and a management, controlplane, or load balancing process executing on an SCM. The data exchange is substantially similar to the exchanges described elsewhere herein. A PMM-to-SCM communication is formed as a packet addressed to Primary SCM 140A by a Driver process, for example, executing on $P_3$ 203. A fabric packet is formed and a forwarding decision is made to determine the embedded fabric address. The fabric packet is then provided as cells via PMM-Fabric coupling 159B (or 159B'), and forwarded via Primary Switch Fabric Module 180A toward Primary SCM 140A. Upon arrival at Primary SCM 140A and subsequent reassembly, the reassembled packet is provided to the management, controlplane, or load balancing process. The reverse path is used for SCM-to-PMM communication, with the management, controlplane, or load balancing process formulating a packet addressed to $P_3$ 203, for communication to the Driver process.

In an example of the load balancing process executing on Primary SCM 140A, the communication includes server load information relating to PMM 150B. PMM-SCM Data Exchange 215 is also representative of a variety of paths between an SCM and all other elements coupled to the fabric dataplane (such as FCMs, NMs, OLBs, and other PMMs), to update forwarding information maintained in each of the elements. For each element requiring a forwarding information update, the controlplane process executing on Primary SCM 140A formulates one or more packets to include the updated forwarding information and addresses the packet(s) to the appropriate fabric destination. The packets are provided as cells to the fabric and the fabric forwards the cells according to the fabric destination. In another embodiment the fabric destination includes a multicast destination, and the cellified packets are delivered to a plurality of destinations by the fabric.

PMM-OLB Data Exchange 216 is representative of data exchanged between a process (Application, Driver, or OS) executing on a physical partition of a PMM and a service process executing on an OLB. The data exchange is substantially similar to PMM-SCM Data Exchange 215, except that OLB 160B takes the place of Primary SCM 140A, and data is coupled via OLB-Fabric coupling 169B instead of SCM-Fabric coupling 149A.

Data exchanges between processes executing on different physical partitions are communicated on the fabric (PMM-PMM-Fabric Data Exchange 217, for example). Data exchanges between processes executing within the same physical partition are communicated by coherent shared memory and coherent cache memory transactions (PMM-Internal Data Exchange 218, for example). When multiple PMMs are configured as a single physical partition, coherent shared memory and coherent cache memory transactions travel between the PMMs of the partitions via CSFI 170 (PMM-PMM-CSFI Data Exchange 219, for example).

PMM-PMM-Fabric Data Exchange 217 is representative of data exchanged between a first process and a second process executing on different physical partitions, i.e. message-passing InterProcess Communication (IPC). The two processes may be any combination of Application, Driver, or OS processes. The data exchange is substantially similar to PMM-SCM Data Exchange 215, except $P_1$ 201 takes the place of Primary SCM 140A, and data is coupled via PMM-Fabric coupling 159A' instead of SCM-Fabric coupling 149A. Another example of this type of communication would be between $P_1$ 201 and $P_2$ 202, (via PMM-Fabric coupling 159A' and PMM-Fabric coupling 159A) even though these two physical partitions are on the same PMM.

PMM-Internal Data Exchange 218 is representative of data exchanged between two processes executing on the same physical partition, and the physical partition resides entirely within a single PMM. A source process, executing on a first compute element of $P_3$ 203, writes to a shared memory location, and a sink process, executing on a second compute element of $P_3$ 203, reads the shared memory modified by the write. Communication is provided by links internal to PMM 150B supporting coherent shared memory and coherent cache memory.

PMM-PMM-CSFI Data Exchange 219 is representative of data exchanged between two processes executing on the same physical partition, the physical partition spans more than one PMM, and the two processes execute on different PMMs. An example of this physical partition configuration is illustrated as $P_4$ 204, where $P_4$ 204 includes all of the compute elements of PMM 150A and PMM 150B. Coherent shared memory and coherent cache memory transactions are used to exchange data, as in PMM-Internal Data Exchange 218. However, the transactions are communicated via CSFI 170, instead of links internal to the PMMs.

Data exchanges may also occur between processes executing on physical partitions distributed across multiple PMMs via a combination of paths similar to PMM-Internal Data Exchange 218 and PMM-PMM-CSFI Data Exchange 219. That is, particular coherent memory traffic (for both shared memory and cache memory) may travel via both CSFI 170 and via links internal to the PMMs.

Data exchanges involving an NM (such as 211, 212, 213, and 214) typically include Tag processing. Specifically, during ingress processing on an NM, incoming packets from a first client coupled to the NM are classified, producing a condensed representation of certain details of the incoming packet, typically by analyzing the header of the incoming packet. A portion of the classification result is represented by a Tag, and typically a portion of the Tag, referred to as the egress Tag, is included in a header of the fabric packet produced by the NM in response to the incoming packet. The egress Tag may specify selected packet processing operations to be performed by the NM during egress processing, thus modifying the packet header, data, or both, before receipt by a second client. Egress packet processing may be performed in response to the corresponding Tag produced during ingress processing (in the NM that did the ingress processing on the packet) or in response to a Tag 'manufactured' by a service process on an OLB or an Application, Driver, or OS process executing on a PMM. In one embodiment egress processing is specified directly by the Tag, and in another embodiment egress processing is determined indirectly by the Tag (via a table look-up, for example).

As an example, during NM-OLB Data Exchange 211, in the case of an SSL service process, the egress Tag provided may include information examined by the SSL process in order to perform any combination of SSL processing related context switching, SSL related per context state look-up, and early protocol layer demultiplexing.

As another example, during NM-SCM Data Exchange 214, in the case of a routing process, the exception packet delivered to the routing process may include an egress Tag providing exception information to determine a particular Quality of Service (QoS) for the associated routing protocol. The routing process examines the exception information of the egress Tag to determine the particular route processing queue to insert the exception packet into.

In one embodiment, Primary Switch Fabric Module 180A provides for only a single transport of cells at a time between any pairing of ingress and egress ports. In another embodiment, Primary Switch Fabric Module 180A provides for a plurality of simultaneous transports of cells between multiple pairings of fabric ingress and egress ports. This simultaneous transport may be by parallel communication paths available in the fabric, by interleaving cells from different transports in time on a single communication path, or any combination of these and other techniques. Those of ordinary skill in the art will recognize that the details of Primary Switch Fabric Module 180A operation affect only the available bandwidth and latency provided by the fabric, not details of data exchanges as exemplified by FCM-PMM Data Exchange 210, NM-OLB Data Exchange 211, and so forth. In one embodiment, Primary Switch Fabric Module 180A includes sufficient parallel resources to provide substantially simultaneous communication for all of the data exchanges illustrated in the figure.

Packet Transmission and Reception

Figure 3A:
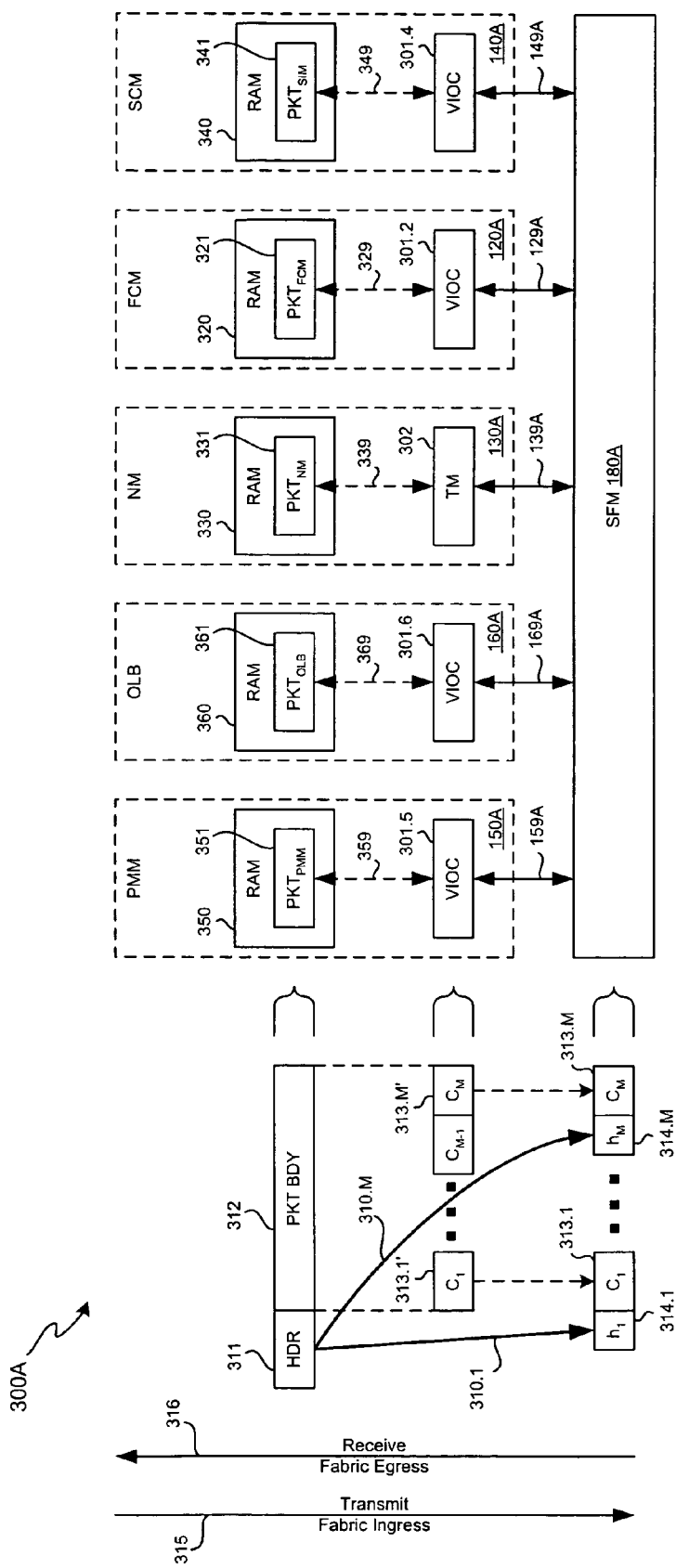
FIG. 3A illustrates selected aspects of an embodiment of packet transmission and reception in an ES embodiment.

FIG. 3A illustrates Fabric Communication 300A, conceptually showing selected aspects of an embodiment of packet transmission and reception in an ES embodiment, used in FCM-PMM Data Exchange 210 and other similar data exchanges described elsewhere herein. Fabric client elements coupled to Primary Switch Fabric Module 180A include PMM 150A, OLB 160A, NM 130A, FCM 120A, and Primary SCM 140A. Each coupled client includes RAM, shown respectively as PMM RAM 350, OLB RAM 360, NM RAM 330, FCM RAM 320, and SCM RAM 340. Each RAM in turn includes a packet memory image, shown respectively as Packet Memory Image $PKT_{PMM}$ 351, Packet Memory Image $PKT_{OLB}$ 361, Packet Memory Image $PKT_{NM}$ 331, Packet Memory Image $PKT_{FCM}$ 321, and Packet Memory Image $PKT_{SCM}$ 341. A VIOC is included in each of PMM 150A, OLB 160A, FCM 120A, and Primary SCM 140A, illustrated as VIOC 301.5, VIOC 301.6, VIOC 301.2, and VIOC 301.4, respectively. The VIOCs are shown conceptually coupled to corresponding packet images as dashed arrows 359, 369, 329, and 349, respectively. The VIOCs provide an interface to the fabric via PMM-Fabric coupling 159A, OLB-Fabric coupling 169A, FCM-Fabric coupling 129A, and SCM-Fabric coupling 149A, respectively.

NM 130A includes a Traffic Manager (TM 302), also known as a Buffer and Traffic Manager (BTM) instead of a VIOC. The TM is shown conceptually coupled to Packet Memory Image $PKT_{NM}$ 331 via dashed arrow 339. TM 302 provides an interface for NM-Fabric coupling 139A.

Data is exchanged between fabric clients (modules on the fabric) by procedures of packet transmission, routing (as cells) on the fabric, and packet reception. Arrow 315 conceptually shows the direction of flow for packet transmission to the fabric, also referred to as ingress to the fabric, while arrow 316 conceptually shows the direction of flow for packet reception from the fabric, also referred to as egress from the fabric. Conceptually, packet transmission begins at the source fabric client by reading a packet image from a source RAM and providing the packet as cells for transmission via the fabric. The fabric routes the cells to the appropriate destination fabric client. Packet reception conceptually begins at the fabric edge of the destination fabric client, where the cells are received from the fabric and reassembled into a corresponding packet (including information from the packet image as read from the source RAM) and written into a destination RAM in the destination fabric client.

Each of TM 302 and the VIOCs (301.5, 301.6, 301.2, and 301.4) comprise various logic blocks, including a fabric interface communication unit (also known as a packet-cell converter) for performing the functions relating to packet transmission and packet reception via cells on the fabric. The fabric communication operation of all fabric clients (PMM 150A, OLB 160A, NM 130A, FCM 120A, and Primary SCM 140A) is substantially similar, but for clarity is described in a context of data exchanged between PMM 150A and NM 130A (such as NM-PMM Data Exchange 213, for example).

For a packet transmission operation, the fabric interface communication units read a packet image from a RAM included in a fabric client (such as Packet Memory Image $PKT_{PMM}$ 351 included in PMM RAM 350). The packet image includes a header and packet body data, illustrated as Header 311 and Packet Body 312 respectively. The fabric interface communication unit (included in VIOC 301.5 in this example) conceptually segments the packet into a plurality of cells of equal length, illustrated as Cell $C_1$ 313.1' through Cell $C_{M-1}$ 313.(M−1)'. The final Cell $C_M$ 313.M' is typically a different length than the other cells as packets are not restricted to integer multiples of cell sizes. Although illustrated as contiguous in RAM, the packet body data may instead be scattered in various non-contiguous buffers in RAM, according to various embodiments.

Each of the cells are encapsulated with headers, illustrated as Cell Header $h_1$ 314.1, corresponding to Cell $C_1$ 313.1, and Cell Header $h_M$ 314.M corresponding to Cell $C_M$ 313.M. The cell headers for each of the cells segmented from a given packet are determined in part from the packet header, as shown conceptually by arrow 310.1 and arrow 310.M flowing from Header 311 to Cell Header $h_1$ 314.1 and to Cell Header $h_M$ 314.M respectively. Each of the resultant encapsulated cells is provided, in order, to the fabric for routing to the destination. Segmenting the packet into cells and encapsulating the cells is also referred to as "cellification".

Header 311 includes a packet destination address, and VIOC 301.1 determines a cell destination address in part from the destination address of the packet header in addition to routing tables and state information available to the VIOC. The cell destination address, also known as a fabric destination or egress port address, is included in each of the cell headers (Cell Header $h_1$ 314.1 through Cell Header $h_M$ 314.M).

This technique enables a process executing on a fabric client to transparently address a packet to another fabric client using a logical address for the addressed client. The resolution of the packet address to a fabric egress port address corresponds to resolving the logical address to a physical address, i.e. a specific port of the switch that the addressed client is coupled to.

The reverse direction receive path operates in a complementary, conceptually symmetric, inverse manner. The segmented cells are routed by the fabric, in order, to the fabric port specified by the cell destination address. The fabric interface communication unit included in the destination fabric client receives the cells, processes the headers, and reconstitutes (or reconstructs) the cells into a packet image in RAM, resulting in a packet image substantially similar to the packet image originally provided by the transmitting fabric client. Continuing with the example, if the destination address of Packet Memory Image $PKT_{PMM}$ 351 resolves to NM 130A, then the cells are routed to NM-Fabric coupling 139A by Primary Switch Fabric Module 180A. TM 302 receives the cells via NM-Fabric coupling 139A, assembles them back into a packet, and stores the resultant image as Packet Memory Image $PKT_{NM}$ 331 in NM RAM 330.

Those of ordinary skill in the art will recognize that packet transmission and reception procedures are not limited to complete packet images in RAM. For example, on an NM, packet information flowing to the fabric may be provided, in some embodiments, directly from a network interface included on the NM, without intermediate storage in RAM. Similarly, packet information flowing from the fabric may, in some embodiments, be provided directly to the network interface without intermediate storage in RAM. The same techniques may be used on an FCM with respect to information flowing to and from the storage interface. Those of ordinary skill in the art will also recognize that the sans-header intermediate cells, Cell $C_1$ 313.1' through Cell $C_M$ 313.M', are only conceptual in nature as some embodiments implement cellification without copying packet data. Instead, packet data is accessed in-situ in cell-sized chunks and encapsulation performed on-the-fly.

The fabric interface communication units included in TMs and VIOCs further include logic adapted to allocate and manage bandwidth and priority for various flows as identified by any combination of classification information, Tag, and a sub-port portion of a fabric egress port address. This enables provisioning of bandwidth and setting of priorities for transport according to operational requirements.

In one embodiment, the particular priority at which transport is performed is selectively determined by examination of the sub-port portion of the fabric egress port address. For example, NM 130A may be configured with a high-priority queue and a low-priority queue, having corresponding high-priority and low-priority sub-port addresses. With respect to NM-PMM Data Exchange 213, for example, a portion of the data exchange may be performed via the low priority queue and another portion performed via the high-priority queue. A process desiring selective access to the high-priority queue and low-priority queue addresses packets accordingly, providing a corresponding high-priority packet destination address to high-priority packets and a corresponding low-priority packet destination address to low-priority packets. During transmission to the fabric, the high-priority packet address and the low-priority packet address are resolved by the appropriate VIOC on PMM 150B to a corresponding high-priority fabric egress port address and a corresponding low-priority egress port address. The high-priority egress port address and the low-priority egress port address include a fabric port number sub-portion that is identical for the two egress port addresses, since both packets are destined to the same pluggable module. However, the sub-port portion is different to distinguish between high and low priorities.

Upon receipt in the NM of high-priority cells and low-priority cells (corresponding to cells from packets addressed to the high-priority queue and the low-priority queue, respectively), the TM on NM 130A examines the sub-port portion of the fabric egress port addresses provided with each cell, and selectively identifies packets as associated with the high-priority queue or the low-priority queue as appropriate.

In another embodiment, the sub-port portion may also include a bandwidth allocation portion to identify one of a plurality of bandwidth allocations to associate with the packet assembled from the cell. Still other embodiments provide for combining priority and bandwidth allocation dependent processing according to the sub-port portion of the fabric egress port address. Those of ordinary skill in the art will recognize that these techniques are not limited to communication between NMs and PMMs as in the example, but may be used between all modules operating as fabric clients (such as FCMs, SCMs, and OLBs). FCMs, for example, may provide for allocation of bandwidth to various coupled storage devices or networks via the sub-port mechanism.

In one embodiment, the fabric interface communication units of TMs and VIOCs provide hardware support for a reliable message protocol in addition to packet communication. State machines implement a connection-oriented procedure including establishing a connection via a connection request and a corresponding acknowledgement, sending and receiving one or more messages using the established connection, and terminating the connection after it is no longer needed. Delivery of message content is guaranteed, using a limited number of retries, otherwise an error is returned to the sender. In operation, message images are constructed similar to packet images, with an indicator included in the message image identifying the image as a message instead of a packet. The message image includes a message header, similar in format to a packet header, and message body data, similar to packet body data. The message body data is communicated in the same manner as packet body data. The message header includes a message destination similar in format to a packet destination address. The message destination address is resolved into a cell destination address for inclusion in the cells during cellification, similar to the resolution of a packet destination address.

Figure 3B:
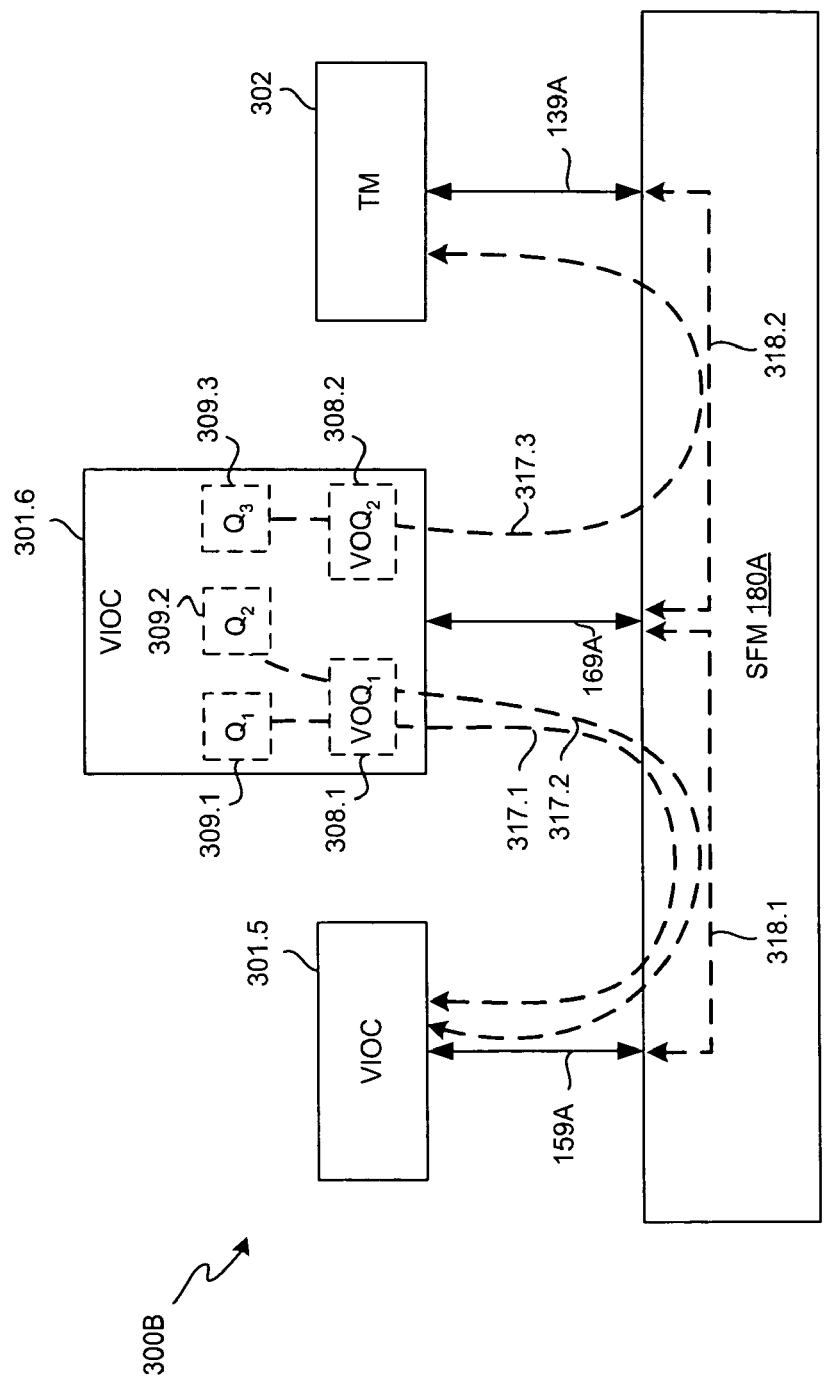
FIG. 3B illustrates selected aspects of an embodiment of packet and cell prioritized transmission in an ES embodiment.

FIG. 3B illustrates Prioritized Fabric Communication 300B, conceptually showing selected aspects of an embodiment of packet and cell prioritized transmission in an ES embodiment, focusing on transports originating from a VIOC. VIOCs 301.5 and 301.6, along with TM 302, are coupled to Primary Switch Fabric Module 180A, via couplings 159A, 169A, and 139A, respectively. A VIOC typically is closely associated with 16 groups of four transmit queues each, providing a total of 64 transmit queues. Here in this initial illustrative embodiment the transmit queues are conceptualized as existing within the VIOC. In a later discussed illustrative embodiment, the transmit queues physically reside in shared portions of the host memory, although their state is managed within the VIOC and portions are buffered within the VIOC.

A subset of three transmit queues are shown conceptually in VIOC 301.6, as $Q_1$ 309.1, $Q_2$ 309.2, and $Q_3$ 309.3. Each transmit queue is configurable as operating according to a specified priority or according to a specified bandwidth. For example, $Q_1$ 309.1 may be configured to operate at a strictly higher priority than $Q_2$ 309.2 and $Q_3$ 309.3, or the queues may be configured to operate in a round-robin priority with respect to each other. As another example, $Q_1$ 309.1 may be configured to operate at twice the bandwidth of $Q_2$ 309.2 and $Q_3$ 309.3. As another example, $Q_1$ 309.1 may be configured for a first maximum bandwidth and a first minimum bandwidth, $Q_2$ 309.2 may be configured for a second maximum and a second minimum bandwidth, and $Q_3$ 309.3 may be configured for third maximum and minimum bandwidths. Those of ordinary skill in the art will recognize that many other priority and bandwidth schemes are possible.

In addition to transmit queues, VIOCs typically implement virtual output queues (VOQs) to prevent head of line blocking, in order to maximize the bandwidth of transmission to the fabric. In an illustrative embodiment discussed herein below, the VOQs are implemented as pointer managed buffers within an egress shared memory internal to the VIOC. A subset of VOQs in VIOC 301.6 are illustrated as $VOQ_1$ 308.1 and $VOQ_2$ 308.2, one for each of the two illustrated destinations (VIOC 301.5 and TM 302). The VOQs are processed according to configurable priority algorithms, including a straight (or strict) priority algorithm, a straight round-robin algorithm (without weights), a weighted round-robin algorithm, and a weighted round-robin algorithm with configurable weights, according to embodiment.

In operation, a transmit queue selection is made according to the configured priority and bandwidth. Data is then made available from the selected queue accordingly, and provided to the fabric for transfer to the destination according to the virtual output queue associated with the destination. These procedures repeat as long as any of the queues are not empty. In the example, one of $Q_1$ 309.1, $Q_2$ 309.2, and $Q_3$ 309.3 is selected, and then examined to determine the next packet (or message) to transmit. For illustrative purposes, $Q_1$ 309.1 is configured as the highest priority, $Q_2$ 309.2 is the next highest priority, and $Q_3$ 309.3 is configured as the lowest priority.

A first selection and subsequent transmission, shown conceptually as Packet Transmission Path 317.1, is made from $Q_1$ 309.1, as it is configured as the highest priority, and includes at least one packet ready for transmission. Data is read according to $Q_1$ 309.1, and determined to be destined for the fabric egress port associated with PMM-Fabric coupling 159A. Data is transferred to Primary Switch Fabric Module 180A under the control of $VOQ_1$ 308.1, and further transferred to PMM-Fabric coupling 159A.

Subsequently, a second selection and transmission, shown conceptually as Packet Transmission Path 317.2, is made from $Q_2$ 309.2, as it is configured as the next highest priority, it includes at least one packet ready for transmission, and $Q_1$ 309.1 is empty. Data is read according to $Q_2$ 309.2, determined to be destined for PMM-Fabric coupling 159A, provided to Primary Switch Fabric Module 180A under the control of $VOQ_1$ 308.1, and transferred to PMM-Fabric coupling 159A.

Subsequently, a third selection and transmission, shown conceptually as Packet Transmission Path 317.3, is made from $Q_3$ 309.3, as it is configured as the lowest priority, it is not empty, and $Q_1$ 309.1 and $Q_2$ 309.2 are empty. Data is read according to the selected transmit queue ($Q_3$ 309.3) as in the previous two scenarios, but the destination is determined to be the fabric egress port associated with NM-Fabric coupling 139A, and therefore data is provided to the fabric under the control of $VOQ_2$ 308.2.

Although the three selections and transmissions corresponding to Packet Transmission Paths 317.1, 317.2, and 317.3 have been described as occurring strictly sequentially, transmission of data from differing virtual output queues may instead be interleaved on the fabric. For example, transmission of data from $VOQ_1$ 308.1 (such as Packet Transmission Paths 317.1 or 317.2) may overlap in time with the transmission of data from $VOQ_2$ 308.2 (such as Packet Transmission Path 317.3). In this circumstance, cells from the overlapping transmissions are wholly or partially interleaved on the fabric.

In addition to prioritized selection among the transmit queues, the switch fabric also typically provides for prioritized transport. Each cell may specify a priority, and in one embodiment there are four priority levels available. The cell priority is developed from any combination of various parameters, including packet size, packet type, packet class of service, packet quality of service, transmit queue priority, and other packet header information. As shown in the figure, Cell Transmission Path 318.1 provides for transmission of cells from VIOC 301.6 to VIOC 301.5, and Cell Transmission Path 318.2 provides for transmission of cells from VIOC 301.6 to TM 302. Each of Paths 318.1 and 318.2 may transfer cells according to any of the four priorities. For example, cells corresponding to Packet Transmission Path 317.1 may be transferred at the highest priority, while cells corresponding to Packet Transmission Path 317.2 may be transferred at a lower priority.

Those of ordinary skill in the art will recognize that these described scenarios are examples only, as entries in the transmit queues may be destined for any of the egress ports of the fabric, and therefore any of the corresponding VOQs. In addition, dynamic transmit queue priorities (such as round-robin) and bandwidth allocation associated constraints and processing may result in data from various transmit queues being intermingled in various VOQs, although all of the data for a given packet will necessarily be present in the same VOQ, since the packet is destined for only a single fabric egress port. Furthermore, fabric transport priorities may vary amongst entries in the VOQs, such that the switch fabric traffic typically appears intermixed and complicated.

Pluggable Modules

FIGS. 4A-4E illustrate various embodiments of pluggable modules included in various ES embodiments. The modules share many similar characteristics. For example, each of the modules includes a fabric interface communication unit included in a TM or a VIOC. Each of the modules typically includes one or more computation and memory elements. Couplings between elements of the modules typically operate in the same or substantially similar fashion. These similarities are illustrated by common element presentation and identification, as follows.

RAM elements are shown with identifiers prefixed with 411, and these elements are typically Dynamic Random Access Memories (DRAMs) organized as Dual Inline Memory Modules (DIMMs) in some embodiments. CPU elements are shown with identifiers prefixed with 410, and these elements are typically Opteron processors. VIOC identifiers are prefixed with 301. Elements representing combined TCAM and SRAM identifiers are prefixed with 403. BMC elements are prefixed with 402. FCI elements are prefixed with 413, and the associated optional coupling identifiers are prefixed with 414. HT sub-modules are identified as prefixed with 424. HyperTransport (HT) channel couplings are shown with identifiers prefixed with 460.

Those of ordinary skill in the art will recognize that while the aforementioned elements shown with common prefix identifiers are closely related to each other in operation and function, they are not identical, and may differ in various characteristics. Differences may include size, organization, bandwidth, capacity, or speed, according to embodiment. Such differences have no effect on the overall operation of the associated pluggable module.

Figure 4A:
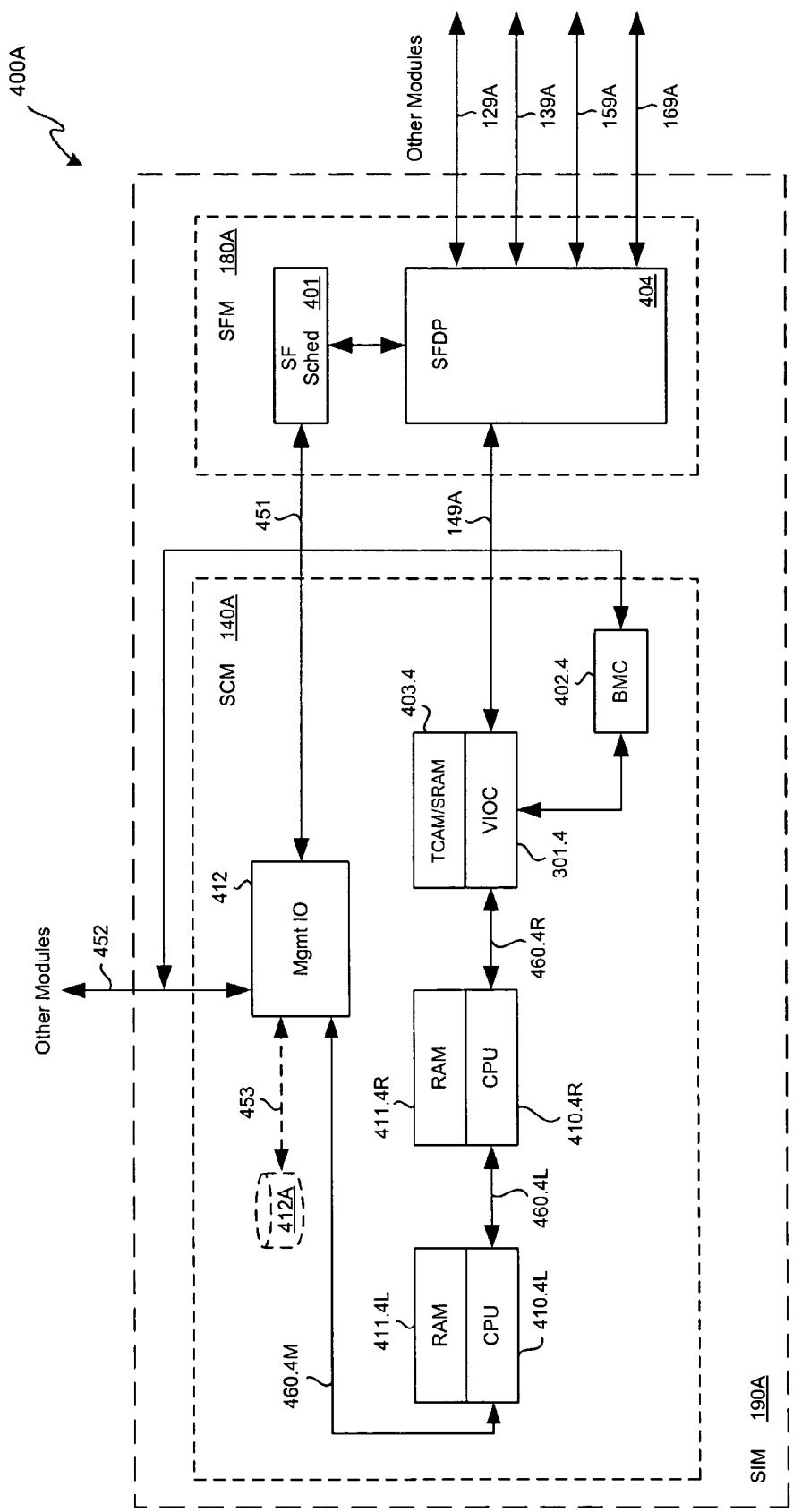
FIG. 4A illustrates selected aspects of an embodiment of a System Intelligence Module (SIM) configured as a pluggable module including a System Control Module (SCM) and an associated Switch Fabric Module (SFM).

FIG. 4A illustrates SIM Detail 400A, including selected aspects of an embodiment of a SIM configured as a pluggable module including an SCM and an associated SFM. It will be understood that the discussion of FIG. 4A is made with respect to the capabilities and topology of the primary SIM and primary fabric, but the discussion equally describes the redundant topology and latent capabilities of the secondary SIM and secondary fabric. As discussed elsewhere herein, the secondary fabric remains dormant with respect to non-control dataplane functionally as long as the primary fabric operates properly. Primary SCM 140A includes compute and associated memory elements CPU 410.4L/RAM 411.4L coupled to CPU 410.4R/RAM 411.4R via HT coupling 460.4L. VIOC 301.4 is coupled to CPU 410.4R via HT coupling 460.R. VIOC 301.4 is in communication with TCAM/SRAM 403.4 and provides a fabric interface for SCM-Fabric coupling 149A. Management I/O 412 is coupled to CPU 410.4L via HT coupling 460.4M and provides an interface to the intra-chassis BMCs via coupling 452. Primary SCM 140A also includes BMC 402.4 coupled to VIOC 301.4 and Management I/O 412. As discussed in more detail later herein, Mass Storage 412A is coupled to Management I/O 412 via coupling 453 and provides local mass storage.

Primary Switch Fabric Module 180A includes Primary SFM Dataplane (SFDP) 404 having a plurality of fabric ports with respective fabric port addresses. The fabric ports are coupled to the various system modules via SCM-Fabric coupling 149A, FCM-Fabric coupling 129A, NM-Fabric coupling 139A, PMM-Fabric coupling 159A, and OLB-Fabric coupling 169A. Each module in the system may be coupled to one or more of the fabric ports and at least some of the foregoing illustrated fabric couplings represent more than one full-duplex fabric coupling to the Primary Switch Fabric Module 180A. For example, in one embodiment, there may be up to two PMMs and each PMM has two full-duplex fabric couplings. Thus PMM-Fabric coupling 159A may be representative of four full-duplex fabric couplings to four respective fabric ports, each having a respective fabric port address. Each module or portion thereof having its own fabric coupling to a fabric port is addressable via the corresponding fabric port address. Primary Switch Fabric Module 180A also includes Primary Switch Fabric Scheduler 401 coupled to Primary SFDP 404.

In operation, SFDP 404, under the direction of Switch Fabric Scheduler 401, routes data as cells provided to a fabric ingress port to a fabric egress port, according to a cell destination address, as described elsewhere herein. Each of dataplane couplings 149A, 129A, 139A, 159A, and 169A couples with a respective fabric ingress port and a respective fabric egress port.

Primary SCM 140A executes any combination of management, controlplane, and load balancing processes using compute and memory resources provided by CPU 410.4L/RAM 411.4L and CPU 410.4R/RAM 411.4R. The CPUs operate as a single SMP complex, communicating shared memory coherency and cache memory coherency transactions via HT coupling 460.4L.

VIOC 301.4 operates as an intelligent I/O device responding to commands from the CPUs, typically originating from a Driver process. A Driver process executing on one of the CPUs forms a packet image in one of the RAMs, including specifying a destination address for the packet, and then notifies the VIOC that a new packet is available for transmission. In response, the VIOC fabric interface communication transmit unit directly accesses the packet image from RAM via an included transmit Direct Memory Access (DMA) unit. The VIOC examines the packet header and identifies the packet destination address. The transmission of packets as cells proceeds without direct assistance from any of the processes executing on the CPUs. The packet address and other associated information are referenced in accessing forwarding and state information maintained in TCAM/SRAM 403.4 to determine the corresponding fabric egress port address and other related information for inclusion in headers of cells provided to the fabric to transmit the packet as cells.

VIOC 301.4 also operates as an intelligent I/O device in the reverse direction, in a conceptually symmetric fashion. Cells are received from the fabric and reassembled as packets by the VIOC fabric interface communication receive unit. In one embodiment the packet data is partially reassembled directly into a packet image stored in one of the RAMs via an included receive DMA unit. The reception of packets as cells proceeds without direct assistance from any of the processes executing on the CPUs. The VIOC notifies one or more of the CPUs that new packet data is available, and subsequently a process, typically a Driver process, accesses the packet image provided in RAM and processes it accordingly.

The management process (or processes) executing on the CPUs of Primary SCM 140A communicate management and configuration control information via Management I/O 412 between Primary SCM 140A and other modules via coupling 452 coupled to BMCs included in PMM 150A, NM 130A, FCM 120A, OLB 160A, and Primary SCM 140A (local BMC 402.4). This communication is typically via a dedicated management Ethernet network, and is consequently out-of-band with respect to Primary Switch Fabric Module 180A. BMC 402.4 provides baseboard management functions, communicating with Management I/O 412 and VIOC 301.4. The processes executing on the CPUs of Primary SCM 140A collect selected management information from all BMCs in the server and in response to the collected information and provisioning commands received from elsewhere, provide management and configuration commands to the BMCs. Management I/O 412 also communicates configuration and control information via coupling 451 between management and controlplane processes executing on the CPUs and Switch Fabric Scheduler 401. This provides, for example, for static or dynamic configuration of the SCMs, one as the Primary SCM and the other as the Redundant SCM.

In selected embodiments, a mass storage device (such as Mass Storage 412A) or storage network interface is available locally to provide boot images, management information, provisioning information, or log file storage. Mass Storage 412A may include any combination of mass storage device types including Flash memory, Magnetic Disk memory, and Optical Disk memory. The mass storage devices may be coupled via any combination of storage interface types including but not limited to PC Card, Compact Flash, Multi-Media Card, Memory Stick, Smart Card, Secure Digital, Universal Serial Bus (USB), FireWire (also knows as "1394"), SCSI (Small Computer System Interface), IDE (Integrated Device Electronics), EIDE (Enhanced IDE) and variations and successors thereof. In other embodiments, the local mass storage is omitted, and this data is accessed from mass storage devices or networks remotely via FCMs 120 or NMs 130.

Figure 4B:
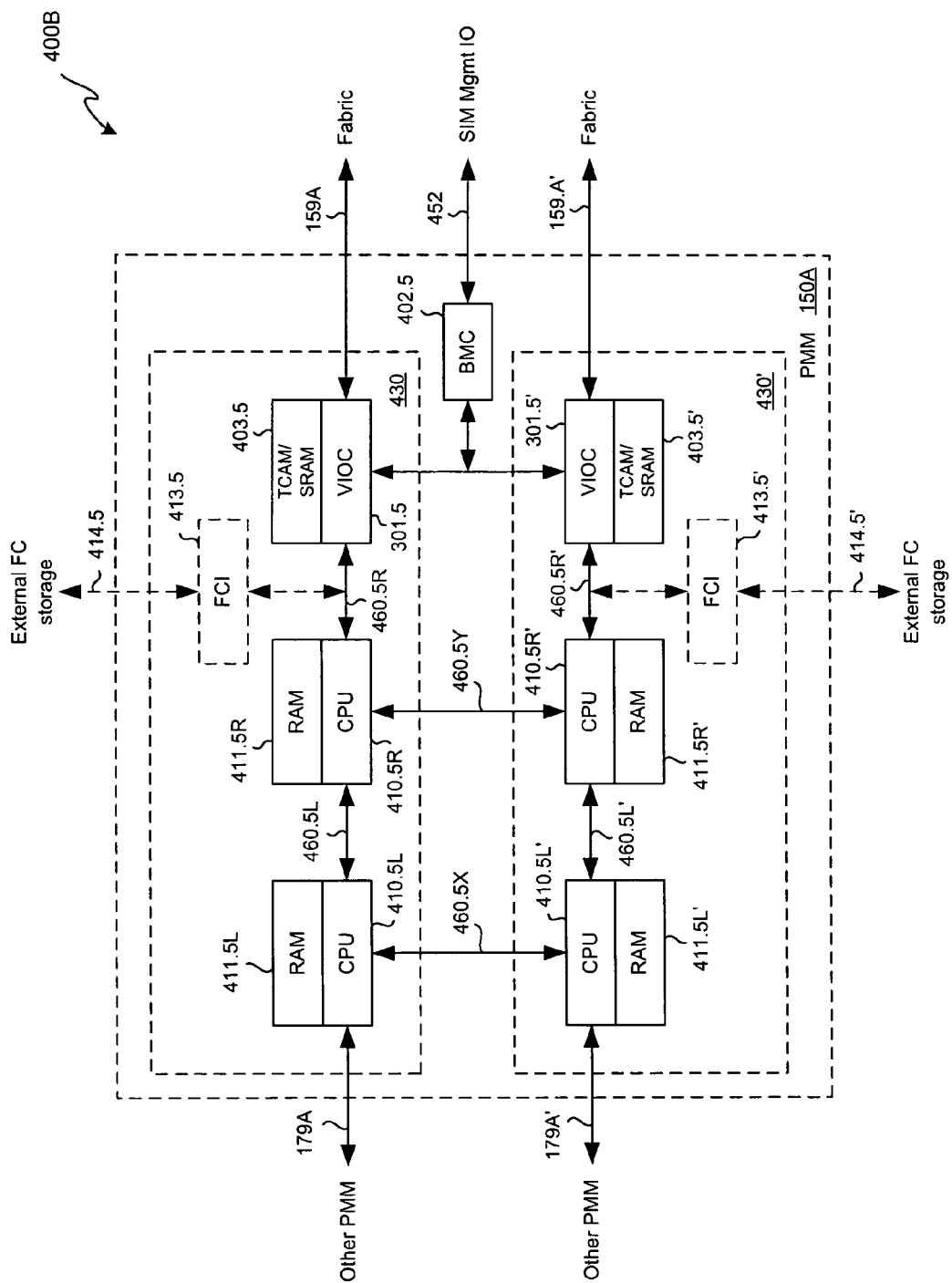
FIG. 4B illustrates selected aspects of an embodiment of a Processor Memory Module (PMM) configured as a pluggable module.

FIG. 4B illustrates PMM Detail 400B, including selected aspects of an embodiment of a PMM configured as a pluggable module. The PMM is arranged as a pair of identical sections, Half-PMM 430 and Half-PMM 430'. Each section includes two CPU/RAM elements coupled to each other by HT links, a VIOC/TCAM/SRAM element interfacing to a fabric coupling, and an optional FCI. The coupling of these elements is substantially similar to corresponding elements of Primary SCM 140A, except that Management I/O 412 is omitted. The two Half-PMMs share BMC 402.5.

The two Half-PMMs are coupled to each other by a pair of HT links (HT coupling 460.5X and HT coupling 460.5Y). One of the CPUs of each half also provides an HT interface for coupling to another PMM (such as PMM 150B of FIG. 2) via CSFI-PMM coupling 179A and CSFI-PMM coupling 179A'. As discussed in more detail below, in one embodiment these couplings are coupled directly to another identically configured PMM, and in other embodiments these couplings are coupled indirectly to another PMM via CSFI 170 (with variations illustrated in FIG. 1A and FIG. 2). Shared memory coherency and cache memory coherency transactions are communicated over the HT couplings internal to the PMM (460.5L, 460.5X, 460.5L', and 460.5Y) and over HT couplings external to the PMM (179A, and 179A').

The HT couplings communicating shared memory coherency and cache memory coherency transactions and CSFI 170 are programmatically configurable to provide for physical partitioning of the CPU/RAM elements of PMMs. The PMM is configured as a single 4-way physical partition by programming the internal HT links (460.5L, 460.5X, 460.5L', and 460.5Y) for coherent operation, and programming the external HT links (179A, and 179A') for "isolated" operation (i.e. links 179A and 179A' are disabled). In another embodiment, isolating a PMM for configuration as a single 4-way physical partition (or as two 2-way physical partitions) is performed by programmatically configuring CSFI 170 (of FIG. 1A) to isolate the PMM from other PMMs.

The PMM is configured as a pair of identical 2-way physical partitions (Half-PMM 430 and Half-PMM 430') by programmatically configuring a portion of the internal HT links (460.5L, and 460.5L') for coherent operation, and another portion of the internal HT links (460.5X, and 460.5Y) for isolated operation. The external HT links (179A, and 179A') or CSFI 170 are also programmed for isolated operation.

A plurality of PMMs are configured as a single unified 8-way physical partition by programmatically configuring all of the internal and external HT links of all of the PMMs (and also CSFI 170, depending on the embodiment) for coherent operation. Those of ordinary skill in the art will recognize that an arbitrary number and arrangement of physical partitions may be configured from PMMs 150, as limited only by the available resources, using the techniques described.

In operation, each PMM is programmatically partitioned according to provisioning information. Physical partitions can be established that have one-half of a PMM (2-way), a single PMM (4-way), or two PMMs (8-way). It will be understood that the number of SMP-ways per half of a PMM is merely illustrative and not limiting as is the configurable topology for aggregation of SMP-ways. Application, Driver, and OS processes are executed on the resultant physical partitions. Each resultant physical partition always includes at least one VIOC. The VIOC provides for communication between the executing processes and other clients of the fabric via packet images in memory, operating as described elsewhere herein.

In selected embodiments, one or both of optional FCIs 413.5 and FCI 413.5' are included, to access boot images or related information, via couplings 414.5 and 414.5' and FCIs 413.5 and 413.5', from either a local mass storage device or via a mass storage network. In some embodiments, an FCI implements four FC ports (i.e. each of couplings 414.5 and 414.5' are representative of four FC ports) and includes an interface between an HT link (such as HT coupling 460.5R) and a pair of included Peripheral Component Interconnect (PCI)-X interfaces coupled to an included Media Data Card (MDC) connector. The MDC connector is in turn coupled to an included Fibre Channel Daughter Card (FCDC) implementing the four FC ports. According to other embodiments, an FCI implements a single FC port or a pair of FC ports. In other embodiments, the optional FCIs are omitted, and mass storage data is accessed via the fabric from mass storage devices or networks via fabric-coupled FCMs 120 or NMs 130 (see the SCSI Transport sections, elsewhere herein).

As suggested by the CSFI variations illustrated by FIGS. 1A and 2, those of ordinary skill in the art will recognize that CSFI 170 may be wholly or partially implemented on the SIM, on the PMM, on a separate module, or any combination of SIM, PMM, and separate module, or any other convenient location. The coherent switch functionality may be implemented in conjunction with the HT links on the PMM, or implemented independently of these functions without substantially modifying the operation. In some embodiments, CSFI 170 is limited to interconnect operating in conjunction with coherency and switching logic implemented internal to the CPU elements included on the PMMs. In other embodiments, CSFI 170 includes some portion of coherency and switching logic operating in conjunction with coherency and switching logic included on the PMMs.

Figure 4C:
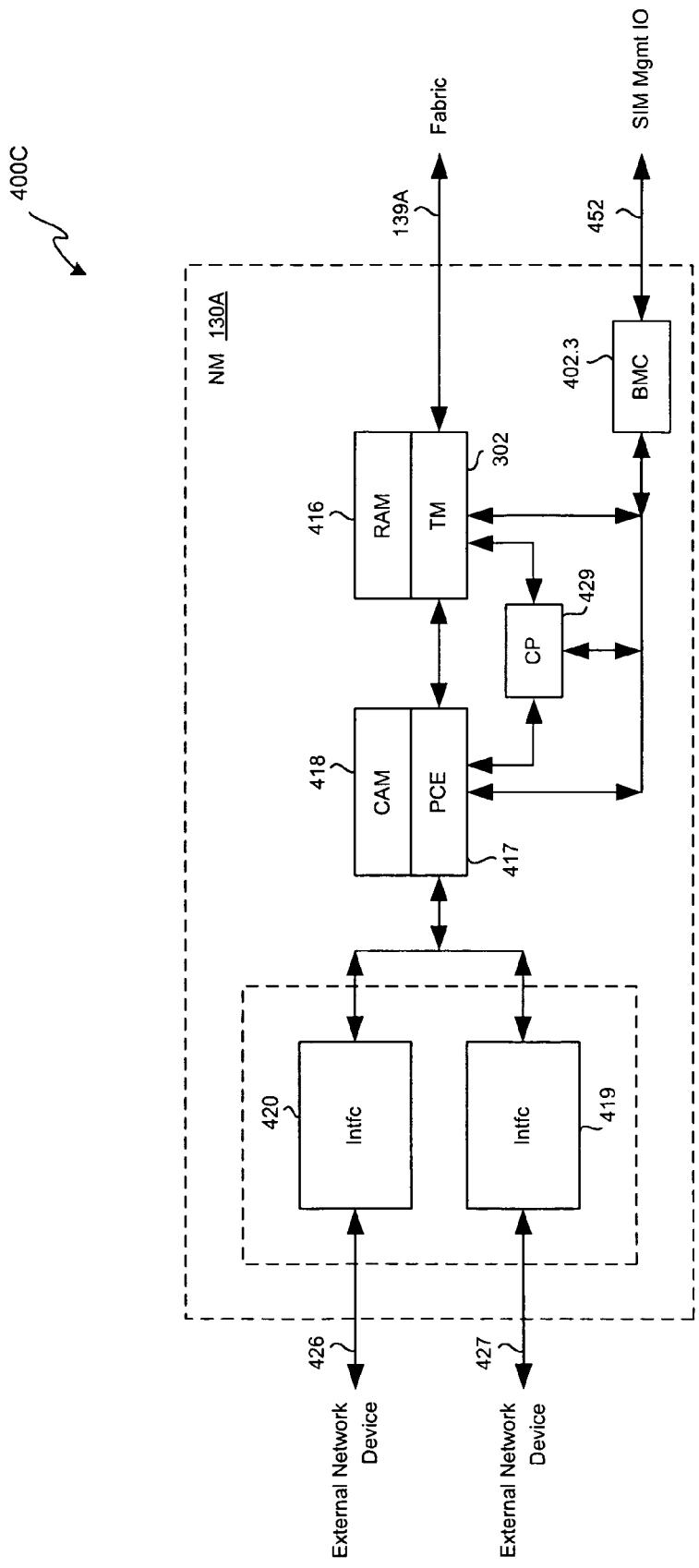
FIG. 4C illustrates selected aspects of an embodiment of a Network Module (NM) configured as a pluggable module.

FIG. 4C illustrates NM Detail 400C, including selected aspects of an embodiment of a Network Module (NM) configured as a pluggable module. NM 130A includes media interface hardware specific to a particular type of network coupling (Interfaces 420 and 419 for couplings 426 and 427, respectively), coupled to network processing elements adapted for packet processing, including Packet Classification and Editor (PCE 417) and associated CAM 418, coupled in turn to Traffic Manager (TM 302). TM 302 is in communication with RAM 416, and provides a fabric interface for NM-Fabric coupling 139A. Control Processor (CP) 429 is coupled to PCE 417 and TM 302. NM 130A also includes BMC 402.3, coupled to CP 429, PCE 417 and TM 302. The BMC provides an interface for coupling 452. While the illustrated embodiment shows CP 429 coupled to Management I/O 412 indirectly via BMC 402.3, in alternate embodiments the CP is coupled to the Management I/O via a coupling shared with the BMC, and in further alternate embodiments the CP is coupled to the Management I/O via a dedicated (i.e. not shared) coupling.

In operation, information (typically in the form of packets) communicated between a network device (typically external to the ES1) coupled to coupling 426 is processed at a low-level and in an interface-specific manner by Interface 420 (the operation of coupling 427 and Interface 419 is substantially similar). Packets received from the network device are provided to PCE 417 for classification and Tag determination, as described elsewhere herein. The packet data and Tag are stored in RAM 416, and provided to the fabric as cells by TM 302 via NM-Fabric coupling 139A. In the reverse direction, cells are reassembled by TM 302 as received from the fabric via NM-Fabric coupling 139A, and the resultant packets are stored in RAM 416. PCE 417 reads the stored packet data, and dynamically modifies it according to any associated Tag information, providing the result to Interface 420 for transmission to the network device via coupling 426.

TM 302 operates as a fabric interface communication unit, and includes a fabric interface communication transmit unit that directly accesses the packet image from RAM via an included DMA unit. The TM examines the packet header and identifies the packet destination address. The packet address and other associated information are referenced in accessing routing and state information maintained in one or more of CAM 418 and RAM 416. The resultant fabric egress port address and other related information are included in headers of cells provided to the fabric to transmit the packet as cells.

TM 302 also includes a fabric interface communication receive unit that operates in a conceptually symmetric fashion. Cells are received from the fabric and reassembled as packets stored into RAM 416 via an included DMA unit. The TM notifies the PCE as new packet data becomes available for editing and transport to Interface 420.

CP 429 manages various HW resources on the NM, including PCE 417 and TM 302, and respective lookup elements CAM 418 and RAM 416. The CP receives management information via coupling 452 (either indirectly via the BMC or directly via a Management I/O coupling, according to embodiment) and programs lookup, forwarding, and data structure information included in CAM 418 (such as associatively searched information) and RAM 416 (such as trie table information).

Figure 4D:
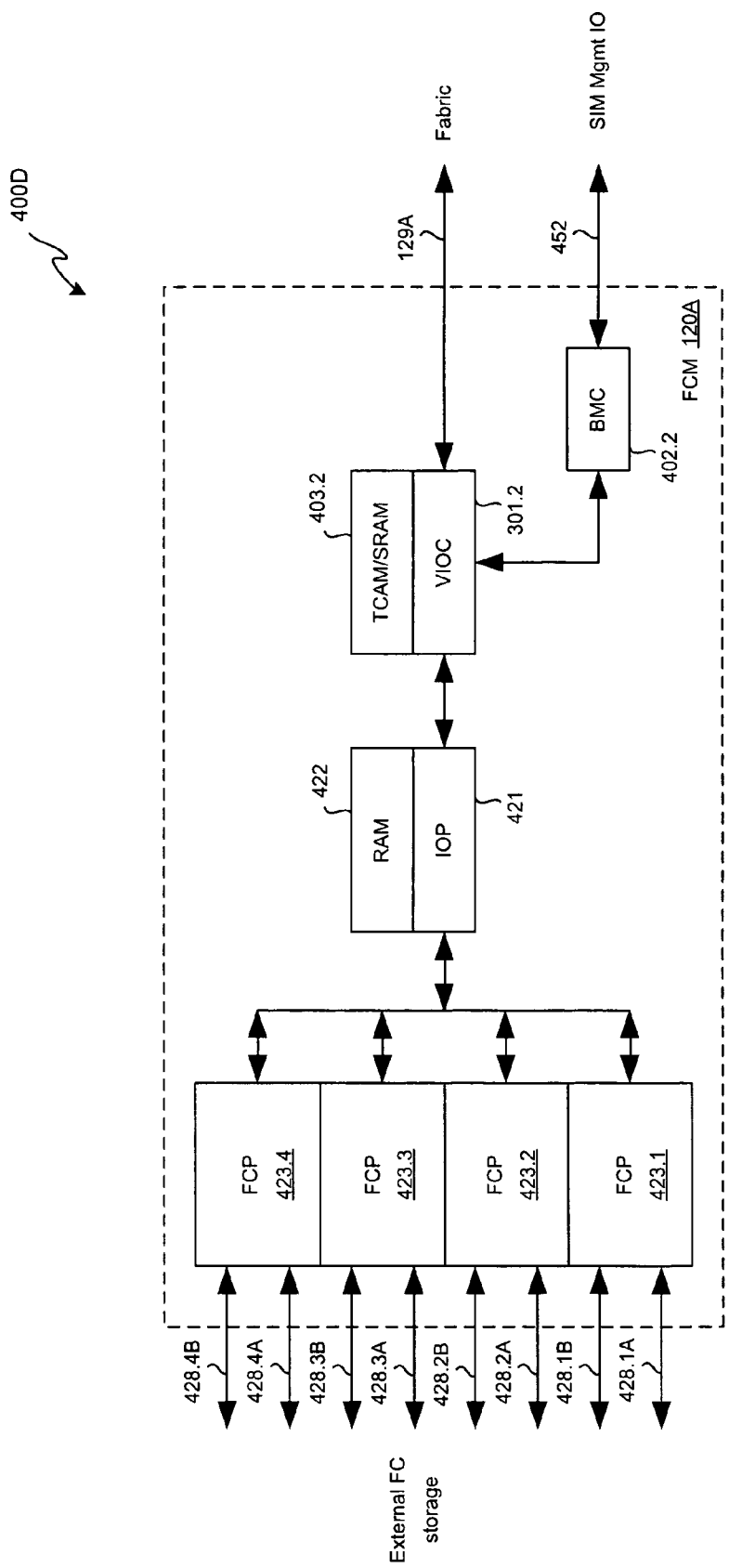
FIG. 4D illustrates selected aspects of an embodiment of a Fibre Channel Module (FCM) configured as a pluggable module.

FIG. 4D illustrates FCM Detail 400D, including selected aspects of an embodiment of an FCM configured as a pluggable module. FCM 120A includes FC compatible couplings 428.1A through 428.4B, each being an FC port, coupled in pairs to Fibre Channel interface Processors (FCPs 423.1-423.4). The FCPs are in turn coupled to a compute and storage element including Input Output Processor (IOP 421) and associated RAM 422, coupled in turn to VIOC 301.2. The VIOC provides a fabric interface for FCM-Fabric coupling 129A. FCM 120A also includes BMC 402.2 coupled to VIOC 301.2 and providing an interface for coupling 452.

In operation, information communicated between FC compatible devices or networks coupled to couplings (or FC ports) 428.1A through 428.4B is processed in a low-level manner by FCPs 423.1-423.4. Information received from external storage devices is typically stored as packets in RAM 422. After optional processing by IOP 421, packet data is transmitted as cells to the fabric by the fabric interface communication transmit unit of VIOC 301.2 via FCM-Fabric coupling 129A (as described elsewhere herein). In the reverse direction, cells are reassembled by VIOC 301.2 as received from the fabric via FCM-Fabric coupling 129A, and the resultant packets are stored in RAM 422. In one embodiment, IOP 421 reads the stored data, providing the end result to FCPs 423.1-423.4 for transmission to the coupled device or network. In an alternate embodiment, FCPs 423.1-423.4 access the data directly via DMA.

In some embodiments, a pair of FCPs is substantially similar to an FCI, and a set of four couplings for FC compatible devices (such as couplings 428.1A, 428.1B, 428.2A, and 428.2B) is substantially similar to four FC ports provided by an FCI (such as the four FC ports accessible via coupling 414.5 of FIG. 4B). In various embodiments, FC ports implemented by any combination of FCIs and FCPs are autosensing 1 Gb/2 Gb/4 Gb/8 Gb ports, 10 Gb ports, or both.

Figure 4E:
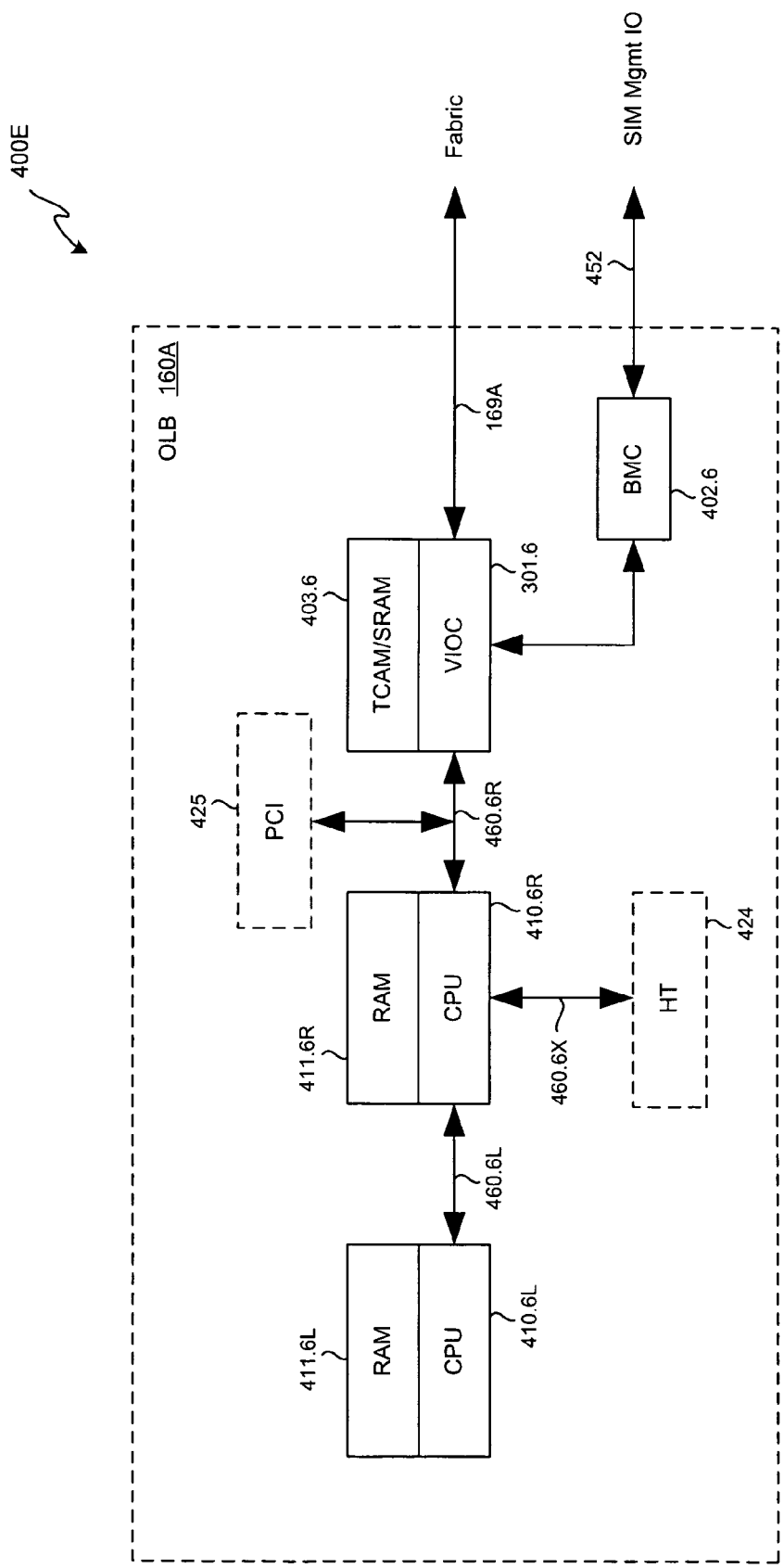
FIG. 4E illustrates selected aspects of an embodiment of an OffLoad Board (OLB), also known as an OffLoad Module (OLM) configured as a pluggable module.

FIG. 4E illustrates OLB Detail 400E, including selected aspects of an embodiment of an OLB configured as a pluggable module. OLB 160A is similar in many respects to Primary SCM 140A, and includes compute and associated memory elements CPU 410.6L/RAM 411.6L coupled to CPU 410.6R/RAM 411.6R via HT coupling 460.6L. VIOC 301.6 is coupled to CPU 410.6R via HT coupling 460.6R. VIOC 301.6 is in communication with TCAM/SRAM 403.6 and provides a fabric interface for OLB-Fabric coupling 169A. PCI sub-module 425 and HT sub-module 424 are optionally included in various combinations and configurations in several embodiments to provide additional service-specific computational capabilities as service acceleration modules. OLB 160A also includes BMC 402.6 coupled to VIOC 301.6 and providing an interface for coupling 452.

PCI sub-module 425 includes a PCI interface for interfacing PCI-adapter based devices to HT coupling 460.6R. HT sub-module 424 includes an HT interface for coupling to CPU 410.6R via coupling 460.6X. Various embodiments of PCI sub-modules and HT-sub-modules further include any number and combination of service-specific hardware accelerators according to implementation, such as an SLB hardware accelerator, an SSL hardware accelerator, and an XML hardware accelerator.

In operation, OLB 160A executes any combination of service processes (relating to SLB, SSL, or XML, for example) using compute and memory resources provided by CPU 410.6L/RAM 411.6L and CPU 410.6R/RAM 411.6R. The CPUs operate as a single SMP complex, communicating shared memory coherency and cache memory coherency transactions via HT coupling 460.6L. The VIOC provides for communication between the executing processes and other clients of the fabric via packet images in memory, operating as described elsewhere herein. Service processes executing on embodiments including any combination of PCI sub-module 425 and HT sub-module 424 access elements of the sub modules in order to accelerate processing related to the service processes.

Figure 4F:
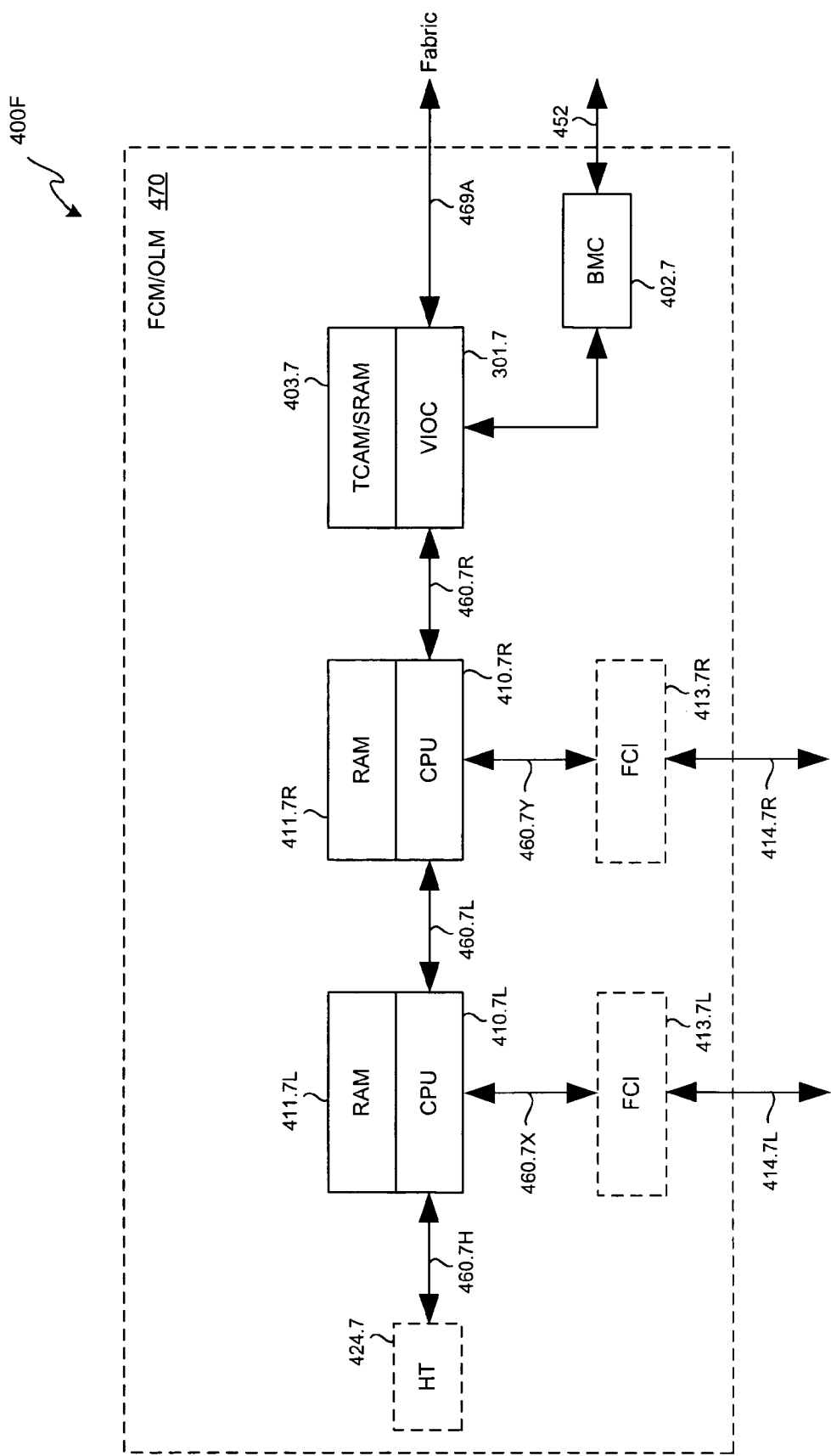
FIG. 4F illustrates selected aspects of an embodiment of an FCM/OLM configured as a pluggable module.

FIG. 4F illustrates FCM/OLM detail 400F, including selected aspects of an embodiment of an FCM/OLM configured as a pluggable module. FCM/OLM 470 includes selected elements of an FCM (see FIG. 4D) and an OLM or OLB (see FIG. 4E), and is usable as an FCM or as an OLM according to various usage scenarios. For example, if optional FCIs 413.7L and 413.7R are omitted and optional HT sub-module 424.7 is included, then functionality substantially similar to an OLM is available. As another example, if the optional FCIs are included and the optional HT is omitted, then functionality substantially to an FCM is available.

FCM/OLM 470 includes compute and associated memory elements CPU 410.7L/RAM 411.7L coupled to CPU 410.7R/RAM 411.7R via HT coupling 460.7L. VIOC 301.7 is coupled to CPU 410.7R via HT coupling 460.7R. VIOC 301.7 is in communication with TCAM/SRAM 403.7 and provides a fabric interface for coupling to a switch fabric (such as Primary Switch Fabric Module 180A) via coupling 469A. FCIs 413.7L and 413.7R and HT sub-module 424.7 are optionally included in various combinations and configurations in several embodiments to provide OLM-like or FCM-like functionality. FCM/OLM 470 also includes BMC 402.7 coupled to VIOC 301.7 and providing an interface for coupling 452.

Operation of FCM/OLM 470 is similar to the operation of an FCM in usage scenarios including the optional FCIs. Operation of the FCM/OLM is similar to the operation of an OLB in usage scenarios including the optional HT sub-module. Other usage scenarios may combine FCM and OLM characteristics when the optional HT sub-module having a service-specific hardware accelerator and at least one optional FCI are included. For example, storage data may be encrypted/decrypted using an FCI for a storage interface and an SSL hardware accelerator for cryptographic processing. Other similar usage scenarios are possible.

In some embodiments the HT sub-module includes a HyperTransport Technology Consortium compatible HTX connector for coupling to compatible modules. In some embodiments an FCI includes a Fibre Channel Controller (FCC) such as a QLogic QS2313, and in alternate embodiments two or more FCCs are included. In some embodiments an MDC included in an FCI includes a pair of substantially similar buses (such as a pair of 64-bit 133 MHz PCI-X buses). In some alternate embodiments only one CPU/RAM is provided and the other CPU/RAM is omitted (for example 410.7R/RAM 411.7R is present and CPU 410.7L/RAM 411.7L is not), thus providing only a single FCI and no HT sub-module.

Throughout the following discussion, and in particular with respect to SCSI transport descriptive information, the term FCM is to be considered representative of any pluggable module implementing FC ports accessible from another pluggable module. The accessibility is typically provided in part by a VIOC included on the FC port providing module, and an associated SF that the VIOC is coupled to. Example modules providing FC ports accessible via an SF include PMMs, FCMs, OLBs, and FCM/OLMs, according to various usage scenarios and embodiments.

Software Layers

Figure 5:
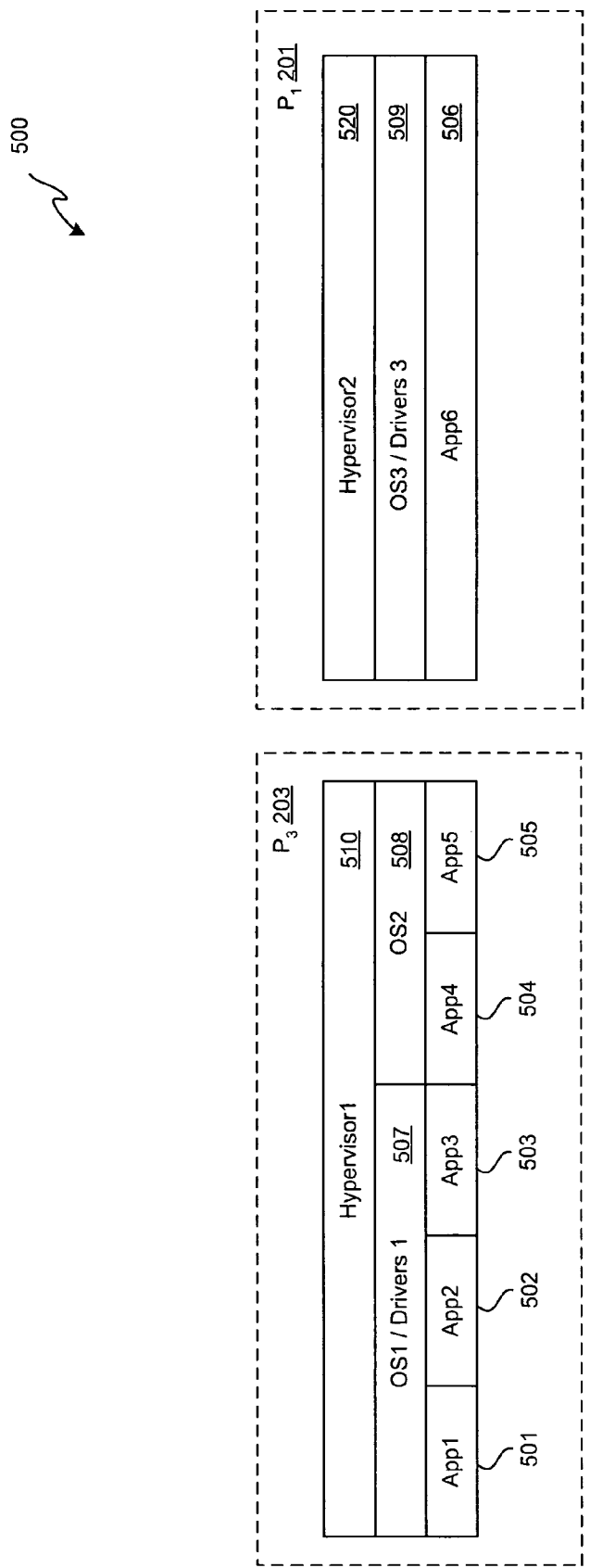
FIG. 5 illustrates selected aspects of embodiments of Software (SW) layers for executing on application processor resources in an ES embodiment.

FIG. 5 illustrates Application SW Layering 500, including selected aspects of embodiments of SW layers for executing on application processor resources, such as CPUs included on PMMs, of an ES embodiment. The layers are represented in a first context for execution on $P_3$ 203, and in a second context for execution on $P_1$ 201. As described elsewhere herein, $P_3$ 203 and $P_1$ 201 correspond to distinct physical partitions configured from one or more PMMs.

Although Application SW Layering 500 is illustrated as representative of a collection of code images, in some contexts it may be useful to consider it as conceptually representative of processes, or groups of processes associated with each of the illustrated elements. For example, Hypervisor1 510 represents a code image of a specific Hypervisor, but it may also be considered conceptually representative of all processes and related execution threads associated with executing any portion of the Hypervisor code image. In typical embodiments, a plurality of concurrent execution streams co-exists and cooperates while executing portions of the code image. Similarly, OS1/Drivers 1 507, App1 501, and so forth, may be considered representative of groups of respective processes associated with each of the respective SW elements.

Illustrated at the highest (most fundamental and privileged) SW layer level is a Hypervisor layer, as shown by Hypervisor1 510 and Hypervisor2 520. Hypervisors typically provide a software environment for executing a plurality of OS instances in an apparently concurrent manner via timesharing on a shared hardware resource, such as $P_3$ 203 or $P_1$ 201, as illustrated in the figure. At the middle SW layer level is an OS layer. As shown, Hypervisor1 510 provides two logical partitions, one for OS1/Drivers 1 507, and another for OS2/Drivers 2 508. Hypervisor2 520 provides a single logical partition for OS3/Drivers 3 509.

In some embodiments the OS layer implements Drivers, including VIOC and VNIC Drivers (not explicitly illustrated). A VIOC Driver provides an interface between management and controlplane processes and VIOCs. VIOC Drivers, in some embodiments, are customized according to OS environment. An OS layer may include one or more VIOC Drivers, depending on embodiment.

A VNIC Driver provides an interface between processes (executing on application processor resources, for example) and communication resources as provided by VNICs (implemented by VIOCs, for example). In some embodiments, a VNIC Driver is conceptually similar to a modified Ethernet Driver. VNIC Drivers, in some embodiments, are customized according to OS environment. In some embodiments, VNIC drivers are further customized according to OS requirements or contexts, such that VNIC drivers within the same OS are distinct. An OS layer may include one or more VNIC Drivers, each having unique functions, parameters, or customizations, depending on embodiment.

The lowest SW layer level, the Application layer, is provided by the OSs for executing Applications. OS1/Drivers 1 507 hosts a plurality of Applications as shown by App1-App3 501-503. Similarly, OS2/Drivers 2 508 hosts two applications, App4 504, and App5 505. OS3/Drivers 3 509 hosts a single application, App6 506.

Execution of SW at the different layers typically results in a plurality of processes or execution streams, corresponding to program execution of various portions or sub-portions of code from the illustrated SW layers. For example, execution of each of Hypervisor1 510, OS1/Drivers 1 507, and App1 501 may result in a plurality of concurrently running processes. One example of a process spawned from OS1/Drivers 1 507 is a Device Driver process, for example a Device Driver process corresponding to execution of the modified Ethernet Driver described elsewhere herein.

In typical embodiments, VIOC Device Drivers are associated with VIOC management and control, and VNIC Device Drivers are associated with VNIC management and control. According to various embodiments, OS1/Drivers 1 507, OS2/Drivers 2 508, and OS3/Drivers 3 509 include various combinations of VIOC and VNIC Drivers. VIOC Drivers, VNIC Drivers, and associated functions may be wholly or partially shared and combined according to embodiment.

Those of ordinary skill in the art will recognize that the illustrated SW layering is only on example embodiment. Other embodiments may include more layers (such as Application sub-layers) or fewer layers (such as dedicated physical partitions requiring no Hypervisor layer). There is also no restriction as to the number and arrangement of Hypervisors, OSs, Drivers, and Applications, other than restrictions imposed by the finite resources in an embodiment.

VNIC Overview and Queuing Operation

As previously described, VNICs provide each processing element with access via a modified Ethernet Driver to other system resources connected to the fabric. For example, each VNIC, in conjunction with transport via the fabric and external communication via an NM, provides capabilities similar to that of a conventional NIC, made available to processes by way of a driver functionally similar to a conventional Ethernet driver. In the general case, the accessible system resources include networking interfaces provided by NMs, storage interfaces provided by FCMs, and computing capabilities provided by SCMs, PMMs, and OLBs. In some embodiments, VNICs are implemented by VIOCs included in modules such as PMMs, OLBs, FCMs, and SCMs, thereby providing processing elements on such modules with access to VNIC capabilities.

VNIC operation generally provides for communication of data directly between processes executing on a Local Processor and the fabric via Local Processor Memory. The Local Processor Memory is typically accessible by the Local Processor and, for example, a VIOC implementing VNIC functionality. Conceptually, a VNIC provides transmit and receive queues for use by processes executing on a Local Processor for communication of data (as packets or messages) to and from the Local Processor Memory.

As VNICs (like conventional NICs) are bidirectional, VNICs also provide access to each processing element from other system resources connected to the fabric. For example, each VNIC on an OLB provides a separate portal to execution resources provided by the OLB. A first VNIC on the OLB may be allocated to and accessed by processes executing on a first provisioned server, while a second VNIC on the same OLB may be used by a second provisioned server. As another example, each VNIC on an FCM provides a separate path to storage resources enabled by the FCM, and each of the separate paths may be accessed by distinct provisioned servers.

See the "Selected VNIC Details" section included elsewhere herein for additional information regarding VNICs as implemented in VIOCs.

VLAN Overview

In some embodiments, each VNIC is a member of one VLAN, which is a port-based VLAN (i.e., a virtual LAN defined by logical connection to a designated subset of available logical L2 switch ports). In other embodiments, each VNIC may be a member of a plurality of VLANs, including at least one port-based VLAN. In various embodiments, the VLANs may be port-based, MAC address-based, IP address-based, and L3 type VLANs. VLANs may be provisioned and managed by programming VNIC address information accordingly and by writing corresponding lookup state (such as that retained in TCAM/SRAMs). VLAN management operations may be relatively static, as related to endpoints included within a server, or relatively dynamic, as related to endpoints external to the server. Internal endpoint VLAN operations include server and cluster provisioning and re-provisioning, VLAN specific provisioning, pluggable module insertion and removal, and failover responses, for example. VLAN operations may be supervised by control-plane processes executing on a SCM (such as Primary SCM 140A), Driver processes executing on Local Processors, or combinations of the two, according to embodiment.

In some embodiments, VLAN related processing for egress data to the fabric includes determining a VLAN identifier. If the VLAN identifier does not match the source VLAN identifier, then the egress data may optionally be dropped, according to embodiment. The source VLAN identifier may be provided directly from a stored per-VNIC VLAN Identifier or derived from a stored value, according to embodiment. If the destination MAC is not identifiable, then the egress data may be flooded to all destinations allowed by the source VLAN configuration, according to embodiment.

In some embodiments, VLAN related processing for ingress data from the fabric includes determining which VNICs, if any, are members of the VLAN identified by the received data, and providing the data to the member VNICs appropriately. If no VNICs are members of the destination VLAN, then the ingress data may be optionally dropped, according to embodiment. In some embodiments, VLAN related broadcasts to VNICs may be wholly or partially implemented using multicast group processing. VLAN ingress processing may optionally include determining the VLAN identifier associated with learning a MAC Source Address (MACSA) associated with the ingress data. Optionally processing may further include dropping the ingress data if the learning VLAN (i.e. the VLAN from which the MACSA was learned from) is different from the destination VLAN.

In some embodiments, VLAN broadcasts are implemented by assigning an MGID to each of the VLAN broadcast groups. In one embodiment there are 32K available MGIDs sharable between VLAN and IP broadcast groups.

Some embodiments implement Independent VLAN Learning (IVL), other embodiments implement Shared VLAN Learning (SVL), and still other embodiments implement IVL and SVL modes and configurable selection between them. IVL and SVL both enforce inter-VLAN isolation (within the same abstraction layer) through confirmation of VLAN membership based on MAC address. In IVL, forwarding entries (i.e., entries of the FIBs) are shared throughout the VLAN on which they are learned, but are not shared with other VLANs. In SVL, forwarding entries learned on a first VLAN are "shared" with other VLANs. Under SVL, a forwarding entry learned for a MAC address on a first VLAN (and therefore unreachable at the same abstraction layer by other VLANs) is used by the other VLANs for the limited purpose of dropping frames addressed to the MAC address on the first VLAN. The MAC address is known by the other VLANs to be unreachable only because of the SVL sharing. In this way, SVL prevents unnecessary flooding within any of the other VLANs, which under IVL would have occurred in a futile effort to reach the MAC address on the first VLAN (which under IVL, is guaranteed to be unknown to the other VLANs).

Static VLAN management operations typically include distribution of VLAN membership information, removing the need for learning VLAN membership changes relating to provisioning, module insertion and removal, and failover responses. Typically VLAN learning operations are performed under the supervision of SCM-based management processes.

VIOC Internals

As previously described, at least one VIOC is included in each of PMM 150A, OLB 160A, FCM 120A, and each of the SCMs 140 (including Primary SCM 140A). Each VIOC typically implements functionality for a plurality of VNICs. The VIOC is illustrated in these various operating contexts in FIGS. 3A, 4A, 4B, 4D, and 4E. VIOC operation was summarized in the pluggable modules section above, in conjunction with an examination of VIOC 301.4 of FIG. 4A. As shown in FIG. 3A, the VIOC 301.5 is coupled and adapted to directly communicate packets 351 between RAM elements 350 and the Primary Switch Fabric Module 180A. The RAM elements are also accessible by one or more CPUs, enabling processes executing on the CPUs to directly exchange data via the fabric. With reference particularly to FIGS. 4A and 4B, CPUs coupled to RAMs accessible by VIOCs in this manner are examples of Local Processors, and the coupled RAMs are examples of Local Processor Memory. RAM elements 411.4L and 411.4R are accessible via an HT Channel 460.4R, and the fabric is accessible via a Common Switch Interface consortium (CSIX) channel 149A.

The transmission and reception of packet (and message) data directly between Local Processor Memory and the fabric corresponds to dataplane functionality. Control of dataplane functionality corresponds to controlplane functionality and conceptually includes forwarding tables and related state information included in part in the TCAM/SRAM. Control packets (also known as VIOC-CP packets) generated by the SCM are received via the fabric and processed by the VIOCs, resulting in selective accesses to configuration registers and the TCAM/SRAM coupled to each VIOC. The forwarding and state information of the TCAMs/SRAMs is typically initialized and maintained in this way. In various embodiments, the control packets are provided by management and controlplane processes executing on any combination of the SCMs, PMMs, and OLBs. Configuration information of a more general nature is typically provided in part by a BMC.

The VIOC and processes executing on the Local Processors communicate in part by sharing portions of the Local Processor Memory space. Included in these shared portions are the packet and message queues as described in the "VNIC Overview and Queuing Operation" section located elsewhere herein. In addition, the VIOC itself appears as an intelligent memory-mapped I/O device residing in a portion of the Local Processor Memory space. In this way, the VIOC provides access to configuration registers and certain state relating to packet (and message) transmission and reception.

The packet transmit and receive descriptors associated with the VNICs describe raw data buffers in the Local Processor Memory where packet data is respectively read and written by the VIOC, via DMA operations, in order to implement VNIC functions. In some embodiments, at least some of the packet transmit and receive descriptors are prefetched into buffers onto the VIOC to improve performance. In certain embodiments, all of the packet receive descriptors corresponding to the VIOC's VNICs are buffered. When reference is made herein to one or more descriptors within or on the VIOC, those skilled in the art will understand that such descriptors are the buffered copies of the same descriptors within the Local Processor Memory. The VIOC operates on the completion queues directly in the Local Processor Memory.

In certain embodiments, the packet CSB's are held within the VIOC to improve performance. The message context state is kept in either the Local Processor Memory, or in memory private to the VIOC (such as the TCAM/SRAM or the DDR DRAM discussed herein below). Since in certain embodiments the packet CSBs that represent the packet queues are held on-chip, and since some descriptors are buffered on-chip, for some conceptual purposes the queues may be thought of as residing within the VIOC. Those skilled in the art will understand that this is an informal abstraction, as the queues actually reside in Local Processor Memory.

Packet and message transmission corresponds to data flowing out from the VIOC to the fabric, also known as VIOC egress, or simply as egress when discussing the VIOC operation. Conversely, packet and message reception corresponds to VIOC ingress, or simply ingress.

Figure 6:
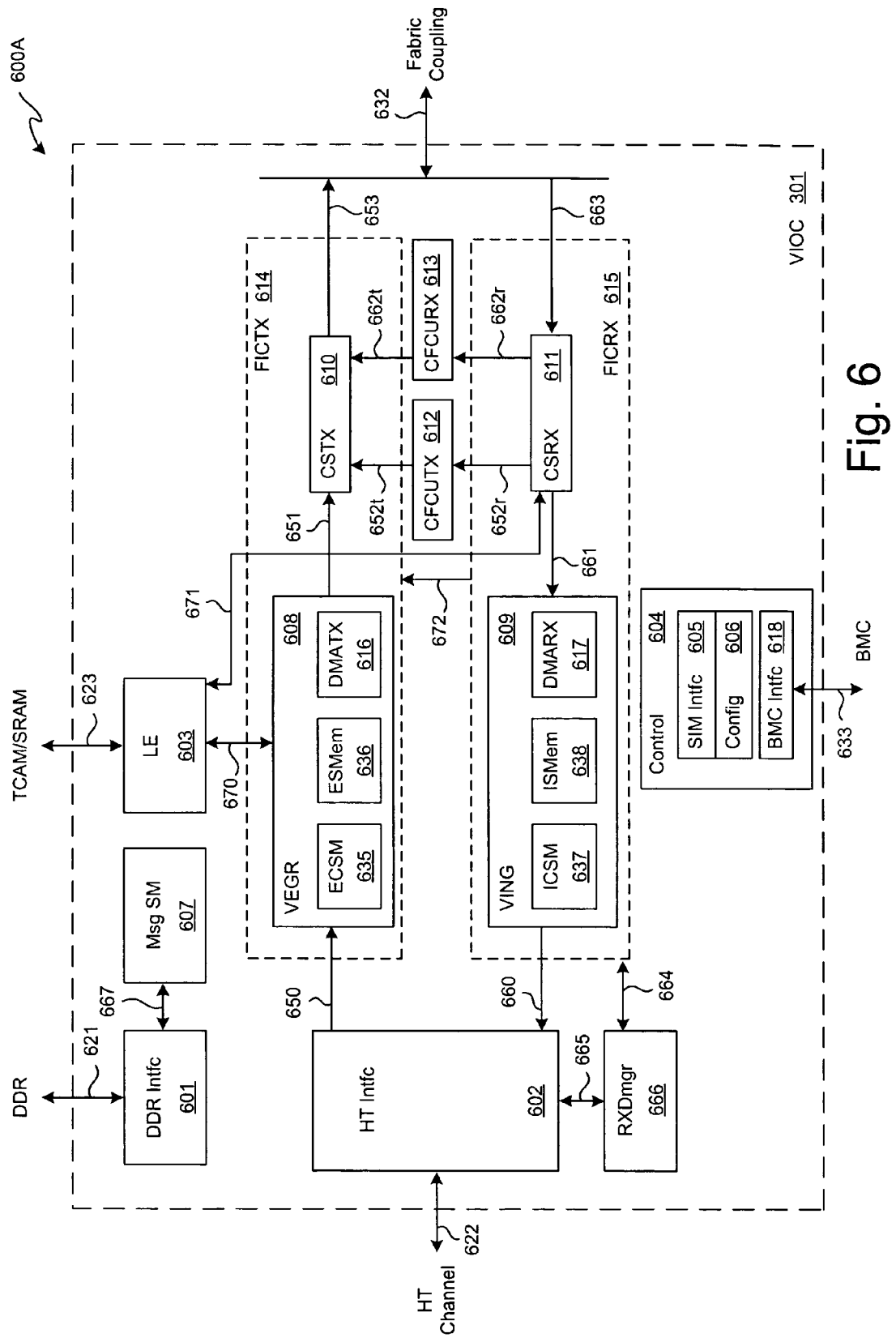
FIG. 6 illustrates selected aspects of an embodiment of a Virtual Input Output Controller (VIOC).

FIG. 6 illustrates selected aspects of one VIOC embodiment as VIOC block diagram 600A. Included in VIOC 301 are several interfaces, including a unit for coupling to Double Data Rate (DDR) DRAM memories (DDR Interface 601) via coupling 621, a unit for coupling to an HT channel (HT Interface 602) via coupling 622, and a block for coupling to a BMC (BMC Interface 618 included in VIOC Control 604) via coupling 633.

Further included in VIOC 301 are FICTX 614 (an instance of a VIOC fabric interface communication transmit unit) and FICRX 615 (an instance of a VIOC fabric interface communication receive unit). FICTX 614 includes egress path elements Vioc EGRess interface (VEGR) 608, and CSix Transmit unit (CSTX) 610. VEGR 608 includes DMATX 616, an instance of a transmit DMA unit; ECSM 635, an instance of Egress Control State Machines; and ESMem 636, an instance of an Egress Shared Memory. FICRX 615 includes ingress path elements Vioc INGress interface (VING) 609, and CSix Receive unit (CSRX) 611. VING 609 includes DMARX 617, an instance of a receive DMA unit; ICSM 637, an instance of an Ingress Control State Machines; and ISMem 638, an instance of an Ingress Shared Memory that in some embodiments is an implementation of the receive logic memory.

Flow control blocks Csix Flow Control Unit Transmit side (CFCUTX) 612 and Csix Flow Control Unit Receive side (CFCURX) 613, included in VIOC 301, are coupled from the receive path to the transmit path. As described in more detail elsewhere herein, CFCUTX 612 is used to temporarily suspend sending by CSTX 610 upon receiving an indication of fabric congestion and CFCURX 613 is used to indicate VIOC congestion to other modules. Other VIOC elements include RXDmgr 666, and shared egress and ingress elements Lookup Engine (LE) 603 and Message State Machine 607. VIOC 301 control elements include VIOC Control 604, in turn including SIM Interface 605, VIOC Configuration block 606, and BMC Interface 618.

For clarity and emphasis, only selected egress and ingress data flows are indicated explicitly in the figure. Generally, egress data enters VIOC 301 via HT Channel coupling 622, and flows from HT Interface 602 to VEGR 608 via coupling 650, under control of DMA read protocols implemented by DMATX 616. The egress data continues to CSTX 610 via coupling 651, exiting CSTX 610 via coupling 653, and exits VIOC 301 via Fabric Coupling 632. Similarly, ingress data flows in a symmetric reverse path, entering via Fabric Coupling 632 and continuing to CSRX 611 via coupling 663 and then to VING 609 via coupling 661. The ingress data proceeds to HT Interface 602 via coupling 660 under control of DMA write protocols implemented by DMARX 617 to exit VIOC 301 via HT Channel coupling 622.

Information related to egress flow control is provided from CSRX 611 to CFCUTX 612 via coupling 652*r*. Egress flow control commands are provided from CFCUTX 612 to CSTX 610 via coupling 652*t*. Information related to ingress flow control is provided from CSRX 611 to CFCURX 613 via coupling 662*r*. Ingress flow control commands are provided from CFCURX 613 to CSTX 610 via coupling 662*t*. Control packet handshaking is provided from FICRX 615 to FICTX 614 as shown by ingress-egress coupling 672.

Although couplings 650, 651, 653, 660, 661, 663, and 672 are illustrated as unidirectional, this is only to highlight the primary flow of data, as control and status information, for example, flows along similar pathways in a bidirectional manner. Internal egress path related coupling 670 and ingress path related coupling 671 illustrate LE 603 request and returning status and result communication with VEGR 608 and CSRX 611, respectively.

VIOC Configuration block 606 includes configuration and mode information relating to operation of VIOC 301, generally organized into registers, including system configuration registers and local configuration registers. The system and local configuration registers are typically accessed by management processes executing on Primary SCM 140A, by control packets sent to Fabric Coupling 632, and then processed by CSRX 611 and SIM Interface 605. The system registers are typically inaccessible to processes executing on Local Processors, and include a plurality of scratchpad registers typically used for communication with the management processes via a scratchpad communication protocol. However, the local registers are typically accessible via the HT channel by Hypervisor, OS, and Driver processes executing on Local Processors. Hypervisor and OS processes typically configure environments for Application processes so that the local configuration registers are inaccessible to the Application processes.

The system registers include VNIC related registers, such as an address block for each of 16 VNICs. Also included is a bit (or mask) per VNIC to enable and disable the corresponding VNIC. The local registers include pointers and state information associated with an I/O block of each of the 16 VNICs.

During initialization and debug, Local Processor access to the system registers may be provided by manipulation of a field in the system configuration registers. In addition, the system and local configuration registers are accessible via BMC command and data information received from BMC Interface 618.

In one embodiment, VIOCs included on controlplane modules (such as SCMs included in SIMs) are initialized by BMC commands to enable selected privileged operations, including transmission via the fabric of control packets without lookup processing (these packets are also referred to as 'No Touch' packets). No Touch packets may be used for control packets (to initialize or modify forwarding information included in TCAM/SRAMs) and to forward an exception packet from an SCM to the proper destination. VIOCs included on other modules (such as PMMs, OLBs, and FCMs) are initialized to disable No Touch packet transmission, i.e. packets (and messages) are always processed with an egress lookup.

SIM Interface 605 is coupled to receive control packets from CSRX 611 as typically provided by controlplane processes executing on an SCM included in a SIM. The control packets are parsed to determine the included command and any associated parameters, such as address and data. SIM Interface 605 then passes the command and parameters to the proper element of VIOC 301 for execution. Return handshake status is typically provided in the form of a packet addressed to the sending SCM from FICRX 615 to FICTX 614 via ingress-egress coupling 672, and FICTX 614 provides the packet to the fabric.

BMC Interface 618 includes logic for interfacing to a BMC, including receiving, processing, and responding to BMC commands received via coupling 633. The interface parses the command, provides the command and any associated parameters to the proper unit of VIOC 301, and returns response information as appropriate.

HT Interface 602 includes an HT Channel compatible external interface providing read and write style accesses to resources available via coupling 622. Read response information (typically associated with egress processing) is provided to VEGR 608 via coupling 650. Write information (typically associated with ingress processing) is provided from VING 609 via coupling 660. In a typical usage scenario, the read and write accesses target memory locations in RAMs coupled to CPUs coupled in turn to HT Channel coupling 622 (i.e. Local Processor Memory). HT Channel coupling 622 is an illustrative instance of HT couplings including 460.4R, 460.5R, 460.5R', 460.6R (of FIGS. 4A, 4B, 4B, and 4E, respectively).

DDR Interface 601 includes logic for coupling to DDR DRAMs via coupling 621. DDR Interface 601 communicates with Message State Machine 607 via coupling 667, as shown. DDR Interface 601 also communicates with other elements of VIOC 301 via implicit communication paths that allow access to the DRAMs via control packets (SIM Interface 605), BMC commands (BMC Interface 618), and processes executing on Local Processors (HT Channel coupling 622), in addition to VIOC internal requests (Message State Machine 607, VIOC Control 604, FICTX 614, and FICRX 615). The topology of these paths will be understood by those of ordinary skill in the art. In various embodiments, DDR SDRAM typically includes data structures related to context and message related processing (such as CSBs), as well as virtual to physical address translation for transmit and receive buffer addresses in Local Processor Memory.

Message State Machine 607 manages message state (including connecting, established, closing, and closed) for a plurality of message contexts, such as those associated with the 16 VNICs, according to a connection-oriented reliable protocol. According to 16 embodiment, message state is stored in part in DDR coupled via coupling 621 to DDR Interface 601, and coupling 667 communicates requests for DDR reads and writes, as well as resultant read data between the state machine and the DDR interface. The state machine also provides for message handshaking and re-delivery attempts by appropriate processing and communication with FICTX 614 and FICRX 615, via implicit couplings that will be understood to those of ordinary skill in the art. For example, message related inspection and processing of incoming information may be performed in CSRX 611 under the direction of Message State Machine 607. Similarly, message related processing and information insertion may be performed in CSTX 610 also under the control of the state machine. Further included in Message State Machine 607 are logic units for performing any combination of RDMA and DDP, according to various embodiments.

RXDmgr 666 includes logic for fetching and prefetching receive descriptors to support ingress operation. Receive descriptor requirements and results are communicated with FICRX 615 via coupling 664. Requests to read descriptors from Local Processor Memory are provided to HT Interface 602 via coupling 665, and returning data is returned via coupling 665.

FICTX 614 includes logic (VEGR 608) implementing egress path processing, including accessing packet data for transmission and cellification using DMA protocols, according to configured priorities and bandwidth allocations, and including one lookup (LE 603 via coupling 670). The lookup typically provides a fabric egress port based in part on the packet destination address (typically a MAC address) and relevant VLAN related information. The included logic also implements packet data cellification and CSIX cell-level processing (CSTX 610). An overview of selected aspects of packet access and cellification is provided with respect to FIG. 3A. In some embodiments, FICTX 614 processes selected multicast packets (and hence cells) using cell-level multicast capability provided by the fabric.

VEGR 608 includes logic blocks performing packet egress processing functions including transmit queue management and scheduling, transmit packet scheduling, packet segmentation into cells (including a packet address processing lookup via LE 603), various control state machines within ECSM 635, and an egress shared memory ESMem 636. DMATX 616, included in VEGR 608, is configured to transfer packet image data from Local Processor Memory to the egress shared memory, and further configured to transfer data from the egress shared memory to CSTX 610. In an illustrative embodiment, the VOQs are implemented as pointer managed buffers that reside within the egress shared memory. The DMA transfers are managed by the control state machines in VEGR 608 according to bandwidth and priority scheduling algorithms.

CSTX 610 includes logic blocks performing cell egress processing functions. Logic units in CSTX 610 read cell data according to the VOQs as scheduled by a VOQ prioritizing algorithm, calculate horizontal parity, vertical parity, and CRC for each cell, and then send the results and the cell data to the fabric. Logic units in CSTX 610 include CSIX egress queue structures and associated transmit data path (FIFO) buffers, CSIX compatible transmit flow control logic responsive to information received from CFCUTX 612, logic responsive to information received from CFCURX 613 (to apply fabric back-pressure using CSIX compatible receive flow control instructions), and a transmit-side CSIX compatible external interface for Fabric Coupling 632.

CFCUTX 612 (shown outside of FICTX 614 in the figure, but closely associated with egress processing) includes fabric congestion detection logic and VOQ feedback control logic to instruct CSTX 610 to stop sending cell traffic from a VOQ when fabric congestion is detected. When the congestion is relieved, the logic instructs CSTX 610 to resume cell traffic from the stopped VOQ. Fabric congestion information is provided to CFCUTX 612 from CSRX 611 as it is received from the fabric.

The VOQ prioritizing algorithm implemented in CSTX 610 includes configurable weighted round-robin priority between unicast output queues and multicast output queues, round-robin priority among VOQ groups, and straight priority within VOQ groups. The algorithm also guarantees that all cells associated with a given packet are sent in order, and further that cells from different packets from the same VOQ are not intermingled. In other words, once a first cell for a packet from a selected one of the VOQs is sent, then the remainder of the cells for the packet are sent before any cells of any other packet from the selected VOQ are sent.

FICRX 615 includes logic implementing ingress path processing, including CSIX cell-level processing (CSRX 611), and packet-level processing (VING 609), including storing reassembled packets using DMA protocols. An optional lookup (LE 603) is performed under the control of CSRX 611 via coupling 671. The lookup provides information related to processing the packet, including mapping the packet to the proper receive queue.

CSRX 611 includes logic blocks performing cell ingress processing functions. Logic units in CSRX 611 receive, buffer, and parse cell data from the fabric. Logic units in CSRX 611 include a receive-side CSIX compatible external interface for Fabric Coupling 632, CSIX ingress queue structures and associated CSIX receive data path (FIFO) buffers, a CSIX cell parser unit, and transmit and receive flow control information detection logic.

CFCURX 613 (shown outside of FICRX 615 in the figure, but closely associated with ingress processing) includes VIOC congestion detection logic and fabric feedback control logic to instruct the fabric to stop sending cell traffic of a specific priority when VIOC congestion is detected for that priority. When the congestion is relieved, the logic instructs the fabric to resume cell transmission. Receive flow control instructions to the fabric are communicated via CSTX 610. This method of congestion relief is referred to elsewhere herein as applying fabric back-pressure.

Cell data is received from the fabric, including horizontal parity, vertical parity, and CRC. The parities and CRC are computed for the received data, checked, and errors logged. Cell and packet headers are parsed, and in some embodiments an optional lookup is performed (LE 603) for selected unicast packets to determine in part an appropriate receive queue. In some embodiments, an optional lookup is performed for multi cast packets, VLAN broadcast packets, or both, according to embodiment, to determine in part one or more appropriate receive queues or multicast group identifiers, also according to embodiment. Unicast lookups (if performed) are typically based in part on a source fabric port address and a context key included in the packet header. Some embodiments omit unicast lookups entirely. Control packet data is written into a control packet portion of the CSRX's FIFOs, and subsequently sent to SIM Interface 605 for further processing, while non-control packet data is written to a data portion of the CSRX's FIFOs.

VING 609 includes logic blocks performing packet ingress processing functions including receive and completion queue management and scheduling, receive packet scheduling, cell reassembly into packets, various control state machines, and an ingress shared memory. DMARX 617, included in VING 609, is configured to transfer cell data into Local Processor Memory from the Ingress Shared Memory (ISMem 638). The DMA transfers are managed by the Ingress Control State Machines (ICSM 637) in VING 609. A receive buffer is considered complete (or consumed) when either the last available location in a buffer is written, or the last cell of a packet is written. Buffer completion is indicated by writing an entry to one of the completion queues, with data including packet receive status (Error or OK), receive processing (or thread) number, and context key (if the data includes the last cell of the packet). The completion queue write information optionally includes results of packet-level CRC and 1's complement computations for use by Driver or other processes executing on the Local Processors.

VING 609 controls movement of cell data from the ingress shared memory (ISMem 638) to Local Processor Memory during packet reconstruction according to various receive scheduling algorithms, including determination of buffers in the Local Processor Memory, selection of cell data to transfer, and movement of the packet data to the Local Processor Memory. Buffers are determined by processing receive descriptors, and in some embodiments the receive descriptors are fetched and processed according to a round-robin priority between the groups of receive queues. Cell data is scheduled for transfer to the Local Processor Memory according to a selection between unicast and multicast queues for insertion into the receive queues. This is followed by a weighted round robin-scheduling algorithm between the groups of receive queues, according to various embodiments. Packet data movement into the Local Processor Memory is also directed in part according to flow control information from HT Interface 602 that VING 609 responds to in order to prevent overrunning limited resources in the HT interface.

Fabric Coupling 632, in one embodiment, includes a Fabric Interface Chip (FIC) providing low-level functions relating to coupling to an embodiment of SFM 180 that includes Fabric Switch Chips (FSCs). Fabric Coupling 632 is an illustrative instance of generic fabric couplings, which in the system as a whole further includes FCM-Fabric coupling 129A, NM-Fabric coupling 139A, OLB-Fabric coupling 169A, PMM-Fabric coupling 159A, and PMM-Fabric coupling 159A', for example.

LE 603 includes TCAM and SRAM interfaces, and accepts egress lookup requests from VEGR 608 and ingress lookup requests from CSRX 611. Lookup requests include a key and a look up transaction identifier. The TCAM is searched for a first entry matching the key, and if a match is found, a corresponding entry from the SRAM is read. When processing is complete and lookup information available, the requestor is notified by a handshake, and the transaction identifier, a match indication, and result data (if a match) are returned to the requestor (one of VEGR 608 and CSRX 611). Request processing is pipelined in LE 603, but if the Lookup Engine is unable to accept a request, then an acceptance delayed indicator is provided to the requestor. In one embodiment the key and the results are each 64 bits, both are multiplexed in two 32-bit chunks, and the transaction identifier is 4 bits.

In addition to lookup requests during egress and ingress processing, LE 603 supports directly reading and writing the TCAM and SRAM to examine and modify lookup information, via requests from BMC Interface 618, SIM Interface 605, and HT Interface 602.

In operation, VIOC 301 and related components are initialized to set configuration, mode, initial state, and other related information. For example, selected management and configuration control information maintained in VIOC Configuration block 606 is written by an external BMC via coupling 633 and BMC Interface 618. Additional information is optionally written by an external agent via packets received from Fabric Coupling 632, CSRX 611, and SIM Interface 605. Additional information may also be optionally written by an agent coupled to HT Channel coupling 622 via HT Interface 602. Typically, the management and configuration control information is provided by management processes executing on Primary SCM 140A, as described elsewhere herein.

Initial (as well as subsequent) ingress and egress lookup information, including forwarding, VLAN, and multicast information, is typically provided by controlplane and related processes executing on Primary SCM 140A. The information is included in packets sent by the processes and received via Fabric Coupling 632, CSRX 611, and SIM Interface 605. The lookup information is stored in TCAM/SRAM resources coupled to VIOC 301 via TCAM/SRAM coupling 623 by LE 603. Portions of state stored in the TCAM/SRAM may also be optionally initialized by the agent coupled to HT Channel coupling 622 via HT Interface 602 and LE 603.

After initialization, VIOC 301 and related elements are available for directly communicating packets (and messages) between clients coupled to the fabric, as described with respect to FIG. 3A and FIG. 4A. The communication is bidirectional, including egress (from Local Processor Memory to fabric) and ingress (from fabric to Local Processor Memory), and is typically accessible to processes executing on Local Processors via a VNIC-style interface.

Egress operation serves to directly transmit a buffer of packet data, as provided by a Driver process in conjunction with an OS executing on a Local Processor, to the fabric. The Driver (or optionally an Application process) forms a packet image within the buffer. A transmit descriptor, including the physical address of the buffer, the buffer size, a valid indicator, and a done indicator, is fabricated by the Driver and placed on one of the transmit descriptors. The valid indicator is asserted by the Driver to indicate the descriptor is ready for processing by VIOC 301. The done indicator is initially deasserted by the Driver and later asserted by VIOC 301 when the descriptor and the underlying buffer data have been fully processed by the VIOC. Upon assertion of done the buffer is available for subsequent use by the Driver.

After forming the packet image and the transmit descriptor, in one illustrative scenario, the Driver informs VIOC 301 that additional packet data is available for transmission by accessing a corresponding Doorbell, asynchronously interrupting VIOC 301. The Doorbell access is sent via HT Channel coupling 622, received by HT Interface 602, and processed by VIOC Control 604. In another illustrative scenario, instead of the Doorbell access, VIOC 301 polls transmit descriptors, examining the associated valid indicators, to determine that additional packet data is available for transmission.

When additional packet data is available for transmission, VEGR 608 accesses the transmit queue using DMA processing functions included in DMATX 616 according to various bandwidth and priority scheduling algorithms. Algorithms implemented by the priority scheduling of the transmit queue accesses include straight priority, round-robin, and weighted round-robin, and priority is determined between transmit packet queues and transmit message queues. The information obtained from the queue includes a descriptor including a pointer to the new packet images. VEGR 608 analyzes the descriptor, providing the pointer to DMATX 616 and requesting additional accesses to begin to read in the packet image. The packet image begins with a packet header, including packet destination and priority information. VEGR 608 formats information from the packet header, including the destination, along with VLAN processing related information, into a lookup request in a suitable format, and passes the request to LE 603. LE 603, in turn, accepts the request when room for the request is available, and processes it by accessing the coupled TCAM/SRAM. The lookup result, including a destination fabric port address, is used in forming appropriate cell headers, including a fabric destination port address. Packet data is cellified and sent to CSTX 610 for further processing.

CSTX 610 receives the cellified packet data, including cell header information, and processes the data according to VOQ prioritizing algorithms. Cell data is sent according to the configured priority algorithm, and CSTX 610 is further responsive to flow control instructions received from CFCUTX 612. Cell parities and CRC are calculated and provided to Fabric Coupling 632 along with the cell header and data information.

Ingress operation is conceptually the reverse of egress operation, and serves to directly receive packet data into a buffer in Local Processor Memory, the buffer being directly accessible by a Driver process (and optionally an Application process) executing on a Local Processor. A receive descriptor, including the physical address of the buffer, the buffer size, and a valid indicator, is fabricated by the Driver and placed on one of the receive descriptor queues. The valid indicator is asserted by the Driver to indicate the descriptor is ready for use by VIOC 301. Typically VIOC 301 prefetches (under the direction of RXDmgr 666) and preprocesses one or more receive descriptors in preparation for receiving cell data and storing it into a new receive buffer in Local Processor Memory. A completion queue entry is written by VIOC 301 when the buffer has been filled with packet image data.

CSRX 611 receives CSIX cells, checks parities and CRC for the received cells, parses cell headers, and for the first cells of packets, parses a packet header. Information related to flow control is provided to CFCURX 613, and fabric back-pressure is applied (via CSTX 610) when VIOC congestion is detected. A lookup is performed via LE 603 for the first cells of multicast packets, to determine proper destinations and required replication of the packet. Further within CSRX 611, control packet data is FIFOed for presentation to and processing by SIM Interface 605, while non-control packet data is FIFOed for further data path processing.

VING 609 directs DMARX 617 to store received non-control packet data as complete or partially reassembled packets into Local Host Memory via DMA transfers according to various receive scheduling algorithms. When a buffer is completely filled (or the last datum of a last cell of a packet is stored), VING 609 directs writing a corresponding completion queue entry, including status (Error or OK), thread number, context key, and optionally packet-level CRC and 1's complement results. This completes the reception of the packet (if the last cell was received) and the packet image is available for use directly by the Driver (or optionally an Application) process executing on a Local Processor.

Control packets are sent in-order to SIM Interface 605 for further processing. SIM Interface 605 parses the control packet and passes command, address, and data information to the appropriate VIOC element for execution. Return handshake status and result information is typically provided via ingress-egress coupling 672 as a packet (typically addressed to an SCM) for transmission to Fabric Coupling 632. Control packets, typically provided from a controlplane process executing on Primary SCM 140A, may be used at any time to effect updates or changes to forwarding, VLAN, multicast, and other related state information included in TCAM/SRAM coupled to VIOC 301.

Egress and ingress buffer operation is not restricted to physical addresses, as virtual addresses may be supplied in transmit and receive descriptors. VIOC 301 references coupled DDR DRAM via coupling 621 to access translation mapping information. The VIOC then translates the virtual addresses to physical addresses and processing proceeds accordingly.

During message operation, Message State Machine 607 manages various aspects of the reliable connection-oriented protocol, and directs overall processing according to message related queues and associated descriptors. The reliable protocol includes handshake and retry information that is communicated from VING 609 to VEGR 608 via ingress-egress coupling 672 for communication as messages on Fabric Coupling 632. Message operation is otherwise similar to packet operation.

Some embodiments implement packet operation only, while other embodiments implement packet and message operation. Embodiments implementing only packet operation omit Message State Machine 607 and associated processing logic.

Those of ordinary skill in the art will recognize that VIOC 301 is an example embodiment only. For example, consider that in other embodiments the external couplings may have differing bandwidths to that described heretofore. For example, a VIOC used in a controlplane context, such as an SCM included on a SIM, may be implemented with reduced bandwidth variations of Fabric Coupling 632 and HT Channel coupling 622 compared to a VIOC used in a dataplane context, such as a PMM. In one embodiment, the VIOC included in the SCM is coupled to the SFM via one-half the coupling bandwidth of the VIOC included in the PMM. In another embodiment, the VIOC included in the OLB is coupled to the SFM via one-half the coupling bandwidth of the VIOC included in the PMM.

Those of ordinary skill in the art will also recognize that the partitioning illustrated in VIOC 301 is only illustrative, and that any number of other arrangements and variations may be implemented. For example, the functions relating to SIM Interface 605, VIOC Configuration block 606, and Message State Machine 607, may be incorporated within the control state machines of VEGR 608 and VING 609. Functions implemented in the blocks of FICTX 614 and FICRX 615 may be rearranged in other equivalent organizations. These and other such arrangements are contemplated in various embodiments.

SCSI Transport Overview

EF system implementations of remote FC access via SCSI transport provide several key features, including reduced FC switch port usage, reduced complexity and clutter in a cluster environment, and consolidated FC resources, with small (or no) impact on Hosts (such as PMM cards) where end user applications execute.

In some embodiments the SCSI transport mechanisms described herein support FC SAN (and SCSI) in an enterprise data center context. In some embodiments end user applications are executed under a Linux OS. In some embodiments the SCSI transport mechanisms are implemented in a Linux OS environment. In some embodiments IP SAN (and iSCSI) are supported.

Traditionally an enterprise class server has I/O connectivity to one or more SANs via one or more HBAs. HBAs encapsulate SCSI block commands and data into FC frames and transport them across the SAN to a target Redundant Array of Inexpensive Disks (RAID) array or disk.

A cluster system (such as an ES) includes multiple servers interconnected with each other, working together, and executing several user applications. Each server requires access to storage data in the SAN, and hence there is a need to have an HBA capability in each server.

A reduction in FC switch port usage is accomplished by multiplexing I/O traffic (SCSI/FC for example) from several servers to a few HBAs in a cluster, and HBAs are more efficiently utilized. Expenses involved in cluster deployment as well as maintenance overhead are reduced.

SCSI Transport Storage Stack Layering and SCSI/FC Concepts

In an example operating context, if an I/O operation involves a SCSI device, then read and write operations eventually result in one or more SCSI operations. The SCSI operations may be encapsulated by one or more protocols such as FC, iSCSI (TCP/IP), and Serial Storage Architecture (SSA) based in part on an underlying transport interconnect. SCSI devices (including disks, tapes, scanners, and other similar input/output elements) present themselves as block devices to an OS. This enables file systems, volume managers, and user applications to invoke block level operations on the SCSI devices.

Figure 7:
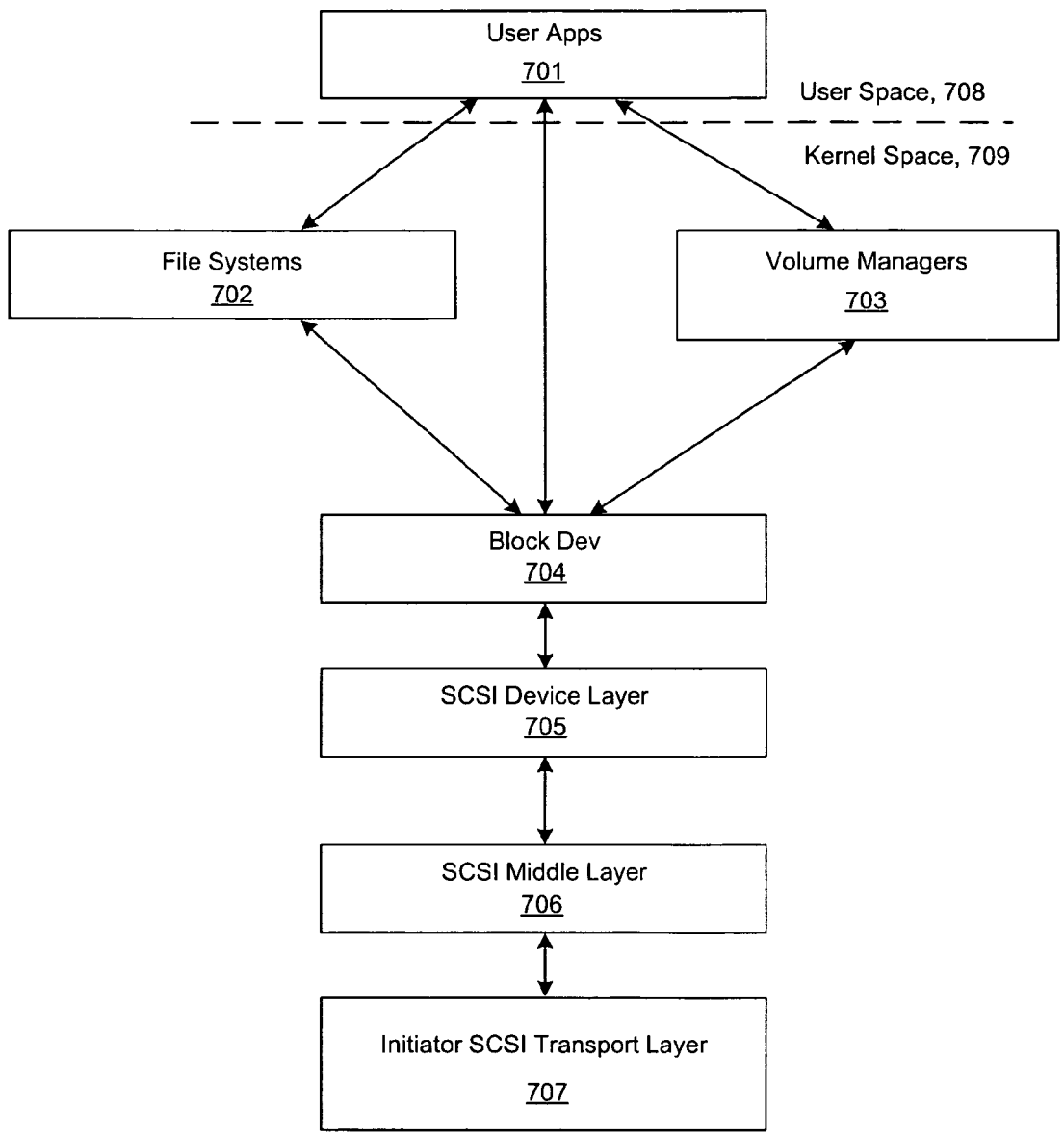
FIG. 7 illustrates an embodiment of a storage stack organization compatible with SCSI transport for fabric-backplane ES systems.

FIG. 7 illustrates an embodiment of a storage stack organization compatible with SCSI transport for fabric-backplane ES systems. In some embodiments the storage stack is similar to a Linux storage stack, and in some usages scenarios it may be operated as a Linux storage stack. The stack is implemented in user and kernel spaces, as shown by subdivisions User Space 708 and Kernel Space 709, respectively. Applications invoked or operated by users are implemented in the user space (as illustrated by User Apps 701). OS and driver functions are implemented in the kernel space, and include File Systems 702 (such as "ext3", "reiser", and other similar file system implementations), Volume Managers 703 (such as "LVM" and other similar volume manager implementations), and Block Dev 704. SCSI functions or modules further implemented in the kernel space are subdivided into three separate layers: SCSI Device Layer 705, SCSI Middle Layer 706, and Initiator SCSI Transport Layer 707.

The SCSI device layer is considered the top or upper layer of the SCSI layers, and includes functions specific to processing for a selected type of SCSI device (such as a disk, a tape, or a scanner). The SCSI middle layer provides a common unifying layer for processing associated with device discovery, dispatching commands to a lower (bottom or transport) layer, timeouts, retries, and exceptions. The SCSI transport layer is considered the bottom or lower layer of the SCSI layers, and includes functions for encapsulating SCSI commands and data blocks using a native transport protocol. The transport layer provides transport of data to the target via the native transport protocol (such as iSCSI SSA and SCSI parallel).

SCSI includes fundamental concepts of an initiator and a target. The initiator, as the name indicates, initiates a command for reading/writing data from/to the target. The target receives the command and responds by reading/writing data from/to a storage medium (such as a disk or a tape). The initiator may also issue commands not involving data transfer, such as task management commands to the target.

Figure 8:
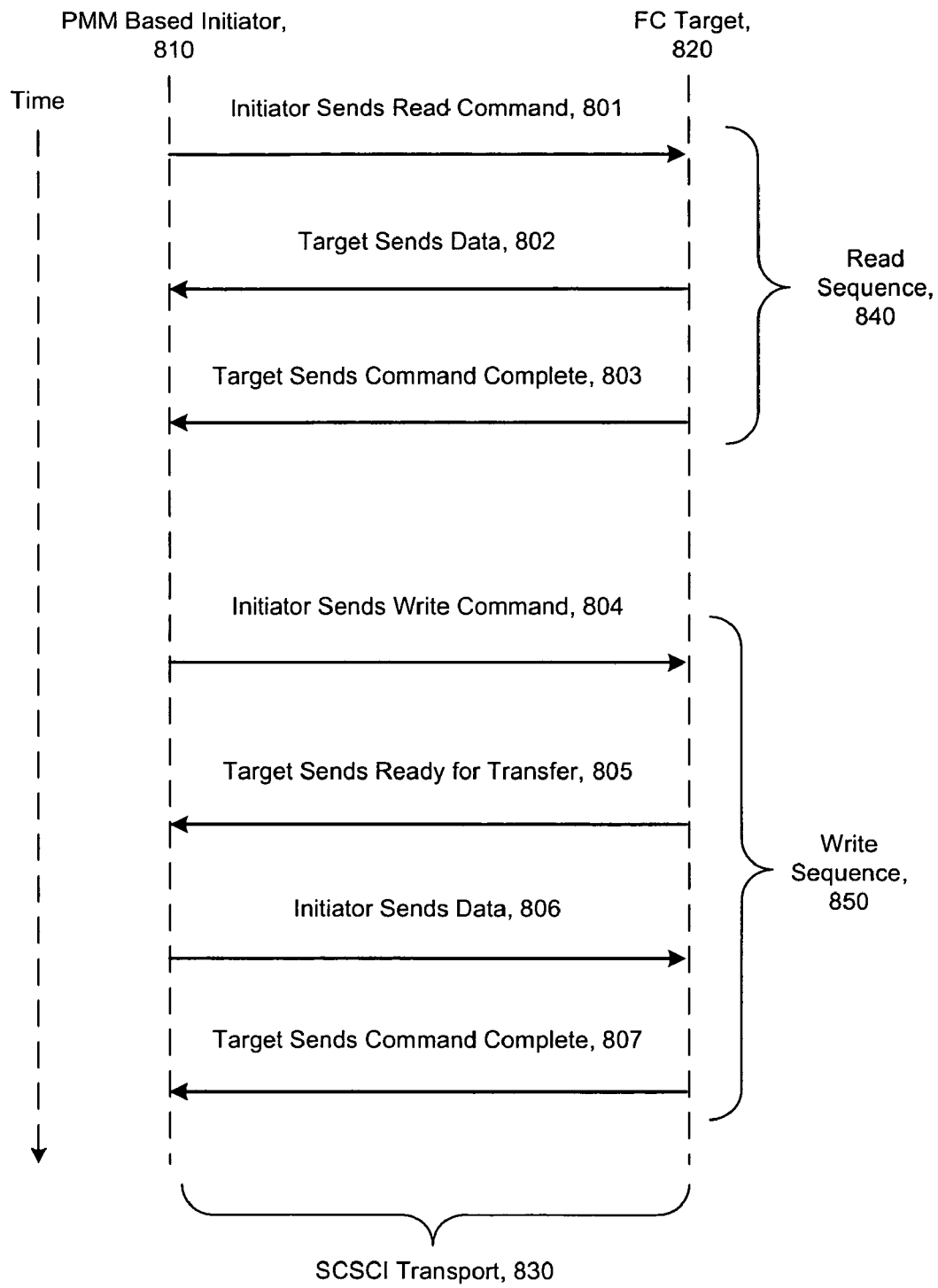
FIG. 8 illustrates an embodiment of SCSI command sequencing over SCSI transport in an ES system.

FIG. 8 illustrates an embodiment of SCSI command sequencing over SCSI Transport 830 in an ES system between an initiator and a target. The SCSI transport is representative of a communication channel between PMM-based Initiator 810 and FC Target 820. A single SCSI command may result in multiple data transfers between the initiator and the target. Reads, illustrated by Read Sequence 840, begin with an initiator in an ES system (implemented, for example, in a PMM) issuing a read command ("Initiator Sends Read Command" 801) to a target (such as an FC device reachable via an FCM). The read command is relayed via the FCM that is coupled to the FC device implementing the target. The target returns read data ("Target Sends Data" 802) and read status ("Target Sends Command Complete" 803). The read data and status are relayed via the FCM. The read command, data, and status are further transported via one or more SFs and optionally one or more networks (such as a LAN or the Internet), according to various usage scenarios. Those of ordinary skill in the art will recognize that initiators are not limited to PMMs, but may also be provided by other fabric-coupled modules having processors such as SCMs and OLMs.

Writes, illustrated by Write Sequence 850, begin with the initiator in the ES system (such as the foregoing PMM) issuing a write command ("Initiator Sends Write Command" 804) to the target (such as the foregoing FCM). The write command is relayed via the FCM to the FC device implementing the target, and the relaying may include an RDMA (or DDP)-related handshake between the PMM and the FCM. The target provides a readiness indication ("Target Sends Ready for Transfer" 805) and then the initiator supplies data ("Initiator Sends Data" 806). The target then communicates write status ("Target Sends Command Complete" 807). The readiness indication, data, and write status are related via the FCM. The write command, data, and status are further transported in the same manner as the read command, data, and status.

SCSI uses a four dimensional addressing scheme (SCSI-bus-id, channel-id, target-id, and Logical Unit Number identification or LUN-id). In embodiments where SCSI is transported via FC, SCSI-bus-id and channel-id are mapped into HBA-id. Target-id is mapped into a FC World Wide Name or FC-WWN of a port of the target and eventually into a destination FC address of the target port with LUN-id as a LUN-id within the target.

Every SCSI command results in an FC exchange, and the logical components of the command (such as specific command, data, and response) become sequences within the exchange. Exchanges and sequences are identified by fields within FC frame headers. The SCSI command is mapped into FC protocol information units as follows:
  SCSI Command is mapped as FCP_CMND;
  SCSI data is mapped as FCP_DATA;
  SCSI Response is mapped as FCP_RSP; and
  FCP_XFER_RDY is used to indicate ready for data transfer.

All FC protocol information units are encapsulated with a Start of frame, an FC header, a CRC, and an End of frame.

FC frames include a header structure having fields including R_CTL, D_ID, S_ID, TYPE, F_CTL, SEQ_ID, DF_CTL, SEQ_CNT, OX_ID, RX_ID, and PARAMS/RLTV_OFF. R_CTL identifies the FC protocol information category. D_ID identifies the FC address of the destination where the frame is destined. S_ID identifies the FC address of the source where the frame originated. TYPE identifies the type of frame encapsulated (e.g. 0x08 for SCSI FC protocol). F_CTL is used for managing beginning and ending of sequences and exchanges. SEQ_ID identifies the sequence between exchange originator and responder. DF_CTL is used to indicate the presence of optional headers. SEQ_CNT field indicates the frame order within the sequence. OX_ID identifies the exchange originator. RX_ID identifies the exchange responder. PARAMS/RLTV_OFF includes either parameters or a relative offset for the data contained in the frame (if needed).

The FCP_CMND payload is used to convey SCSI command information to the target, and has fields including FCP_LUN, FCP_CNTL, FCP_CDB, and FCP_DL. FCP_LUN identifies the target LUN. FCP_LUN along with the D_ID in the FC frame header uniquely identifies the target array along and the LUN. The target-id and LUN-id in (scsi-id, channel-id, target-id, and LUN-id) map to D_ID and FCP_LUN. FCP_CNTL includes several miscellaneous control fields. FCP_CDB includes the SCSI Command Descriptor Block (CDB). FCP_DL includes the number of bytes expected to be transferred to or from the application client buffer as the result of the SCSI command.

The FCP_DATA information unit includes the data transferred with the client. The fields in the FC frame header identify an exchange and a sequence the data transfer is part of.

The FCP_RSP information unit conveys "command response" information from the target to the initiator, and has fields including FCP_STATUS, FCP_RESID, FCP_SNS_LEN, FCP_RSP_LEN, FCP_RSP_INFO, and FCP_SNS_INFO. FCP_STATUS indicates the status of the executed command. FCP_RESID indicates the number of bytes not transferred (either underflow or overflow). FCP_SNS_LEN and FCP_RSP_LEN indicate the length of the SNS and the RSP fields respectively. FCP_RSP_INFO includes information describing protocol failures detected during the execution of the FC protocol I/O operation. FCP_SNS_INFO includes information returned for the SENSE command. It also includes SCSI logical unit error information.

The FCP_XFER_RDY information unit is returned by a target to indicate readiness for data transfer, and has fields including DATA_RO, and BURST_LEN. DATA_RO indicates the offset for the first byte of the next FCP_DATA unit. The offset may be either a continuously increasing offset or an out of order offset. BURST_LEN indicates the amount of FCP_DATA to be transferred from the target to the initiator or the amount of buffer prepared for the next FCP_DATA unit from the initiator to the target.

SCSI Transport HBA Hardware

An ES system SCSI transport embodiment includes a terminus for coupling FC devices, also referred to as a target interface (implemented, for example, in an FCM, such as FCM 120A of FIG. 1B coupled to FC Storage Network 106). In some implementations the target interface includes HBA hardware (such as any of FCPs 423.1-423.4 of FIG. 4D), based, for example, on a Qlogic ISP2322 or ISP2312 (an example of a Fibre Channel Interface Processor or FCIP), providing two FC ports per chip. The FCIP has a PCI-X interface, a flash interface, an embedded RISC core, an integrated serializer/deserializer (SerDes) and a Clock and Data Recovery (CDR) circuit. The HBA hardware operates in conjunction with software including an HBA Host Driver layer.

Figure 9:
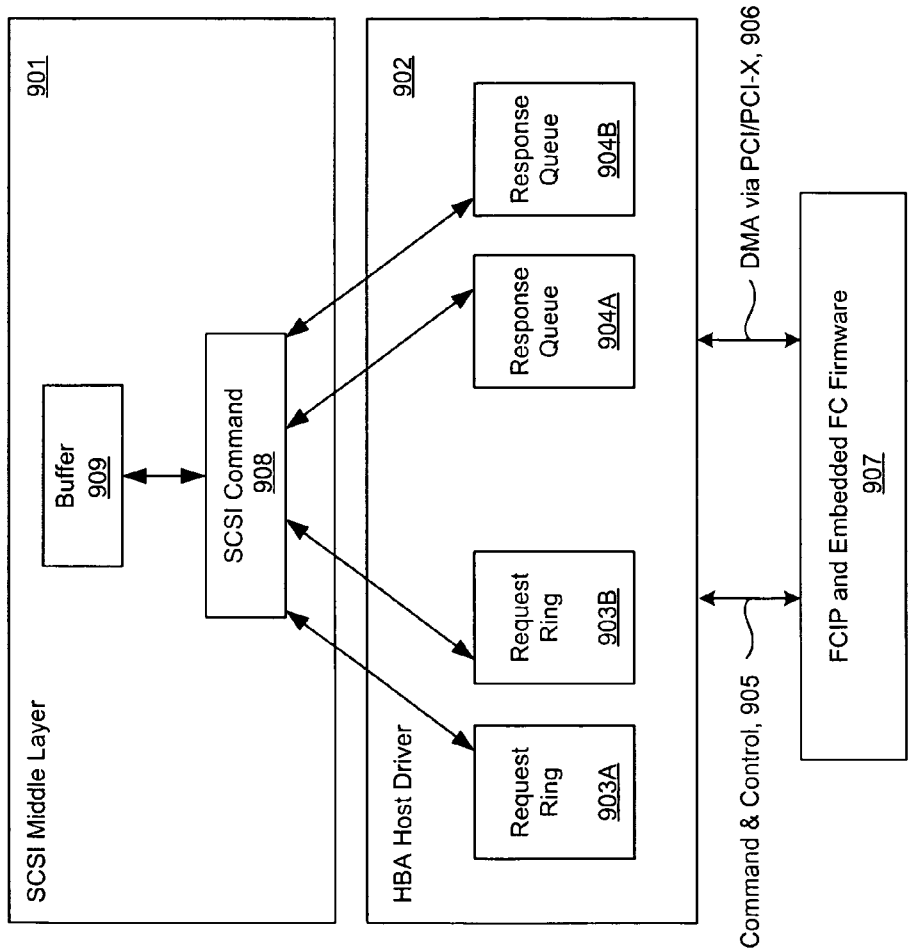
FIG. 9 illustrates several operational concepts of an embodiment of an HBA architecture compatible with ES system SCSI transport.

FIG. 9 illustrates several operational concepts of an embodiment of an HBA architecture compatible with ES system SCSI transport. The illustrated elements are implemented in software and hardware components of an FCM. SW layer (target) SCSI Middle Layer 901 is a software element (of an OS such as Linux) that operates as a counterpart to (initiator) SCSI Middle Layer 706 of FIG. 7. The SCSI middle layer is in communication with SW layer HBA Host Driver 902. The HBA driver is in turn in communication with HW element FCIP and Embedded FC Firmware 907 conceptually via Command & Control communication 905 and DMAI via PCI/PCI-X 906. The illustrated command and control communication is representative of information communicated between the HBA host driver and a target FC device to direct the FC device to read and write data via FC ports provided by the FCIP HW. The illustrated DMA via PCI/PCI-X is representative of the read and write data communicated between memory accessible to processing elements of an FCM (such as RAM 422 reachable by IOP 421 of FIG. 4D) or an FCM/OLM (such as RAMs 411.7L-R reachable by CPUs 410.7L-R of FIG. 4F) and data to or from the target FC device.

The HBA host driver initiates FC commands and controls the FCIP. The host driver also presents itself as a low level SCSI (transport) layer to the SCSI middle layer. The embedded firmware includes code to implement FC protocol operations such as Fabric logic and Device Discovery, among others. The FCIP hardware offloads processing involved in reliable transport of storage data. The hardware performs segmentation and reassembly of SCSI data into FC frames and processes various FC events.

The HBA driver implements a plurality of request, data, and status buffers, illustrated conceptually as Request Rings 903A and 903B, along with Response Queues 904A and 904B. The SCSI middle layer implements a temporary storage for commands (and in some embodiments data and status) as illustrated conceptually by Buffer 909. Requests and directives from one or more initiators (such as relating to "Initiator Sends Read Command" 801 and "Initiator Sends Write Command" 804 of FIG. 8) are represented conceptually as SCSI Command 908. Thus initiator commands (and data) are buffered and processed by the SCSI middle layer, handed off to the HBA driver, queued as necessary, and then forwarded to the FC interface HW for delivery and processing by an FC target. Return status and data follows a similar path in reverse.

When the HBA Host Driver module is loaded in the kernel, it registers itself with the SCSI middle layer in the kernel and the middle layer calls the detect routine of the HBA Host Driver. The detect routine detects all HBAs in the system and for each detected HBA, sets up a respective memory map, respective request-response rings, and then starts the FC ports on the respective HBA.

The FCIP firmware implements FC fabric logic and returns discovered devices to the HBA Host Driver. The SCSI middle layer, after a successful detection, probes for targets and LUNs coupled to HBA. For each probed SCSI device, the SCSI middle layer instantiates an appropriate top level driver (corresponding to a disk, a tape, or a scanner, for example) based on the type of the device. The SCSI top level driver registers the device with the kernel as a block device.

Read and Write requests for a block on a SCSI device eventually reach the SCSI middle layer via a buffer (to read data from or write data to). The middle layer forms a SCSI command request (read/write) with a block address, a SCSI address (Bus, Channel, Target, and LUN), and a buffer pointer. The middle layer then queues the request in an HBA Host Driver request ring corresponding to an adapter coupled to the SCSI device. The HBA Host Driver processes the request for execution by the FCIP. The Target and LUN are mapped respectively to an appropriate FC WWW port name (and eventually a corresponding FC destination address) and an appropriate LUN-id by the driver. The FCIP executes the request, fetching data from the target and transferring it to the host buffer (read operation) or fetching data from the host buffer and transferring the data to the target (write operation). A resultant SCSI response is queued in a response queue (or ring) by the FCIP and sent. The HBA Host Driver processes the response and executes a corresponding callback function (in the middle layer) with a return code included in the response. If the return code indicates success, then the middle layer wakes up a waiting process. If the return code indicates no success, then the middle layer retries the SCSI command. In some embodiments the HBA Host Driver uses a mailbox-like interface for controlling the FCIP. In some embodiments the FCIP uses interrupts to convey changes to the response queue, completion of mailbox commands, various error conditions (in the FCIP), and events in the FC fabric.

Timeouts may arise due to several situations. An FCIP FC firmware command may timeout and retry some requests at the FC level. The HBA Host Driver may timeout and in selected circumstances may pass an error status (with a retry option set) to the SCSI middle level. Independently, the SCSI middle layer may timeout by itself. The SCSI middle layer retries a timed out request for a number of times, and if there is no success, the middle layer returns an error status to the upper layer. According to various usage scenarios and embodiments any combination of the middle and upper layers may then perform a corrective action (such as resetting an adapter, a bus, or both). Adapter and bus resets are requested through Application Programming Interface (API) calls implemented by the HBA Host Driver.

In some embodiments, the FCIP and HBA Host Driver implement failover across ports of an FCIP or failover across HBAs. HBA Host Drivers are implemented with a failover option to support failover. In a failover enabled mode, if more than one port of an FCIP or multiple HBAs discover the same target, then only one of the ports is used as a default port for the target, while the other ports are used as alternate (failover spare) ports. All normal activity for discovered targets passes via the default port. If the default port fails (such as due to a link down condition or other similar situation preventing normal operation), the HBA Host Driver selects one of the alternate ports and switches over traffic to the selected port. The switch over is completely under control of the FCIP.

Complete SAN high availability is provided in part by the FCIP and HBA Host Driver failover described above, along with a complete multi-path solution from the FC ports to coupled FC devices. Different ports of various HBAs are coupled to different SAN switches. The SAN switches in turn are coupled to different controllers coupled to a single FC device (such as a storage array). The multi-path couplings protect against single points of failure that may occur at an HBA port, card, or chip level, as well as SAN switch and array controller levels.

In addition to failover, load balancing is implemented across multiple FCIP ports. In some embodiments the load balancing makes use of load balancing software to set static mappings between target-LUN(s) and FC ports.

Enterprise Fabric Message Protocol (EFMP) in Fabric-Backplane ES

A reliable message protocol, EFMP, is implemented between pluggable modules coupled by a switch fabric in an ES system. EFMP provides reliable, flow-controlled connection-oriented message delivery between pairs of end-points, such as a PMM operated as a SCSI initiator and an FCM operated to interface as a SCSI target coupled to FC devices. Further details regarding EFMP may be found in the section "Enterprise Fabric Message Protocol (EFMP) Selected Details" located elsewhere herein.

SCSI Transport in Fabric-Backplane ES

In some embodiments a SCSI transport implementation provides an interface between FC SAN elements (such as FC networks having disks and tapes) operating as SCSI targets and a single or multi-chassis ES system having elements operating as SCSI initiators. The transport implementation serves to multiplex storage transactions (requests/commands and responses) from several applications (user and system) executing on various PMMs, SCMs, and OLBs with one or more shared FCMs. In some embodiments the storage transactions are essentially SCSI commands and data blocks.

In some ES embodiments, SCSI commands and data blocks are transported over a protocol stack (see FIG. 11 for an example) that may be characterized as 'RDMA(DDP)/ EFMP/Ethernet', implementing RDMA (or DDP) via EFMP over an Ethernet-like protocol. The 'Ethernet' characterization is in reference to Ethernet-like transport protocol (1 Gb or 10 Gb protocols, for example) as a basic transport protocol in an ES system. The 'EFMP' characterization is with respect to using EFMP (described in more detail elsewhere herein) to provide a reliable transport of data via the (best effort) Ethernet transport. The 'RDMA(DDP)' characterization describes usage of RDMA (or DDP) to enable efficient transfer of data between two (frequently software) entities over a network while avoiding copying overheads, being well suited for transferring data to or from main memory of a remote system without directly involving software executing on the remote system with transfer details.

In some ES system embodiments SCSI acts as an Upper Layer Protocol (ULP) for a remote data protocol layer such as RDMA (or DDP), while a reliable connection protocol layer such as EFMP acts as a reliable Lower Layer Protocol (LLP) for RDMA (or DDP). In turn a transmission protocol layer such as an Ethernet protocol-like transport using VIOC functions carries the EFMP traffic. An initiating application formats SCSI data blocks in memory accessible to the application, and hardware (such as a VIOC of a PMM) encapsulates and transfers the data blocks from the memory to a switch fabric of the ES system. The switch fabric transfers the data blocks to a destination having accessibility to a SCSI target (such as a VIOC of an FCM). The destination de-encapsulates the data blocks (by removing headers, for example) when received and then segments and (re)encapsulates the data as FC frames for transport to coupled FC devices or SAN networks coupled to FC devices. In reverse operation, SCSI blocks are (re)assembled from FC frames and encapsulated as RDMA(DDP)/EFMP/Ethernet frames, transported via the destination, now operating as a source, (such as the VIOC of the FCM) and the ES switch fabric, and received directly into memory accessible by the application (such as via DMA implemented by the VIOC of the PMM).

The VIOCs implement EFMP for transparent reliable transport of data between the initiating application and the destination/source. In some embodiments EFMP flow control enables reduced data loss by preventing overwhelming SCSI transport destinations/sources and consequent data loss. In some embodiments EFMP transport for RDMA (or DDP) enables efficient storage data transfer by reducing (or eliminating) intermediate data copying, as data is read(written) directly from(to) application accessible memory buffers via DMA coupled to EFMP transport mechanisms. In some embodiments EFMP provides in-order data transfer for efficient data sending and receiving.

Figure 10:
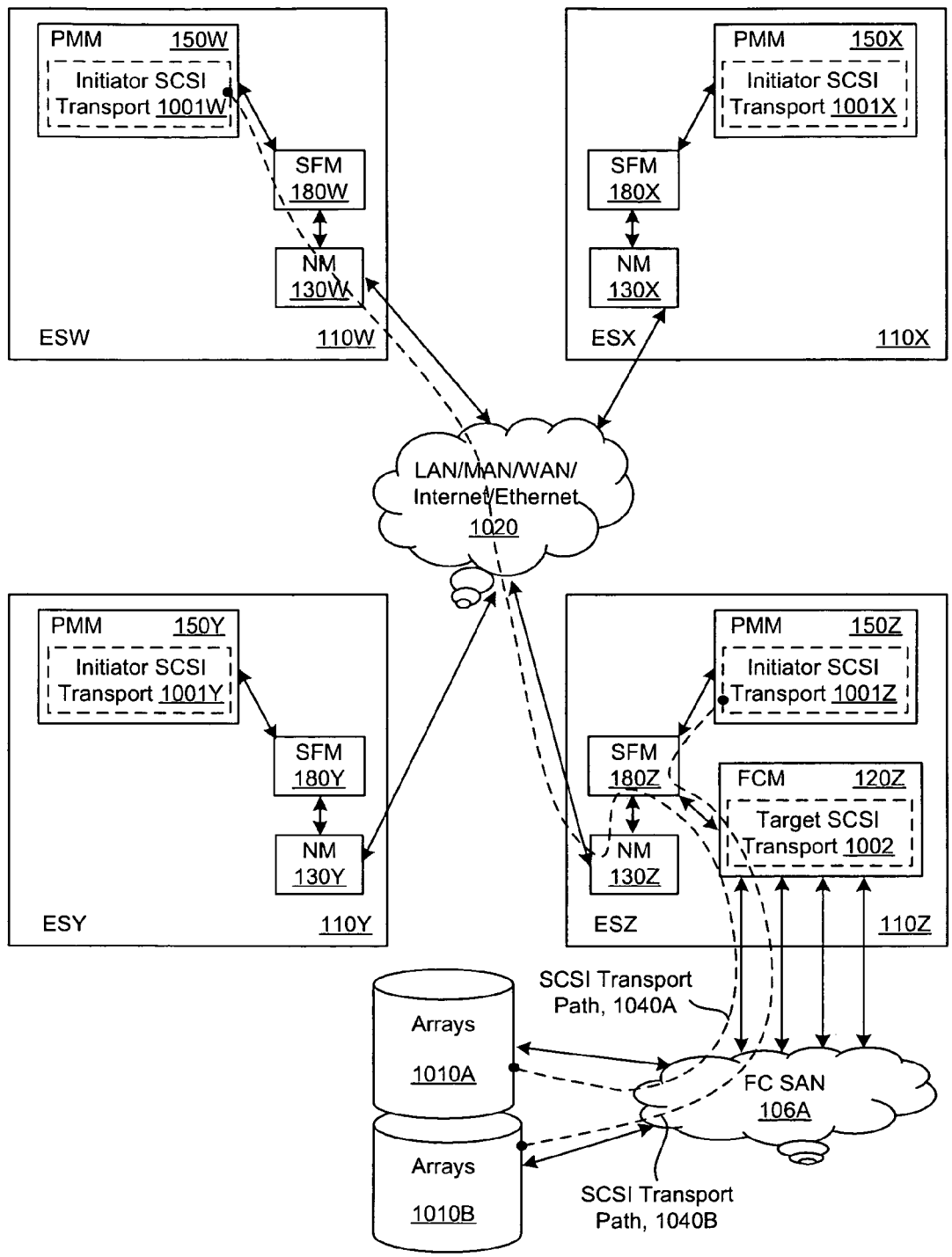
FIG. 10 illustrates an embodiment of an ES fabric-backplane SCSI transport architecture.

FIG. 10 illustrates an embodiment of an ES fabric-backplane SCSI transport architecture. The figure illustrates selected building blocks used for SCSI transport in a multichassis ES system. Four chassis are illustrated as ESW 110W, ESX 110X, ESY 110Y, and ESZ 110Z, each conceptually similar to ES1 110A of FIG. 1A, for example. Each of the chassis includes a PMM, an SFM, and an NM (PMMs 150W-Z, SFMs 180W-Z, and NMs 130W-Z, respectively). ESZ 110Z further includes FCM 120Z for communication with FC SAN 106A (an instance, for example of Storage Network 106 of FIG. 1A). The FC SAN is coupled to FC Storage Arrays 1010A and 1010B to provide access to FC targets implemented in the storage arrays. The chassis are coupled for communication with each other via LAN/MAN/WAN/Internet/Ethernet 1020.

Two types of SCSI transport elements are illustrated. A first type is implemented in a PMM, operating as an initiator (such as any of Initiator SCSI Transports 1001W-Z). The initiator SCSI transports are representative of executing threads of instances of Initiator SCSI Transport Layer 707 of FIG. 7. A second type is implemented in an FCM, operating as a target interface (such as Target SCSI Transport 1002). The target SCSI transport is representative of threads executing various functions illustrated in FIG. 9, such as implementing operations relating to Buffer 909, Request Rings 903A-B, and Response Queues 904A-B.

The illustrated initiator SCSI transports may be conceptualized as implementing respective endpoints of SCSI transport paths for communication of SCSI read and write information (including requests, data, and status traversed by SCSI Transport 830 of FIG. 8). The illustrated target SCSI transport may be conceptualized as a group of intermediate points or "internal endpoints" for each of the SCSI transport paths. More specifically, the target SCSI transport is an endpoint for a reliable communication channel established and operated with respect to the respective initiator SCSI transport. The target SCSI transport is also an endpoint for an FC-compatible communication between the FCM-based target and a target FC device. The FC device is the other endpoint of the FC-compatible communication.

An initiator to target SCSI transport path (such as between a PMM and an FC device) may be a local SCSI transport destination/source (for example an FC device coupled to an FCM in the same local chassis as the PMM) or may be a remote SCSI transport destination/source (for example an FC device coupled to an FCM in another chassis). Local FCM communication is via a local switch fabric implemented in the local chassis, in some embodiments. Remote FCM communication is via any combination of the local switch fabric of the local chassis, a remote switch fabric of a remote chassis, and an external switch fabric, LAN, MAN, WAN, Ethernet, and Internet, according to various embodiments.

An example of local SCSI transport is between PMM 150Z and FC Arrays 1010B via SFM 180Z, FCM 120Z, and FC SAN 106A (as shown by SCSI Transport Path 1040B). The local transport implements a reliable communication channel between PMM 150Z and FCM 120Z, and an FC-compatible communication between FCM 120Z and FC Arrays 1010B. An example of remote SCSI transport is between PMM 150W and FC Arrays 1010A via SFM 180W, NM 130W, LAN/ MAN/WAN/Internet/Ethernet 1020, NM 130Z, SFM 180Z, FCM 120Z, and FC SAN 106A (as shown by SCSI Transport Path 1040A). The remote transport implements a reliable communication channel between PM 150W and FCM 120Z (via SFM 180W, NM 130W, LAN/MAN/WAN/Internet/Ethernet 1020, NM 130Z, and SFM 180Z). The remote transport further implements an FC-compatible communication between FCM 120Z and FC Arrays 1010A.

Figure 11:
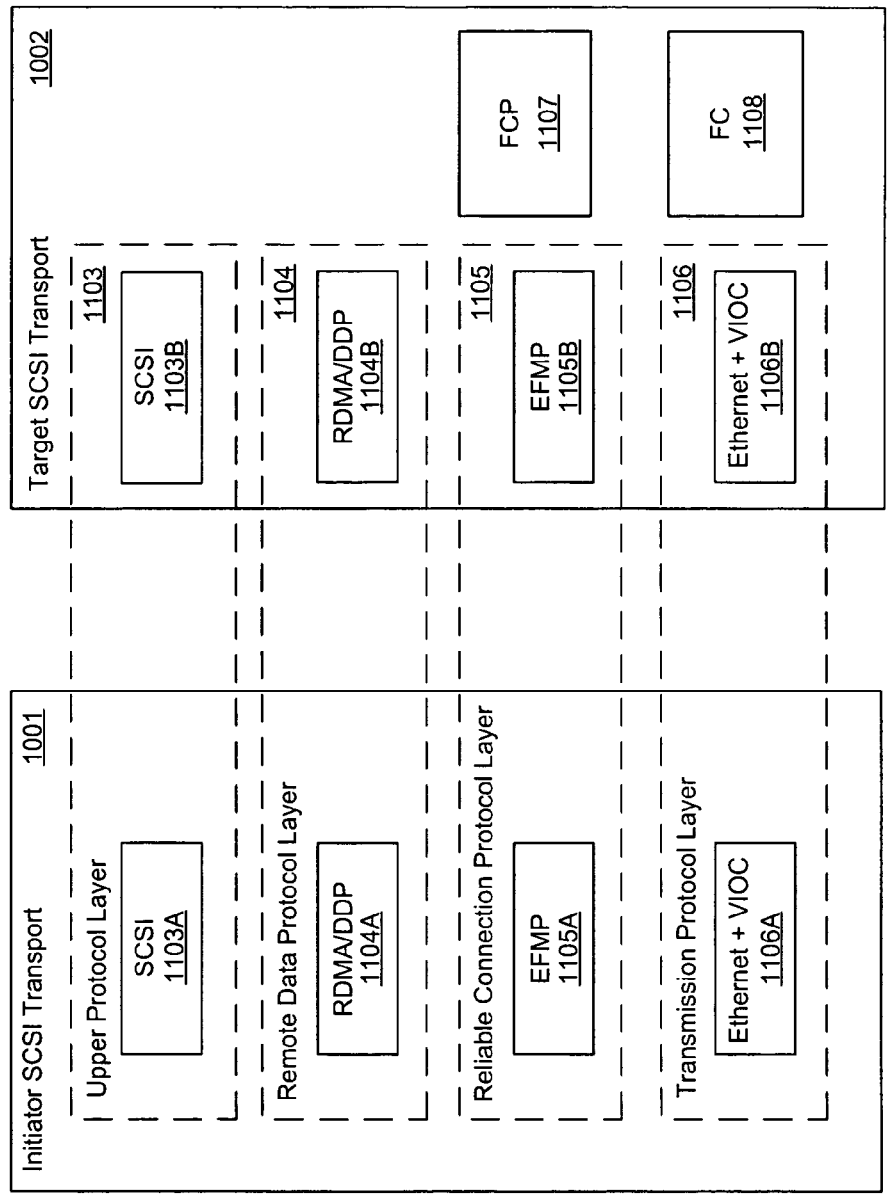
FIG. 11 illustrates protocol stack views of embodiments of SCSI transports in an initiator and a target implementing SCSI transport for an ES system.

SCSI transport providing communication of SCSI requests, data, and status may be implemented in SW via corresponding protocol stacks in initiators and targets, as illustrated, for example, in FIG. 11. The protocol stacks include various layers providing a hierarchy of abstractions to implement the transport. The layers in an initiator are compatible with corresponding layers in a target.

FIG. 11 illustrates protocol stack views of embodiments of SCSI transports in an initiator and a target implementing SCSI transport for an ES system. The protocol stacks may be viewed in a context of "vertical" layers within an initiator or a target, and may also be viewed in a context of "horizontal" communication between peer layers of the respective stacks.

With respect to a "vertical" protocol stack view of Initiator SCSI Transport 1001, the transport includes SCSI layer 1103A communicating with RDMA/DDP layer 1104A in turn communicating with EFMP layer 1105A. Further included is Ethernet-like VIOC protocol layer 1106A in communication with the EFMP layer. The Ethernet-like VIOC protocol layer includes low-level drivers for interfacing to a switch fabric communication device (such as a VIOC). In some embodiments Initiator SCSI Transport 1001 is an instance of any of SCSI Transports 1001W-Z of FIG. 10.

With respect to a "vertical" protocol stack view of Target SCSI Transport 1002 (of FIG. 10), the transport includes layers similar to those of the initiator transport and operating symmetrically: SCSI 1103B, RDMA/DDP 1104B, EFMP 1105B, and Ethernet-like VIOC protocol layer 1106B. The target SCSI transport protocol view further illustrates FC protocol and HW interface elements (FCP 1107 and FC 1108, respectively) for interfacing to FC devices. The destination/source Ethernet-like VIOC protocol layer communicates with the initiator Ethernet-like VIOC protocol layer via any combination of one or more VIOCs, a switch fabric, a LAN, a MAN, a WAN, Ethernet, and the Internet, according to various usage scenarios and embodiments.

The initiator and target protocol stack layers are compatible with each other to enable "horizontal" peer communication. More specifically, Upper Protocol Layer 1103 includes SCSI layer 1103A enabled for peer communication with SCSI layer 1103B. Remote Data Protocol Layer 1104 includes RDMA/DDP layer 1104A peered with RDMA/DDP layer 1104B. Reliable Connection Protocol Layer 1105 includes EFMP layer 1105A for operation with EFMP layer 1105AB. Transmission Protocol Layer 1106 includes Ethernet-like VIOC protocol layer 1106A compatible with Ethernet-like VIOC protocol layer 1106B.

In some SCSI transport embodiments one or more FCMs each operate to provide respective interfaces between ES systems and SAN(FC)-based systems, akin to a pseudo storage switch. Each FCM represents an access point for discovering and accessing storage targets via the EFs of the ES systems. Targets discovered via the SAN systems (and associated HBAs implemented in FCMs) are presented by each FCM as a list of logical targets, hiding FC transport details. A PMM (operating in part as a SCSI transport initiator) discovers and logs into the FCM. The targets found in the FCM are obtained via the SCSI transport (as implemented partially via VIOCs of the PMM and the FCM, in addition to a coupling switch fabric) and presented to storage stack software (such as application and OS software executing on PMMs). A PMM may simultaneously operate as a plurality of SCSI transport initiators, and an FCM may simultaneously provide a plurality of interfaces to SAN systems.

A PMM-based initiator may issue one or more SCSI commands destined for the logical targets obtained from FCM-based interfaces. Each command is transported to the FCM by the RDMA/EFMP/Ethernet transport (via VIOC and switch fabric hardware, for example). The FCM then maps the logical target to a physical SAN target and forwards the command to the physical SAN target. Command execution results, command response, and data blocks obtained from the SAN target are forwarded by the FCM to the PMM that initiated the command. The FCM maintains command entities to aid in command dispatch processing. For every command received from the PMM a respective command entity is created in main memory of the FCM. Each command entity includes a reference to a respective received command (a SCSI request), buffers for storing and forwarding data blocks, and source and target coordinates associated with the command (such as a PMM/initiator address and a target identifier).

A PMM-based initiator may discover and use an FCM-based interface by a variety of techniques, including a static configuration technique and a dynamic discovery technique. The static configuration technique includes the PMM-based initiator having a static address of the FCM-based interface during initialization. The FCM-based interface address includes the Ethernet (or IP) address of the FCM and a port number used by EFMP (i.e. there is no discovery in the static technique). The PMM-based imitator may use the static address information to set up an EFMP connection with the FCM-based interface, and then discover targets exported by the FCM-based interface (subject to access control and zoning rules). In some embodiments the static address is provided by a user or network administrator via Network Management Systems (NMS) tools, and is similar to the "SendTargets" command described by various iSCSI specifications.

The dynamic discovery technique has no provided static address, but instead relies on discovery protocols to determine FCM-based initiators accessible to a PMM-based initiator. The discovery protocols include Service Location Protocol (SLP), internal Storage Name Service (iSNS), SLP operated with iSNS, and other related and similar compatible protocols. The discovery protocols, in some embodiments, may also provide access management and notification.

As an example involving SLP, the PMM-based initiator acts as a User Agent, sending out multicast requests/queries to a management service. The FCM-based interface also acts as a User Agent, registering targets with the management service. The management service (or management server) executes on each FCM-based interface and acts as a Service Agent. In some embodiments the management service implements a minimal essential set of iSNS to enable discovery, access management, and notification functions. In some embodiments SLP and iSNS enable interoperation with FCM-based interfaces and iSCSI interfaces.

After an FCM-based interface is discovered, the discovering PMM-based initiator creates an EFMP connection with a corresponding entity on the FCM hosting the interface. The connection is with respect to a selected port of the FCM. All further communication with the FCM-based interface is conducted using the created connection. The PMM-based initiator creates distinct EFMP connections for each FCM-based interface discovered, and a plurality of PMM-based initiators may each create distinct EFMP connections for a plurality of FCM-based interfaces.

RDMA requests and responses are conducted using the EFMP connections established. An API similar to kernel-mode Direct Access Protocol Library (kDAPL) or a modified version thereof may be used to blend RDMA requests over various EFMP connections, according to various embodiments.

Once a connection has been successfully created between a PMM-based initiator and an FCM-based interface, the PMM-based initiator formally issues a "login" to the FCM-based interface. The login process provides an opportunity for the PMM-based initiator and the FCM-based interface to check and synchronize selected parameters before continuing operations.

After a successful login, the PMM-based initiator discovers targets from the FCM-based interface (if not already provided by a management service such as an iSNS server). Once the targets are presented to the SCSI stack of the PMM-based initiator, application and OS processes executing on the PMM may start using the targets as if the targets were locally attached and dedicated to the PMM. In other words, transparent access to local and remote targets is provided as if the targets were coupled via an HBA dedicated to the processes.

Figure 12:
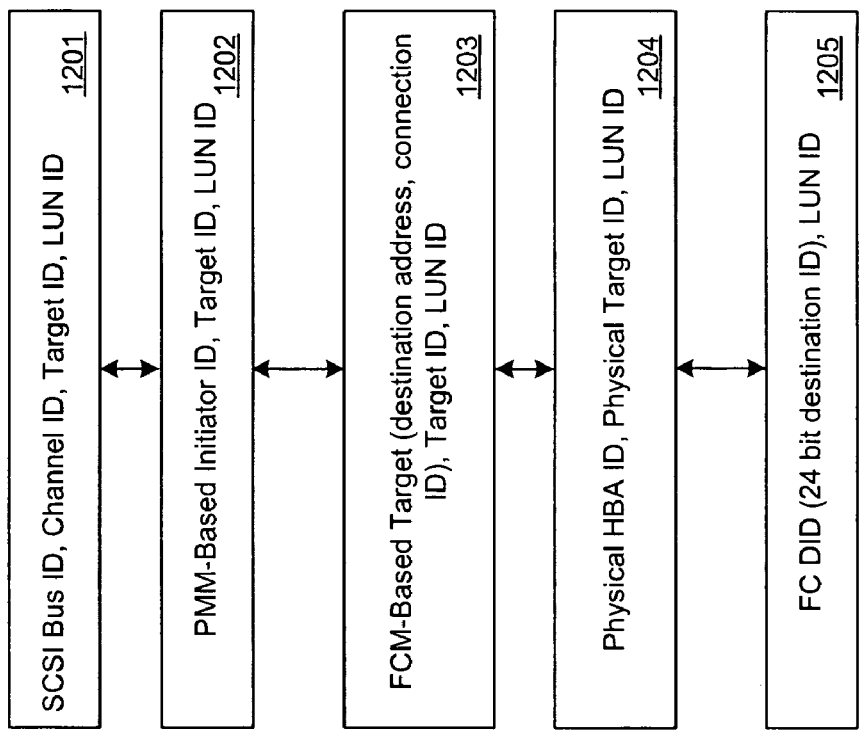
FIG. 12 illustrates an embodiment of target and logical unit identification.

FIG. 12 illustrates an embodiment of target and logical unit identification, including mapping between SCSI four dimensional addresses and FC access addresses. As mentioned elsewhere herein, SCSI uses a four dimensional (scsi-bus-id, channel-id, target-id, and LUN-id) coordinate system to identify a target and an included LUN. In PMM-based initiators, a SCSI device (scsi-bus-id, channel-id, target-id, and LUN-id) is mapped into (PMM-initiator-id, target-id, and LUN-id). The PMM-based initiator then determines the FCM providing interface access to the target and adds a destination address of the FCM along with a connection identifier unique to the (previously established) connection between the PMM-based initiator and the FCM-based interface. The resultant mapping is: FCM address (transport destination address, connection-id), target-id, and LUN-id. In some embodiments the transport destination address is an Ethernet (or IP) address and the connection identifier (id) is an EFMP connection identifier. The destination FCM processes the target-id using target mapping information to determine a physical HBA (or FCIP) and physical target (corresponding to an FC device, for example). The mapping becomes: physical HBA-id, physical target-id, and LUN-id. This is further processed by an HBA Host Driver into an FC access address: FC destination address of the target and LUN-id. The FC access address is used by the physical HBA and any coupled FC switches and other SAN elements to forward command and data information to the addressed target storage array.

More specifically, as illustrated in the figure, "SCSI Bus ID, Channel ID, Target ID, LUN ID" 1201 is mapped by the SCSI middle layer (implemented, for example, in a PMM, such as SCSI Middle Layer 706 of FIG. 7) to "PMM-based Initiator ID, Target ID, LUN ID" 1202. Mapping continues via SCSI transport (implemented, for example, in a PMM, such as Initiator SCSI Transport Layer 707 of FIG. 7) to "FCM-based Target (destination address, connection ID), Target ID, LUN ID)" 1203. Mapping is further provided via a target interface (implemented, for example, in an FCM, such as SW executing on FCM 120Z of FIG. 10) to "Physical HBA ID, Physical Target ID, LUN ID" 1204. Mapping is completed by HBA driver and associated firmware (implemented, for example, in an FCM, such as FCIP and Embedded FC Firmware 907 of FIG. 9) to "FC DID (24 bit destination ID), LUN ID" 1205. As illustrated, any or all of the mappings are bi-directional according to various embodiments.

In a SCSI context, a PMM-based initiator operates as a SCSI initiator, sending SCSI requests to logical targets accessible via an FCM-based interface. The FCM-based interface reroutes the SCSI request to the physical targets of a SAN using an FC-compatible protocol. SCSI transactions are layered on top of RDMA, leveraging RDMA command sets. Examples of SCSI read and write sequences using RDMA operations between a PMM-based initiator and an FC target, via an FCM-based target interface, are illustrated in FIG. 13A and FIG. 13B.

A SCSI command (from a PMM-based initiator) is transported to a destination FCM-based interface via an untagged RDMA send command. In the untagged RDMA send command the PMM-based initiator announces an address of a buffer (STag) referenced by the command. The FCM-based interface allocates a SCSI request structure including information about the command, the source of the command (corresponding to the PMM-based initiator as identified by a PMM-initiator-id), and the target of the command (physical HBA-id, physical target-id and LUN-id). The target information is provided in part by mapping the logical target-id specified by the command. The FCM-based interface also allocates a local buffer to store data associated with the command.

Processing of a SCSI read command by an FCM-based interface includes allocating a local buffer and queuing a read request (specified by the read command) in an HBA Host Driver request queue for execution by an FCIP. When the read command is complete the local buffer contains read command result data and a SCSI response is queued in a response queue. The FCM-based interface performs a tagged RDMA write to a buffer of the PMM-based initiator to transfer the result data and performs an untagged RDMA send to the PMM-based initiator to transfer the SCSI response. The FCM-based interface also invalidates the STag as part of a final send command.

Figure 13A:
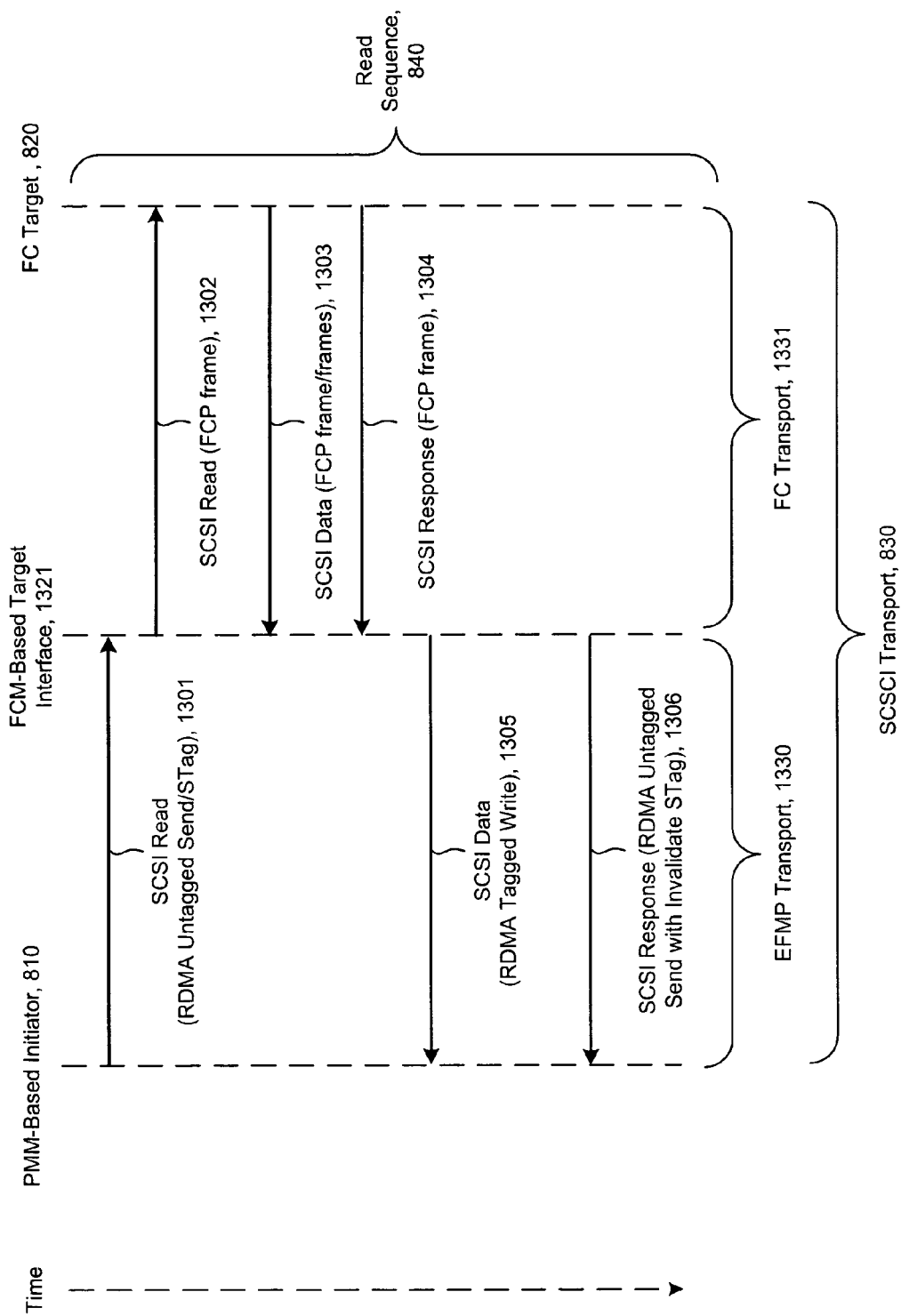
FIG. 13A illustrates an embodiment of SCSI read request and response sequencing in an ES system.
Figure 13B:
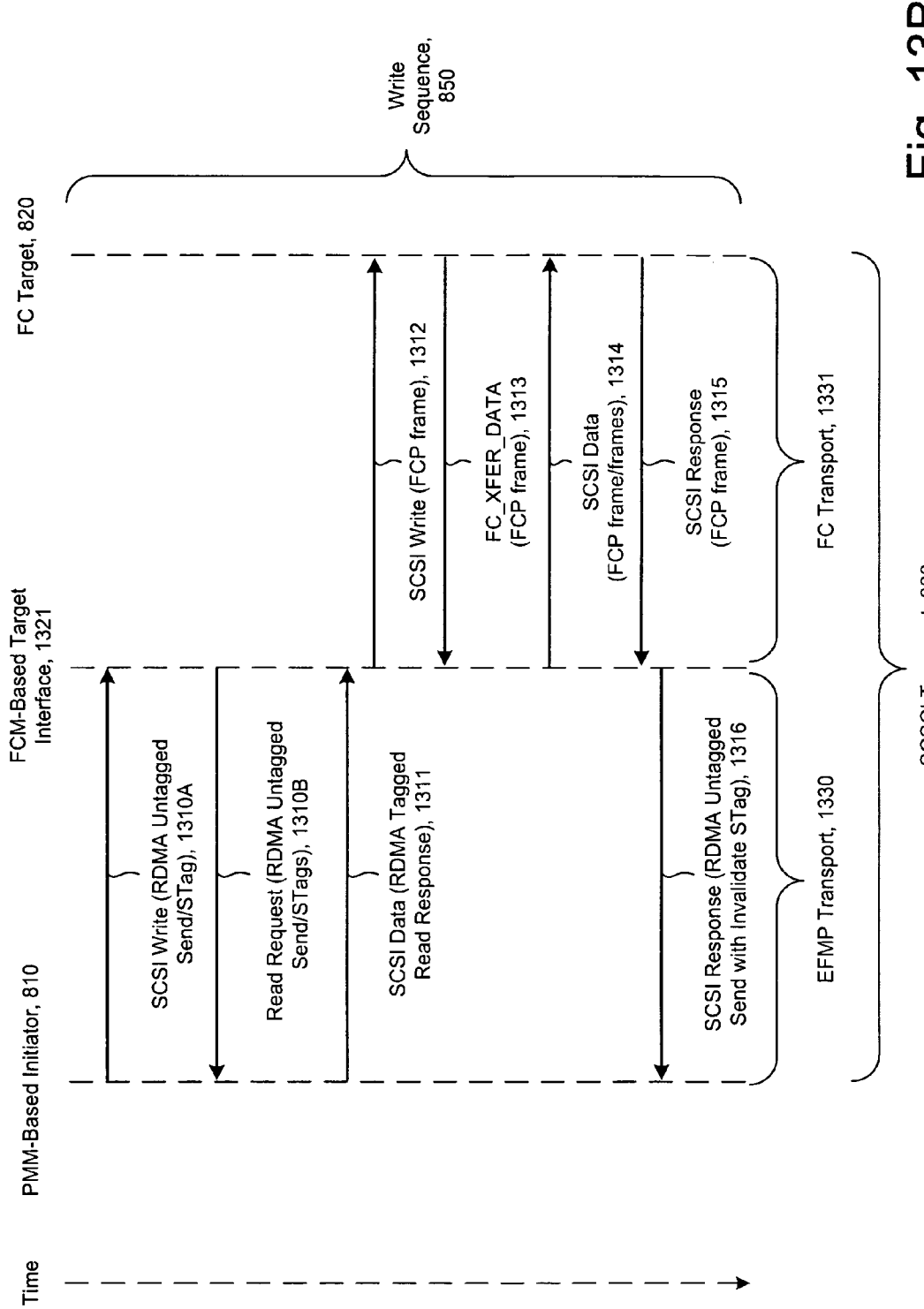
FIG. 13B illustrates an embodiment of SCSI write request and response sequencing in an ES system.

FIG. 13A illustrates an embodiment of SCSI read request and response sequencing according to the aforementioned description. Conceptually FIG. 13A illustrates an implementation, via an FCM-based target interface, of Read Sequence 840 of SCSI Transport 830 as illustrated in FIG. 8. The SCSI transport is implemented in two portions, EFMP Transport 1330 and FC Transport 1331. The EFMP transport is between PMM-based Initiator 810 (an instance of SW executing on a PMM in conjunction with or as a portion of any of Initiator SCSI Transports 1001W-Z of FIG. 10, for example) and FCM-Based Target Interface 1321 (an instance of SW executing on an FCM in conjunction with or as a portion of Target SCSI Transport 1002 of FIG. 10, for example). The FC transport is between the FCM-based target interface and FC Target 820 (an instance of either of FC Storage Arrays 1010A and 1010B of FIG. 10, for example).

More specifically, PMM-Based Initiator 810 provides "SCSI Read (RDMA Untagged Send/STag)" 1301 to FCM-Based Target Interface 1321. The SCSI read may be local (i.e. originating from PMM 150Z of FIG. 10) or remote (i.e. originating from any of PMMs 150W-Y of FIG. 10). If local, then the SCSI read traverses an SFM (such as SFM 180Z) to reach an FCM-based target interface (such as FCM 120Z). If remote, then the SCSI read traverses an SFM, an NM, a network, another NM, and another SFM to reach an FCM-based target interface (such as SFM 180W, NM 130W, LAN/MAN/WAN/Internet/Ethernet 1020, SFM 180Z, and FCM 120Z, respectively).

In response, the FCM-based target interface provides "SCSI Read (FCP frame)" 1302 to FC Target 820. The FC target in response returns "SCSI Data (FCP frame/frames)" 1303 and afterward further returns "SCSI Response (FCP frame)" 1304. The FCM-based target interface forwards the SCSI data frame (or frames) as "SCSI Data (RDMA Tagged Write)" 1305 to the PMM-based initiator. The FCM-based target interface also forwards the SCSI response as "SCSI Response (RDMA Untagged Send with Invalidate STag)" 1306 to the PMM-based initiator and processing of the SCSI read is complete. In some situations, the data and the response travel a return path that is the reverse of the path traveled by the SCSI read. In some situations, such as a change in connectivity between the PMM-based initiator and the FCM-based target interface, the return path may be a modification of the reverse path, such as transport via an alternate NM in the chassis including the FCM. The modification may be activated when the original NM (or a network coupling associated thereto) in the path traveled by the SCSI read has failed.

Conceptually elements of FIG. 13A are related to elements of the upper portion of FIG. 8, as read-related communications pass between the PMM-based initiator and the FC target via the FCM-based target interface. More specifically, "Initiator Sends Read Command" 801 (of FIG. 8) corresponds to "SCSI Read (RDMA Untagged Send/STag)" 1301 and "SCSI Read (FCP frame)" 1302 in combination. Similarly, "Target Sends Data" 802 corresponds to "SCSI Data (FCP frame/frames)" 1303 and "SCSI Data (RDMA Tagged Write)" 1305. Likewise "Target Sends Command Complete" 803 corresponds to "SCSI Response (FCP frame)" 1304 and "SCSI Response (RDMA Untagged Send with Invalidate STag)" 1306.

Processing of a SCSI write command by an FCM-based interface includes using a tagged RDMA buffer read and transferring data from a PMM-based initiator buffer into a local buffer of the interface. In some embodiments an untagged RDMA read request from the FCM-based interface to the PMM-based initiator is followed by a tagged RDMA read response from the PMM-based initiator to the FCM-based interface. The SCSI request is queued by the HBA Host Driver for execution by an FCIP. When the write command is complete the FCM-based interface transfers resultant SCSI status from an HBA Host Driver response queue to the PMM-based initiator via an untagged RDMA send command. The FCM-based interface also invalidates an original STag as part of a final send command. The PMM-based initiator processes the SCSI response and passes any included or derived status to a SCSI middle layer.

FIG. 13B illustrates an embodiment of SCSI write request and response sequencing according to the aforementioned description. Conceptually FIG. 13B illustrates an implementation, via an FCM-based target interface, of Read Sequence 840 of SCSI Transport 830 as illustrated in FIG. 8. The SCSI transport is implemented in the same two portions as FIG. 13A (EFMP and FC transports).

More specifically, PMM-Based Initiator 810 provides "SCSI Write (RDMA Untagged Send/STag)" 1310A to FCM-Based Target Interface 1321. The FCM-based target interface in turn provides "Read Request (RDMA Untagged Send/STags)" 1310B back to the PMM-based initiator to obtain write data. The PMM-based initiator then provides "SCSI Data (RDMA Tagged Read Response)" 1311 to the FCM-based target interface. The FCM-based target interface then provides a write request to FC Target 820 as "SCSI Write (FCP frame)" 1312. In response the FC target returns "FC_XFER_DATA (FCP frame)" 1313, and then the FCM-based target interface forwards the write data as "SCSI Data (FCP frame/frames)" 1314. In turn the FC target returns "SCSI Response (FCP frame)" 1315. The FCM-based target interface then returns the response to the PMM-based initiator as "SCSI Response (RDMA Untagged Send with Invalidate STag)" 1316. The requests and responses follow communication paths identical to those described with respect to FIG. 13A, and may similarly be processed remotely or locally with respect to initiator and target chassis locations.

Conceptually elements of FIG. 13B are related to elements of the lower portion of FIG. 8, as write-related communications pass between the PMM-based initiator and the FC target via the FCM-based target interface, similar to read-related communications. More specifically, "Initiator Sends Write Command" 804 (of FIG. 8) corresponds to "SCSI Write (RDMA Untagged Send/STag)" 1310A and "SCSI Write (FCP frame)" 1312 in combination. "Target Sends Ready for Transfer" 805 corresponds to "Read Request (RDMA Untagged Send/STags)" 1310B and "FC_XFER_DATA (FCP frame)" 1313. "Initiator Sends Data" 806 corresponds to "SCSI Data (RDMA Tagged Read Response)" 1311 and "SCSI Data (FCP frame/frames)" 1314. "Target Sends Command Complete" 807 corresponds to "SCSI Response (FCP frame)" 1315 and "SCSI Response (RDMA Untagged Send with Invalidate STag)" 1316.

SCSI commands not involving data movement to or from a PMM-based initiator are processed in an FCM-based interface using implementation and embodiment-dependent techniques.

In some embodiments tagged RDMA read and write functions operate with respect to a target buffer identified by an RDMA STag. An STag advertised by a remote entity remains valid until either the advertised STag is explicitly invalidated (as by the aforementioned final send commands) or a new STag is issued.

In some embodiments untagged RDMA send and receive functions operate without identifying remote buffers, but each untagged command is associated with a respective remote Queue. Associating a command with a remote Queue enables efficient untagged message queue insertion by a remote entity. The aforementioned SCSI command queue in an FCM-based interface and the aforementioned SCSI response queue in a PMM-based initiator are examples of remote Queues.

In some usage scenarios a SCSI middle layer (such as in a host OS executing on a PMM) may issue read and write requests with a buffer space spread across multiple physical memory locations, instead of a single contiguous space. In some embodiments a PMM-based initiator receiving a non-contiguous request responds to the non-contiguous request transparently with respect to a contiguous request. RDMA requests used by the PMM-based initiator to transfer non-contiguous data are adapted to specify a scatter/gather list. For example, the PMM-based initiator may submit a list of STags for use by a non-contiguous transfer. RDMA commands (such as send, read request, and so forth) are augmented with a scatter/gather list having a list of STags.

More information about tagged and untagged RDMA send commands may be found in various RDMA/DDP specifications.

Encapsulation of SCSI information for transport via RDAM/EFMP/Ethernet protocols is according to various frame structures and field mappings (such as target-id and LUN-id). A SCSI command ready for transport from a PMM-based initiator to an FCM-based interface includes destination coordinates such as: destination FCM address, EFMP connection-id, logical target-id, and LUN-id. In some embodiments the destination FCM address is an Ethernet address of an FCM RDMA Network Interface Controller (RNIC) port implemented by the FCM-based interface, and the EFMP connection-id identifies an EFMP connection established by the PMM-based initiator for communication with the FCM-based interface.

Encapsulation of SCSI CDB and SCSI data information into RDMA/EFMP/Ethernet frames is based at least in part on STag information (SCSI read/write buffer), target-id, and LUN-id. STag information is incorporated using iSCSI Extensions for RDMA (iSER)-like headers augmented with fields for target-id and LUN-id. Conceptually an EF storage protocol PDU for RDAM/DDP includes an iSER-like header (12 bytes: read STag of 4 bytes, write STag of 4 bytes, control information of 6 bits, and reserved areas of 26 bits), a target-id (4 bytes), and a LUN-id (8 bytes).

Examples of resultant PDUs for encapsulation of various SCSI commands and responses follow (RDMA send for SCSI Read, RDMA Write for SCSI Read Data, RDMA read request for SCSI Write, RDMA read response for SCSI Write, and RDMA send with Invalidate STag):

An example encapsulation of an RDMA send for a SCSI Read command has several fields, including DDP Control, RDMA Control, (Send) Queue Number, (Send) Message Sequence Number, (Send) Message Offset, Write STag, Read STag, Logical Target ID, and LUN-ID. In some embodiments an iSER header control bit field is included and set to '10' to indicate a SCSI Read command. The Read STag refers to a buffer to store the result of the read command. The Write STag is '0' for a SCSI Read Command. A SCSI Write command is encapsulated similarly, however, the iSER header control field is set to '10' to indicate a SCSI Write command, and the Write STag refers to the buffer to be written. The Read STag is '0' for a SCSI Write Command.

An example encapsulation of an RDMA write for a SCSI Read command has several fields including DDP Control, RDMA Control, Data Sink Tag, Data Sink Tagged Offset, and SCSI Read Data. The Data Sink Tag refers to a buffer in a PMM-based initiator where the FCM-based interface is to transfer the SCSI Read data.

An example encapsulation of an RDMA Read Request for a SCSI Write command has several fields including DDP Control, RDMA Control, (RDMA Read Request) Queue Number, (RDMA Read Request) Message Sequence Number, (RDMA Read Request) Message Offset, Data Sink STag, Data Sink Tagged Offset, RDMA Read Message Size, Data Source Tag, and Data Source Tagged Offset. The FCM-based interface sends an 'RDMA Read Request for a SCSI Write' command (or PDU) to a PMM-based initiator in response to a SCSI Write command from the initiator. The PDU describes to the PMM-based initiator corresponding source and destination buffers to enable the initiator to transfer SCSI data (for writing) directly to the (remote with respect to the initiator) destination buffer via an 'RDMA Read Response for a SCSI Write Command'. The Data Source Tag is the Write STag as previously provided (or 'advertised') by the PMM-based initiator via an 'RDMA Send for a SCSI Write Command'.

An example encapsulation of an RDMA Read Response for a SCSI Write command has several fields including DDP Control, RDMA Control, Data Sink Tag, Data Sink Tagged Offset, and SCSi Write Data. In response to an RDMA read request from an FCM-based interface, a PMM-based initiator transmits an 'RDMA Read Response for a SCSI Write' command (or PDU) that includes SCSI write data as well as the Data Sink Tag. The Data Sink Tag is the Data Sink STag as previously advertised by the FCM-based interface via an 'RDMA Read Request for a SCSI Write Command'.

An example encapsulation of an RDMA Send with Invalidate STag for a SCSI response has several fields including DDP Control, RDMA Control, Invalidate STag, (Send) Queue Number, (Send) Message Sequence Number, (Send) Message Offset, and SCSI Response. The FCM-based interface uses an 'RDMA Send with Invalidate STag' command (or PDU) for sending a SCSI Response to a PMM-based initiator. The PDU specifies the STag to be invalidated by the PMM-based initiator upon reception (the Invalidate STag field). The Invalidate STag is the STag as previously advertised by the PMM-based initiator via 'RDMA Send for SCSI Read/Write' commands. The PDU forces the PMM-based initiator to allocate a new buffer (and corresponding STag) for a subsequent command.

An example encapsulation of RDAM/DDP data within an EFMP-sequenced frame (as EFMP payload data) has several fields including FrameType (FT), PSN, AN, Rwin, and RDMA/DDP Payload.

An example encapsulation of an EFMP frame (packet or message segment) within an Ethernet/Fabric frame (i.e. a frame for transmission on an ES internal switch fabric via VIOCs, for example) has several fields including fabric fields (destination and source addresses to identify fabric ports and/or VNIC of a port), Ethernet fields (type, destination and source addresses, CRC) and optional type specific headers and payload. When an EFMP Ethernet/Fabric frame is transmitted off-chassis (i.e. sent via a port of an NM to a network external to an ES system, for example) the fabric header is stripped off resulting in a conventional Ethernet frame.

In some embodiments EFMP implements messages up to a predetermined maximum message size (such as $2^x-1$ bytes). EFMP fragments messages at the source (or sender) to a predetermined maximum fabric MTU size (such as 9180 bytes). EFMP implements reliable delivery of the message fragments and reassembles them at the destination. EFMP also implements in-order delivery and in-order placement of the fragments.

In some embodiments the predetermined maximum message size is applied to PDUs associated with RDMA/DDP (for example for an 'RDMA Write for a SCSI Read' or an 'RDMA Read Response for a SCSI Write'), i.e. DDP operates conceptually at a datagram layer. In some embodiments RDAM/EFMP/Ethernet transport data spans a plurality of PDUs and is managed by ULP coordination with RDMA/DDP processing.

High Availability

In some embodiments redundancy techniques are used to provide highly available SANs. Redundancy is implemented at various levels. For example, FCMs include multiple FCIPs (each typically at least one individual integrated circuit), and each FCIP implements a plurality of FC ports. ES chassis may include a plurality of FCMs, and a plurality of such chassis may be included in ES systems providing highly available SANs. Each chassis may also optionally include a plurality of NMs to implement high level fabric availability.

Conceptually multi-path I/O in an FC/SAN context includes initiators enabled to communicate via multiple paths to the same target array. Embodiments providing multi-path FC/SAN I/O include targets with redundant controllers and a plurality of physical HBAs on each server chassis. In some embodiments the paths from the server to physical targets are provided through a plurality of different FC switches and FC cabling to provide redundancy and isolation with respect to FC transport.

Multi-path FC/SAN I/O is further extended to ES system embodiments by implementing several techniques, including having a plurality of FCMs in the ES system. In some embodiments all of the FCMs are included in a single chassis, while in other embodiments the FCMs are distributed throughout a plurality of chassis.

PMM-based initiators in the ES system (in one or more chassis, according to various embodiments), discover logical targets from the FCMs (in any combination of local and remote chassis), and also obtain FC attributes associated with the FC targets, such as FC World Wide Port Name (WWPN) and FC World Wide Node Name (WWNN). The PMM-based initiators use the FC attributes to determine if a group of logical targets discovered through more than one FCM-based interface are really representative of a group of paths to a single physical target. If the elements of the group have the same WWNN, then the logical targets all point to the same single physical target. One of the FCM-based interfaces is then assigned as providing a default path to the single physical target, and another of the FCM-based interfaces is assigned as providing a failover path to the single physical target. If there is a failure (of the default), then the PMM-based initiator begins using the failover FCM-based interface for further SCSI commands. In some embodiments there are unique communication paths from the PMM-based initiators to the distinct FCM-interfaces of an ES system, thus assuring failovers may be recovered if either the FCM-based interface or the respective communication path fails. For example, within a single chassis, failure of an FCM or a switch fabric for communicating with the failed FCM may be recovered by failing over to another FCM, a redundant (backup) switch fabric, or both. In other words, failure of either the default FCM or the default communication path to it may be failed over to the failover FCM using the failover communication path. In some embodiments the PMM-based initiator failover processing is performed at least in part by multi-path software executing in a driver module.

In some embodiments multi-path functionality is extended by coupling each FCM (or selected FC ports of various FCMs) to distinct FC switches. The FC switches are further redundantly coupled to distinct controllers in turn also redundantly coupled to the same physical target. Thus full system-wide multi-path I/O is made available to application and OS software executing on processing elements (such as PMMs, SCMs, and OLBs) of ES systems.

In some embodiments or usage scenarios the same physical target may appear, via one or more multipath I/O paths, to have more than one unique WWNN, and a management tool is provided user or administrator input to identify WWNNs corresponding to the same physical target. The PMM-based initiators then use the correspondence information to treat WWNNs resolving to the same physical target as multi-path I/O paths and build associated multi-path information.

In some usage scenarios errors and events may arise in a SAN or in EF interconnectivity that are modeled, in some embodiments, as events made available to PMM-based initiators and FCM-based interfaces. Making the events available enables failure recovery, in at least some circumstances, for any combination of the PMM-based initiators and the FCM-based interfaces.

On the SAN side, physical targets may become unavailable due to some failure in a physical target, intermediate switches, or associated links. A link between a physical HBA (implemented in an FCM) and a SAN element (such as a switch, director, or storage array) may fail. In some embodiments selected (or all) SAN events are modeled as FC Registered State Change Notification (RSCN) events, and failures are communicated from FC switches to physical HBAs as FC RSCN events. In some embodiments the iSNS State Change Notification (SCN) feature is used to notify appropriate PMM-based initiators. In some implementations the SCN is sent by a module implementing iSNS on each FCM-based interface (or alternatively on each FCM). In some implementations lacking iSNS the FCM-based interface directly sends event notifications to registered PMM-based initiators. The PMM-based initiators then provide the event notifications to an associated SCSI middle layer so the middle layer may initiate recovery procedures as needed.

In some usage scenarios there are failures in EF interconnectivity. For example, an EFMP connection may be aborted, an FCM-based interface may ignore a PMM-based initiator request, and other similar failures may occur. In some embodiments the PMM-based initiator is responsible for detecting and recovering from the EF interconnectivity failures.

FC Zoning

FC zoning provides mechanisms to administer selected management and security policies with respect to storage resources. FC zoning may be used to restrict physical targets an HBA may communicate with.

FC zoning may be described as zones being made of zone members. FC zone members may be specified by WWPN, physical FC switch numbers, and other similar schemes. Multiple zones may be grouped together via a Zone Set. Only one Zone Set may be active at a time. In other words, only one Zone Set rule may be enforced at a time. Each FC switch maintains zone information in a corresponding switch zone database. Changes in zone information result in a real-time update across all affected switch zone databases. When two FC switches are coupled for the first time, the coupling is successful only after a successful zone merge. Zones are successfully merged only if the two zone databases (implemented, respectively, by the two switches) are compatible. The zone databases are compatible if there is no conflicting information present in either database.

In some embodiments FC zoning is implemented in part by FCM-based interfaces. Targets made available to PMM-based initiators are dependent upon FC zoning definitions. In other words, only physical targets that are members of the zone(s) or Zone Set(s) accessible via the HBAs implemented by the FCM-based interfaces are made available to the PMM-based initiators when the initiators login to discover targets.

Each PMM-based initiator is assigned a WWPN based at least on part on an Organization Unique Identifier (OUI). Each physical target discovered from a SAN by a FCM-based interface is identified by a WWPN. The PMM-based initiator WWPN and the physical target WWPNs may be used to specify FC zoning information in FCM-based interfaces. In embodiments where the FCM-based interface implements an iSNS server, FC zoning may be implemented as a special case of access control lists and may be implemented as an iSNS feature.

In some embodiments conventional network management tools are adapted to manage FC zoning information on each FCM-based interface. In some embodiments there is no automatic merging of FC zoning information between two (or more) FCM-based interfaces. Instead the adapted network management tools are used to insure that zoning databases are consistent across the FCM-based interfaces.

In some embodiments FC zoning is supplemented with zoning as implemented in SAN elements (such as FC switches and directors). The SAN zoning is with respect to a physical HBA as provided by an FCM (operating in part as a storage interface). The FC zoning is with respect to a combination of a PMM-based initiator and an FCM-based interface.

LUN Masking

LUN masking may be described as providing a mechanism for servers (including ESs) to avoid processing relating to unsupported storage volumes (and associated file systems).

LUN masking may be specified by a mask list made available to an HBA. The HBA consults the mask list to avoid exposing masked LUNs to OS software. LUN masking may be specified in terms of physical target WWPN and LUN number.

In some embodiments LUN masking is implemented by a combination of PMM-based initiator processing and FCM-based interface processing, providing LUN masking capability similar to conventional SAN LUN masking capability. In some embodiments network management tools are adapted to configure a LUN mask list for each PMM-based initiator configured in an ES system. In some embodiments ES system LUN masking is operated in conjunction with conventional SAN LUN masking.

Virtual Storage Networks

In some embodiments ES layer-2 VLAN processing is used to construct virtual storage networks in an ES system. For example, if VLANs are implemented and enabled in the ES system, then a PMM-based initiator may only discover and communicate with FCM-based interfaces that are members of the same VLAN as the initiator. The layer-2 network may be partitioned into a plurality of virtual storage networks using multiple VLANs. Events that may be modeled as multicast messages are limited in scope to a single VLAN. Thus changes and disturbances in a partition (of a VLAN) are limited in scope to the VLAN, leaving partitions of other VLANs unaffected. In some embodiments virtual storage networks are used to scale storage networks. In some embodiments virtual storage networks are used to manage multiple networks.

SCSI Transport FCM Implementation

In some embodiments target-centric (or interface) SCSI transport hardware is implemented in an FCM (as illustrated in FIG. 4D), or an FCM/OLM (as illustrated in FIG. 4F). A bus (such as a PCI-compatible bus) couples a plurality of FCPs or FCIs (that implement respective physical HBAs) to a VIOC and an IOP or a CPU. The IOP (or CPU) is further coupled to a RAM (for example by a host bus). The VIOC provides RNIC functionality (including RDMA/DDP), EFMP capability, and an Ethernet-protocol-like interface for communication over a switch fabric via a switch fabric interface. The switch fabric interface is coupled to a switch fabric for communication with other pluggable modules such as PMMs, SCMs, and OLBs that may be operated as iSCSI transport initiators.

Figure 14:
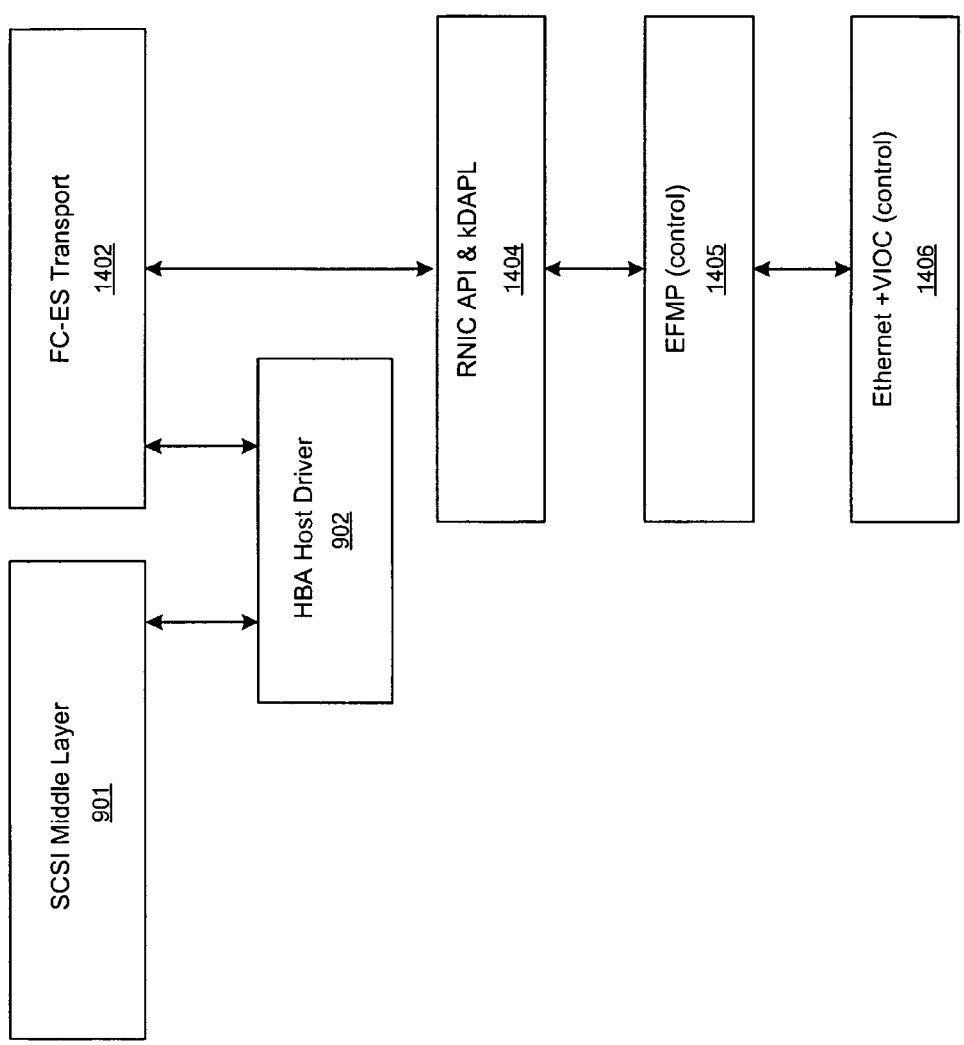
FIG. 14 illustrates an embodiment of target-centric SCSI transport software.

FIG. 14 illustrates an embodiment of target-centric SCSI transport software. SCSI Middle Layer 901 of FIG. 9 communicates with HBA Host Driver layer 902, also of FIG. 9. The HBA host driver layer in turn communicates with FC-ES Transport interface layer 1402 that interfaces with a transport stack. The transport includes, at the highest layer, RNIC API & kDAPL 1404, communicating with EFMP (control) 1405, and at the lowest layer, Ethernet+VIOC (control) 1406.

In some embodiments the illustrated software is executed by various elements of an FCM operating as an FCM-based target interface (such as all or portions of SCSI Transport 1002 executing on FCM 120Z of FIG. 10). In some usage scenarios RNIC API & kDAPL 1404, EFMP (control) 1405, and Ethernet+VIOC (control) 1406 correspond, respectively, to instances of RDMA/DDP 1104B, EFMP 1105B, and Ethernet 1106B of FIG. 11 executing on IOP 421 of FIG. 4D (or on either of CPUs 411.7L-R of FIG. 4F). In some usage scenarios FC-ES Transport interface layer 1402 corresponds to instances of various combinations of all or portions of HW elements FCP 1107 and FC 1108 as provided by any of FCPs 423.1-423.4 of FIG. 4D (or any of FCIs 413.7L-R of FIG. 4F).

The HBA Host driver layer includes an HBA Host Driver, and controls the FCIPs, managing FC connectivity and interacting with upper layer software (such as a SCSI middle layer). The HBA Host Driver registers with the SCSI middle layer during initialization and subsequently the SCSI middle layer is not used for active command, control, or data transfer. The FC-ES transport interface layer acts as a SCSI pass-through module, sending SCSI commands and data to the HBA Host Driver via APIs. The FC-ES interface assists in SCSI command and block data transport between an FC SAN and an EF communication path (such as a switch fabric). The FC-ES interface performs various combinations of functions relating to FCM-based interface capabilities according to various embodiments.

In some embodiments software executing on the FCM sets up command parameters as well as buffers for receiving and transmitting data. The hardware, operating at least partially in response to the software set up information, performs command and data transfer, including various protocol encapsulations (and de-encapsulations). For example, RDMA, EFMP, Ethernet, and FC data and command transfers are performed by the hardware. In some embodiments the software maps selected command parameters (such as target-id, LUN-id, and similar arguments) before issuing a command. When software receives a data block via either FC or RDAM/EFP the data is plain SCSI data, stripped of transport protocol information. Thus many operations associated with reliable data transfer (such as FC and RDMA/EFMP transfers) are performed by hardware.

SCSI Transport PMM Implementation

Figure 15:
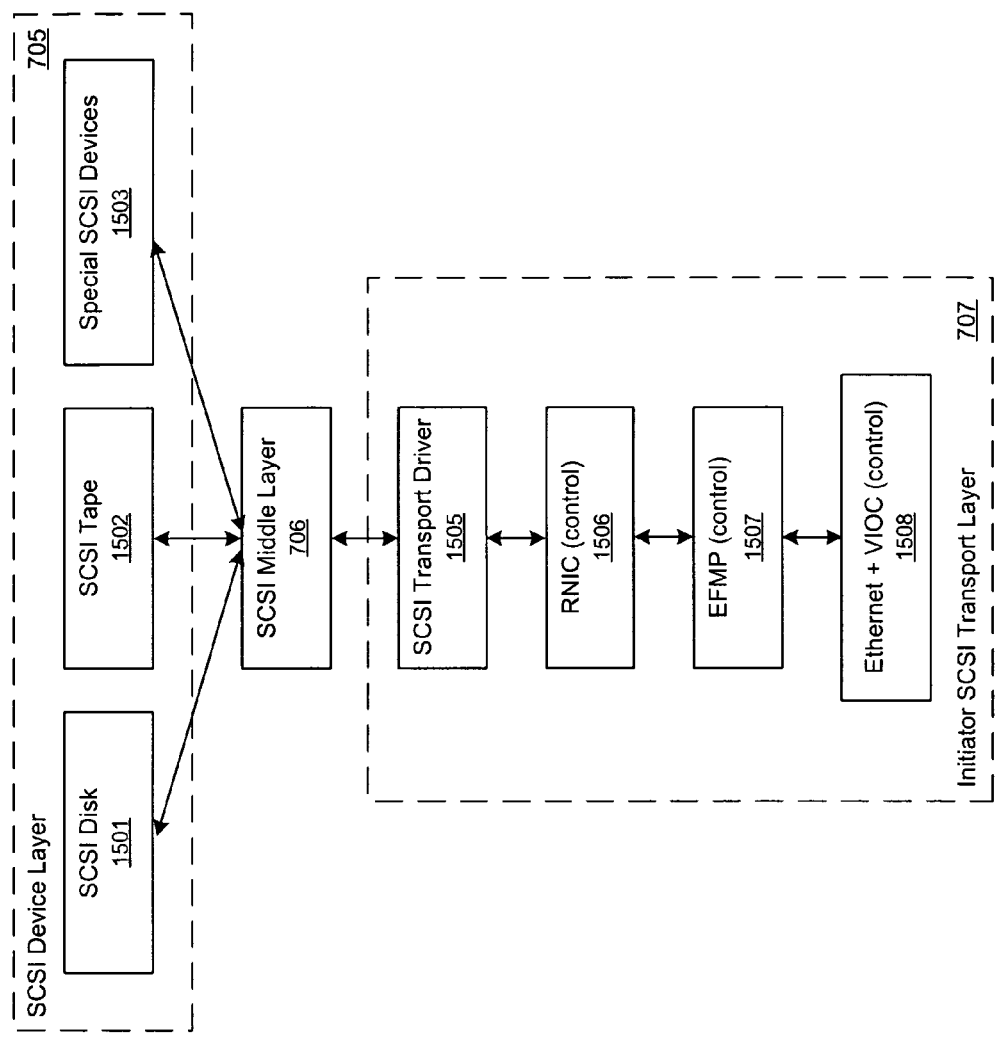
FIG. 15 illustrates selected details an embodiment of initiator-centric SCSI transport software.

FIG. 15 illustrates selected details of an embodiment of initiator-centric SCSI transport software, and conceptually presents details of selected elements of FIG. 7. SCSI Device Layer 705 of FIG. 7 includes high-level device-specific interfaces routines (such as SCSI Disk 1501, SCSI Tape 1502, and Special SCSI Devices 1503) that provide front-end functions for various SCSI devices and are in communication with SCSI Middle layer 706 of FIG. 7. The SCSI middle layer in turn communicates commands, data, and status in a bidirectional manner to SCSI Transport Driver interface layer 1505. The transport driver communicates commands and status (i.e. control information) via RNIC (control) layer 1506. The RNIC (control) layer in turn interfaces with EFMP (control) layer 1507, and the EFMP layer in turn communicates with Ethernet+VIOC (control) layer 1508 to communicate control information between the PMM-based initiator and an FCM-based target interface located on either the local fabric or a remote fabric. SCSI Transport Driver interface layer 1505, RNIC (control) layer 1506, EFMP (control) layer 1507, and Ethernet+VIOC (control) layer 1508 are top-level elements of Initiator SCSI Transport Layer 707 of FIG. 7.

In some embodiments the illustrated software is executed by elements of a PMM operating as a PMM-based initiator (such as all or portions of any of SCSI Transports 1001W-Z executing respectively on PMMs 150W-Z of FIG. 10). In some usage scenarios SCSI Transport Driver interface layer 1505, RNIC (control) layer 1506, EFMP (control) layer 1507, and Ethernet+VIOC (control) layer 1508, correspond, respectively, to SCSI 1103A, RDMA/DDP 1104A, EFMP 1105A, and Ethernet 1106A of FIG. 11.

The SCSI Transport driver appears to higher level layers (such as the SCSI middle layer) as a conventional lower layer SCSI module, supporting expected APIs, callback handlers, and other similar mechanisms and functions. The SCSI Transport driver transports SCSI commands and data via RDMA/EFMP/Ethernet protocols and encapsulations, as shown by the RNIC, EFMP, and Ethernet layers.

Enterprise Fabric Message Protocol (EFMP) Selected Details

EFMP operates natively over the switch fabric in a first mode. In a second mode, Protocol Data Units (PDU)s are encapsulated in Ethernet frames (i.e. MAC encapsulation or optionally with an additional IP encapsulation) for communication between end-systems in different chassis via Ethernet bridging of a plurality of switch fabrics. EFMP serves to efficiently carry RDMA traffic between peers (cluster nodes, SCSI transport endpoints, and offload modules, for example) in an EF complex. In some embodiments EFMP operates in conjunction with a hardware implementation accelerating an ESTABLISHED state to provide wire speed transport of packet streams supporting Remote Direct Memory Access (RDMA) access between peers attached to one or more switch fabrics. The hardware acceleration may be included in VIOCs on PMMs and FCMs, for example. The peers may be processor nodes, storage interfaces, or offload modules. In some embodiments a subset of the IETF RDMAP protocol is mapped onto EFMP.

EFMP is connection-oriented, and an initiation phase creates a connection between a pair of end-points. Thereafter flow-control and sequenced delivery are implemented with respect to the connection. There is a 1:1 mapping from protocol packets to underlying frames. That is, the protocol uses packets that fit within the path MTU between source and destination end-points. Note: the terms packet and frame are used interchangeably in the following discussion. In some embodiments fast connection lookups are implemented in part via client-side context keys.

EFMP reliable delivery is accomplished using Packet Sequence Numbers (PSNs) and an Acknowledge-ReQuest (ARQ) procedure. Positive ACKnowledgements (ACKs) are sent in response to packets received in sequence, while negative acknowledgements (NAKs) are sent to request retransmissions. Retransmissions use go-back-N at the sender and the receiver discards out-of-order frames, and is more efficient when packet loss and reordering are infrequent in the underlying data delivery network. In an alternate embodiment, selective acknowledgements (SACKs) are used to improve communication efficiency for environments where packets are lost or received out-of-order too frequently.

In some embodiments end-to-end flow control is based on 16-bit sliding windows in each direction. The windows are in units of packets (buffers) rather than bytes. In some embodiments end-to-end flow control is based on 32-bit sliding window values, with the sequence numbers in units of blocks. Flow control distinguishes network congestion from receive buffer overruns. In some embodiments buffer overrun recognition is not required for DDP/RDMA transfers into locked-down buffers.

In some embodiments EFMP fast connection lookups are facilitated via context keys. DDP and RDMAP are directly implemented, thus spanning protocol layers. Data, DDP, or RDMA information is encapsulated, in some embodiments, via respective headers identified by a type field in an EFMP header or an EFMP packet. DDP and RDMA packet headers follow a wire format compatible with IETF standards specifications. Thus when IP header encapsulation is enabled packet decoding and forwarding is simplified. In some embodiments various combinations of DDP and RDMA protocols may be implemented over a switch fabric via Ethernet MAC style packet encapsulation or IP header encapsulation.

In operation, EFMP uses a connection between two communicating peers. An initiation phase creates the connection and allocates contexts at each end to hold the collection of information comprising the EFMP state at the end-point for the connection. Connections are full-duplex, in that both peers are enabled to send data to each other once the connection has been established.

Contexts are identified in EFMP using a context key (CK), a 24-bit unsigned integer interpreted based on the end-point that allocates and uses the context, permitting an implementation to distinguish over 16 million simultaneously in use contexts. CKs are opaque and implementation-dependent keys. In some embodiments the remote peer in a connection does not interpret CKs.

Once a connection has been established, the communicating end-points are enabled to send messages to each other. Messages represent byte sequences up to a maximum size of $2^{32}-1$ bytes. EFMP fragments these messages into packets at the source, and guarantees delivery to the destination. This includes reassembling the messages (if fragmented) at the destination before delivery.

In one embodiment EFMP is based on a simple go-back-N ARQ procedure, guaranteeing in-order placement and data delivery during RDMA usage scenarios. See the RDMA and DDP references mentioned elsewhere herein for more information regarding out-of-order placement with in-order delivery.

In some embodiments EFMP connection phases include: initiation, information transfer, termination, and abnormal termination/reset. The protocol recognizes errors and provides for appropriate responses. In some embodiments EFMP connection phases include: INITIALIZED, CONNECTING, ESTABLISHED, CLOSING and CLOSED. The INITIALIZED state is occupied when creating the end-point and prior to any active operations. The CONNECTING state is occupied to initiate establishment of a connection between two end-points. Upon successful completion of the initial packet exchange the connection state moves to the ESTABLISHED state and then the two end-points may exchange messages. The EFMP protocol fragments messages into packets at the source, guarantees delivery to the remote end, and reassembles the messages at the destination for delivery.

A two-packet connection initiation protocol (request and reply) is used by EFMP. An end-point initiates a connection by allocating a local context and sending a CONN packet (with asserted SYN and ACK bits) to a remote peer. At the same time, the end-point transitions the context into the CONNECTING state and starts an acknowledgement timer. The initiating peer is known as the "client" and is said to perform an "active open", while the other end-point is known as the "server" and performs a "passive open".

If an EST (having SYN and ACK asserted) is not received from the server before the acknowledgement timer expires, the client sends another CONN packet and restarts the timer after multiplying the interval by ConnBackOff. The parameters controlling the retransmission behavior are ConnTimeOut (10 ms), ConnBackOff (2), and MaxConnAttempts (8). If MaxConnAttempts attempts to initiate a connection are not successful, the initiator reports an error to the protocol stack and destroys the local context. In some embodiments default parameter values are chosen based on performance analysis.

Once an EST packet with the correct fields is received from the server, the initiating context saves selected information, moves into the ESTABLISHED state, and then the client is enabled to send and receive packets on the connection. The selected information includes source port number, sequence number (seqNum), acknowledgement number (ackSeqNum), receive window size (rcvWindowSize), ULP protocol context flags, and a context key allocated by the remote peer.

An end-point receiving a CONN packet performs checks to see whether service is available on the relevant transport address and for the peer. If so, it allocates a new local context, sends an EST packet to its peer, and moves the context into the ESTABLISHED state. Initial values for seqNum, ackSeqNum, rcvWindowSize, and source port number are determined and included in the EST packet. If, in the ESTABLISHED state, it receives another CONN packet with identical parameters (indicating that the EST packet that it sent was lost), and it has neither sent nor received any DATA packets on the connection, it resends the EST packet and the context remains in the ESTABLISHED state. Otherwise, it sends a RST packet and the context is destroyed (or deallocated).

If either end receives a packet having a set RST bit, then an immediate shutdown (without regard to orderly packet delivery or acknowledgement) is requested. The local context is destroyed and an error code is returned to any associated higher-level software (such as an operating system or an application).

A two-packet connection termination protocol (request and acknowledge) is used by EFMP. An end-point initiates graceful shutdown of a connection by sending a DISC (having an asserted FIN bit) packet to its peer. The initiator ensures that all DATA packets have been exchanged and acknowledged before initiating the shutdown; in general, this is the peer in the server role. The other end-point acknowledges the DISC with a DM packet (having asserted FIN and ACK bits), and destroys the local context. Two-packet connection initiation and termination enables fast connection setup/tear-down compared to three packet schemes (such as TCP/IP) by eliminating a packet round-trip time.

Once established, either peer is enabled to send DATA packets to accomplish information transfer. DATA packets carry Packet Sequence Numbers (PSNs) that are generated by the sender and are used by the receiver to detect loss. In some embodiments PSNs start at 1 and are modulo $2^{24}$. In some embodiments PSN start at an arbitrary value and are modulo $(2^{32})-1$.

A DATA packet also carries a cumulative acknowledgement sequence number (ackSeqNum) specifying the last received in-order PSN from the peer. In the normal case, when both peers are exchanging DATA packets, these are sufficient to detect packets that have been delivered to the remote peer without loss. However, when information flow is largely one-way (as in a bulk transfer, for example) the receiving peer generates an ACK packet for every AckRatio DATA packets received. It also generates an ACK packet upon receiving and processing a DATA packet that is marked with the 'E' flag (or in some embodiments the 'URG' flag), provided this has not been subsumed by the acknowledgement number in an outgoing DATA or ACK packet.

Peers exchange maximum receive window sizes during connection set up. A sender maintains an additional window, the transmit window, that is initialized to InitTxWindow. A sender increments this window by TxWindowStep upon every TxAckStep ACKs it receives, up to a maximum equal to the peer's receive window. The window incrementing enables a gradual increase in outstanding (i.e. in-flight) packets dependent upon receiver data acknowledgement rate.

A receiver infers loss by the arrival of a DATA packet that is not in sequence as indicated by its PSN. In this situation, it generates a NAK packet with the PSN of the missing packet to request a retransmission, and discards further out-of-order DATA packets until the missing packet has been retransmitted by its peer and received. Once it receives a DATA packet with the correct expected PSN, it issues an immediate ACK and then continues accepting in-sequence DATA packets.

A sender infers loss when it either receives a NAK packet or when a retransmission timer expires indicating that it has not received an ACK packet for the last unacknowledged PSN. If the timer expires, then the sender halves the transmit window (but ensures that this is no less than 1), and starts resending packets in sequence, starting with the lost PSN. The sender also doubles the retransmission timer interval and restarts the timer. The resending/halving/doubling behavior continues up to a maximum number of retransmission time outs without successful acknowledgement of a retransmitted PSN (or in some embodiments receipt of an appropriate ACK), in which case the sender issues a RST packet and terminates the connection.

Selected VNIC Details

Figure 16:
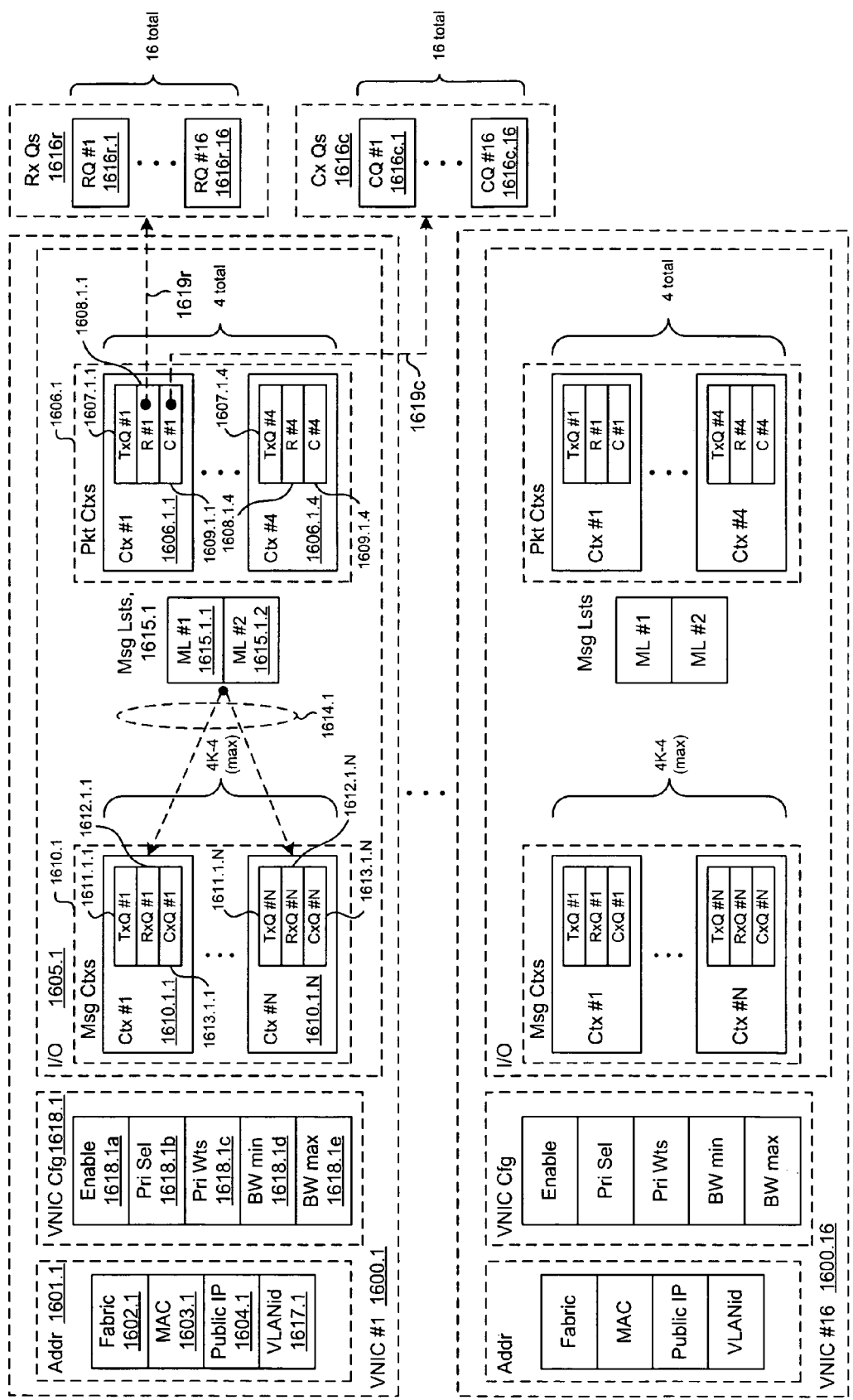
FIG. 16 illustrates selected aspects of a logical view of an embodiment of a plurality of virtual Network Interface Controllers (VNICs), also known as virtualized Network Interface Cards.

FIG. 16 illustrates selected aspects of a logical view of an embodiment of a plurality of VNICs. According to one embodiment, VIOC 301 implements 16 identical VNICs. In the figure only two of the VNICs are shown (for clarity), VNIC #1 1600.1 and VNIC #16 1600.16. Each VNIC, such as VNIC #1 1600.1, includes programmable identification information illustrated as Address Block 1601.1, VNIC configuration registers illustrated as VNIC Configuration Block 1618.1, and packet and message data communication interfaces illustrated as I/O Block 1605.1.

Address Block 1601.1 includes Fabric Address 1602.1, for specifying the source fabric address of the VNIC, and MAC Address 1603.1, defining the MAC address associated with the VNIC. In some embodiments, a first portion of Fabric Address 1602.1 is common to some or all of the VNICs of a VOIC, and corresponds to the physical fabric address of the VIOC. A second portion of Fabric Address 1602.1, also known as the fabric sub-address, is unique to each VNIC. Address Block 1601.1 optionally includes, according to embodiment, Public Internet Protocol (Public IP) Address 1604.1, for specifying the IP address associated with the VNIC, to enable selected L3 processing.

Address Block 1601.1 also includes a Virtual Local Area Network (VLAN) Identifier (VLANid 1617.1), for use according to embodiment to map a destination address according to VLAN information, or as a tag to identify the VNIC with respect to a VLAN for selected L3 processing, or both. In some embodiments, a separate L3 VLAN identifier (in addition to VLAN Identifier 1617.1) may be provided for use with selected L3 VLAN operations. Examples of VLAN processing include formulating a packet or cell header including a VLAN tag, and filtering incoming traffic with respect to a VLAN. In various embodiments, programming of VLAN Identifier 1617.1 further enables implementation of fabric-port-based, MAC address-based, IP address-based, and general L3 type VLAN functions.

VNIC Configuration Block 1618.1 includes VNIC Enable 1618.1a, for enabling (and disabling) the corresponding VNIC, and priority and bandwidth configuration registers. The priority configuration registers include Priority Scheme Selection 1618.1b and Priority Weights 1618.1c, for specifying priority processing related information, such as priority scheme selection and weights, respectively. The bandwidth configuration registers include Bandwidth Minimum 1618.1d and Bandwidth Maximum 1618.1e, for specifying bandwidth allocation and control configurations, such as minimum and maximum bandwidth allocations, respectively, for the corresponding VNIC.

I/O Block 1605.1 includes separate collections of queues for packets and messages. Each collection includes transmit, receive, and completion queues (the completion queues are also known as receive completion queues). The packet and message queues are organized by "context". Each context includes a transmit queue, a receive queue, and either a completion queue or a pointer to a completion queue. In a typical usage scenario, the transmit, receive, and completion queues of a context are associated with a particular protocol connection or a particular multiplexed set of protocol connections. Each context is established by software running on the Local Processors. In certain embodiments, while each context has a respective pair of dedicated transmit and receive queues, multiple contexts are associated with a common completion queue. This is detailed further below.

A packet (or message) context may be used for IP traffic, interprocess communication (directly or over IP), or other similar communications. When accessed via physical buffer addresses, packet (or message) contexts are typically used directly by OS and Hypervisor processes, and typically used indirectly (via system calls, for example) by application processes. When accessed via virtual buffer addresses, packet (or message) contexts are typically usable directly by application processes, in addition to direct use by OS and Hypervisor processes.

A single packet context may be used to implement multiple connections via SW, while a single message context typically implements a single connection managed (at least in part) by HW. Message contexts may be used by RDMA operations with fewer SW operations than similar functionality implemented with packet contexts. In some embodiments, message contexts are typically directly accessible via application processes.

Each context has particular state associated with it, organized within a Context State Block (CSB), which identifies the context's transmit, receive, and completion queues. The CSBs are maintained in various embodiments by any combination of hypervisor, OS, and Driver processes providing control information for the VNIC.

The queues contain descriptors that are organized within circular buffers in contiguous memory and thus are also known as descriptor rings. Each enqueued descriptor describes various aspects (detailed herein below) of the packets or messages being transmitted and received. In particular, the packet transmit and receive descriptors correspond to the raw data buffers in the Local Processor Memory where packet data is respectively read and written by the VIOC. A common scenario is for these descriptors to have been prepared by processes of the Local Processors (such as a Driver).

Packet Contexts 1606.1 provides four packet CSBs (also referred to as packet contexts) of identical capability, two of which are illustrated in the figure (Packet Context Block #1 1606.1.1 and Packet Context Block #4 1606.1.4). As shown, each packet context includes a transmit queue, such as Packet Transmit Queue #1 1607.1.1 and Packet Transmit Queue #4 1607.1.4., and a receive queue pointer, such as Packet Receive Queue Pointer #1 1608.1.1 and Packet Receive Queue Pointer #4 1608.1.4.

Each packet receive queue pointer identifies one of 16 identical shared packet receive queues, as illustrated by dashed-arrow 1619r pointing toward Packet Receive Queues 1616r. For clarity, only two of the 16 packet receive queues are illustrated in the figure, specifically Packet Receive Queue #1 1616r.1 and Packet Receive Queue #1616r.16. The packet receive queue pointers enable arbitrary sharing of packet receive queues among packet contexts, including sharing among packet contexts in multiple distinct VNICs.

In alternate embodiments, packet context receive queues are not shared among VNICs, but are dedicated per VNIC as packet context transmit queues are. In these alternate embodiments, 1608.1.1 . . . 1608.1.4 operate directly as the packet receive queues for a given VNIC, and Packet Receive Queues 1616r (of FIG. 16) is not provided.

Also included in each packet context is a completion queue pointer, such as Packet Complete Queue Pointer #1 1609.1.1 and Packet Complete Queue Pointer #4 1609.1.4. Each packet completion queue pointer identifies one of 16 identical shared packet completion queues, as illustrated by dashed-arrow 1619c pointing toward Packet Completion Queues 1616c. For clarity, only two of the 16 packet completion queues are illustrated in the figure, specifically Packet Completion Queue #1 1616c.1 and Packet Completion Queue #16 1616c.16. Similar to the packet receive queue pointers, the packet completion queue pointers enable arbitrary sharing of packet completion queues among packet contexts, including sharing among packet contexts in multiple distinct VNICs.

The packet transmit queues of a VNIC (such as Packet Transmit Queue #1 1607.1.1, for example), also known as transmit rings, are used to communicate transmit packet availability and location in memory. The transmit queues include a plurality of transmit descriptors, each of which refer to a buffer in memory having a complete or partial packet image for transmission. The descriptor includes the address of the buffer (in Local Processor Memory), the buffer size, a packet state indicator, a valid indicator, a done indicator, and other related information. The packet state indicator describes the buffer information as associated with the start, the middle, or the end of a packet. Assertion of the valid indicator specifies that the descriptor refers to packet image data ready for transmission. Deassertion indicates otherwise: that no data is ready, the descriptor is invalid, or some other related condition. The valid indicator allows a VNIC implementation (such as a VIOC) to poll (or scan) the transmit queues for valid descriptors to discover packet data ready for transmission without requiring any further information or stimulus from the processes executing on the Local Processor. The processes may also interrupt the VIOC by accessing a Doorbell location in the VIOC memory-mapped I/O address space to indicate new or modified descriptors in a transmit queue, corresponding to additional packet data ready for transmission. A plurality of Doorbell locations are typically provided per VNIC. In some embodiments, packet transmit queues and message contexts of all VNICs are allocated distinct doorbells.

The packet receive queues of a VNIC (such as those pointed to by Packet Receive Queue Pointer #1 1608.1.1, for example), also known as receive rings, are used to communicate receive packet data locations in memory. The receive queues include a plurality of receive descriptors, each of which refers to a buffer in memory for reception of a complete or partial packet image. The descriptor includes the address of the buffer (in Local Processor Memory), the buffer size, a valid indicator, and other related information. The valid indicator specifies that the buffer the descriptor refers to is ready to receive packet image data, enabling a VNIC implementation (such as a VIOC) to determine receive buffer availability without direct involvement of processes executing on the Local Processor.

The shared packet completion queues (Packet Completion Queue #1 1616c.1, for example) are used to communicate completion information, including receive packet data availability and status. The completion queues include a plurality of entries, each of which includes a packet status indicator and other related information. The packet status indicator identifies buffer data as corresponding to the start, middle, or end of a packet. When a receive buffer is filled, corresponding to consumption of an associated receive descriptor, an entry is created in one of the completion queues. The completion queue data structure and related processing further enable a VNIC implementation (such as a VIOC) to provide packet data to processes executing on Local Processors with little direct involvement of the processes. In some embodiments, the ingress processing (e.g., packet reassembly from cells) performed by the VIOC/VNIC frees up resources for other tasks, and may also simplify implementation of other portions of the system.

In the illustrated embodiment, Message Contexts 1610.1 provides up to a total of 4K–4 (i.e., 2 to the $12^{th}$ power, minus 4, or 4092) message CSBs (also referred to as message contexts) per VNIC. Each message context has identical capability, and two are illustrated in the figure (Message Context Block #1 1610.1.1 and Message Context Block #N 1610.1.N). In other embodiments, (not illustrated), the message contexts of the 16 VNICs are shared, for a total of 64K–16 (i.e., 2 to the $16^{th}$ power, minus 16, or 65,520) message contexts available collectively to all of the VNICs. As shown, each message context includes a transmit queue, such as Message Transmit Queue #1 1611.1.1 and Message Transmit Queue #N 1611.1.N, and a receive queue, such as Message Receive Queue #1 1612.1.1 and Message Receive Queue #N 1612.1.N. Also included in each message context is a completion queue, such as Message Completion Queue #1 1613.1.1 and Message Completion Queue #N 1613.1.N. The message transmit, receive, and completion queue data structures are similar to those defined for packet processing. The message data structures specify message location and availability for transmission, for determining buffer location and availability for reception, and for directly providing message data and completion status to processes executing on Local Processors.

Messages are processed via an additional level of indirection not used for packet processing. Message Lists 1615.1 includes two linked lists of messages to be processed (Message List #1 1615.1.1 and Message List #2 1615.1.2). Each of the lists includes an active entry pointing to (or selecting) one of the message contexts, as illustrated by dashed-ellipse 1614.1 and associated dashed-arrows pointing to message contexts in Message Contexts 1610.1. In embodiments with 4K-4 message contexts per VNIC the active entries point to message contexts associated with the VNIC, and in embodiments with 64K-16 shared message contexts, the active entries point to any of the shared message contexts. Each of the selected message contexts in turn includes transmit, receive, and completion queues, as illustrated.

Transmit and receive packet and message buffer addresses may be provided as physical addresses or virtual addresses subsequently translated by a VNIC implementation (such as a VIOC), depending on embodiment and configuration. In some embodiments and configurations, address type varies according to queue, and may also vary according to other configuration information.

In typical implementations, VNICs share resources amongst each other and between queues within each respective VNIC. Shared transmit resources include access to the fabric (based on destination, for example) and effective bandwidth to the fabric (allocated between VNICs and queues included in VNICs, for example). Shared receive resources include input queuing (or enqueuing) bandwidth from the fabric (based on a categorization included in the received data, for example) and dequeuing bandwidth from input queues to Local Processor Memory (allocated between VNICs and queues included in VNICs, for example).

CONCLUSION

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications (such as the quantity and type of processors and memory on the modules; the number of VNICs per VIOC, the channel bandwidths; the degree of redundancy for any particular component or module; the particular version of an interface standard or component; and the number of entries or stages in registers and buffers), are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. A system comprising:
a switch fabric enabled to transfer data via cells;
a network module coupled to the switch fabric;
a fibre channel module coupled to the switch fabric and comprising
a plurality of queues to communicate data with the switch fabric,
a plurality of fibre channel ports, and
control logic coupled to the queues; and
wherein the control logic is enabled
to operate each of the queues to manage information transfer for a respective one of a plurality of reliable communication channels, the reliable communication channels being compatible with a Remote Direct Memory Access (RDMA) protocol,
to operate each of the reliable communication channels to provide retransmission of data not received and retransmission of data received out of sequence, the retransmissions being from a sender to a receiver and in response to the receiver conveying to the sender that a sequence number has been received out of sequence,
to determine a selected one of the fibre channel ports in response to an identification transferred via the network module and the switch fabric, and
to manage communication of Small Computer System Interface (SCSI)-compatible data between a plurality of the queues and the selected one of the fibre channel ports.

2. The system of claim 1, wherein the queues comprise ingress queues and the data communicated with the switch fabric comprises data received from the switch fabric.

3. The system of claim 1, further comprising a mass storage device coupled to one of the fibre channel ports.

4. The system of claim 3, wherein the mass storage device is a magnetic disk drive.

5. The system of claim 1, wherein each of the queues comprises a respective send sub-queue and a respective receive sub-queue.

6. The system of claim 5, wherein at least two of the queues collectively comprise a single shared status sub-queue.

7. A method comprising:
transferring storage traffic as cells via a switch fabric between a network module and a fibre channel module;
operating each of a plurality of queues implemented in the fibre channel module to manage information transfer with the switch fabric for a respective one of a plurality of communication channels;
providing respective communication channel handshake information for each of the communication channels to enable detection of data received out of sequence and to infer that data was lost, each of the respective communication channel handshake information comprising a respective series of sequence numbers and the detection is at least in part via determining that a received one of the sequence numbers is out of sequence;
communicating results of the detection at least in part via the switch fabric, and in response retransmitting the data that was lost and the data received out of sequence;
mapping transactions included in the storage traffic to fibre channel interfaces provided by the fibre channel module according to transaction identifiers included in the transactions, the mapping comprising mapping at least two of the transactions communicated via respective distinct ones of the communication channels to respective distinct ones of the fibre channel interfaces; and
wherein the transactions comprise Small Computer System Interface (SCSI)-compatible commands and the communication channels are enabled to convey Remote Direct Memory Access (RDMA) traffic.

8. The method of claim 7, wherein each of the queues comprises a respective send sub-queue and a respective receive sub-queue.

9. The method of claim 8, wherein at least two of the queues collectively comprise a single shared status sub-queue.

10. The method of claim 7, further comprising communicating storage data between some of the queues and a plurality of fibre channel compatible storage elements.

11. The method of claim 10, wherein the fibre channel compatible storage elements comprise at least one of a disk drive, a tape drive, a tape library, a storage array, a storage switch, a storage director, a storage router, a storage network, and a Storage Area Network (SAN).

12. The method of claim 7, wherein each of the communication channels has a respective endpoint external to the fibre channel module.

13. A method comprising:
receiving network packets each having a respective network destination address;
forwarding some of the network packets as cells each having a respective cell destination address determined at least in part by the respective network destination address;
switching and receiving the cells according to the cell destination addresses;
according to a plurality of queues, reassembling some of the switched and received cells as storage information that comprises a target address;
according to a plurality of reliable communication channels, providing handshake information to enable detecting out of sequence data and to infer that data was lost, the handshake information comprising sequence numbers, the detecting being at least in part via determining that a received one of the sequence numbers is out of sequence;
communicating results of the detecting at least in part via the switch fabric, and in response retransmitting the data that was lost and the out of sequence data;
selecting one of a plurality of fibre channel storage interfaces based at least in part on the target address;
communicating some of the storage information to the selected fibre channel storage interface as storage frames;
wherein a portion of the storage information is Small Computer System Interface (SCSI)-compatible storage system requests;
wherein each of the reliable communication channels is compatible with at least one of a Remote Direct Memory Access (RDMA) protocol and a Direct Data Placement (DDP) protocol, is associated with one of the queues, and is identified by a respective identifier; and
wherein the target address comprises one of the identifiers.

14. The method of claim 13, wherein the target address further comprises at least one of an Internet protocol compatible address and an Ethernet compatible address.

15. The method of claim 13, wherein at least two of the reliable communication channels communicate data with a single one of the fibre channel storage interfaces.

16. The method of claim 13, wherein the receiving network packets is via a plurality of network modules.

17. The method of claim 13, wherein the communicating some of the storage information is via a plurality of fibre channel modules.

18. The system of claim 1, wherein the data received out of sequence is with respect to a particular one of the reliable communication channels, and the control logic is further enabled to discard the data received out of sequence and to discard further data received with respect to the particular reliable communication channel until reception of the retransmission of the data not received.

19. The method of claim 7, wherein the data received out of sequence is associated with a particular one of the communication channels, and the method further comprises discarding the data received out of sequence and discarding further data received and associated with the particular communication channel until reception of the retransmission of the data that was lost.

20. The method of claim 13, wherein the out of sequence data corresponds to a particular one of the reliable communication channels, and the method further comprises discarding the out of sequence data and discarding further data received that corresponds to the particular reliable communication channel until reception of the retransmission of the data that was lost.

* * * * *